Figure 1:
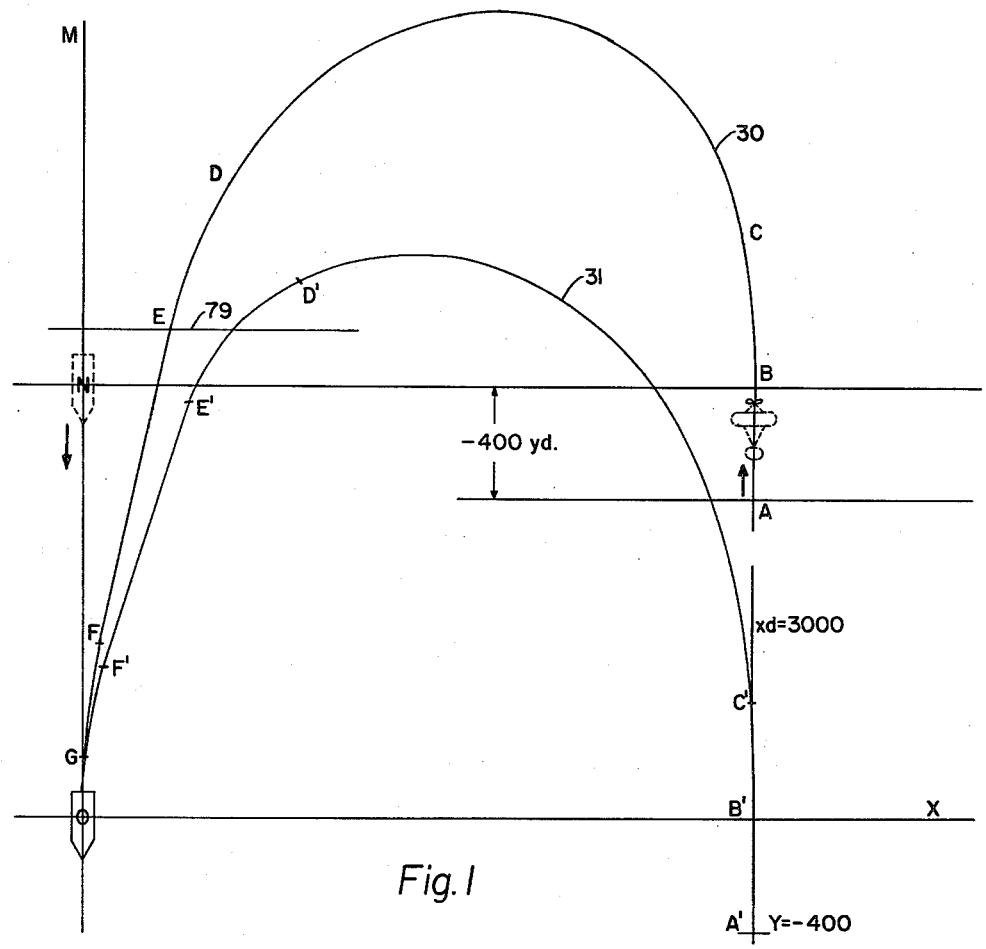

Sept. 11, 1962 J. H. BALDWIN ETAL 3,053,487
AIRCRAFT CONTROL APPARATUS
Filed July 23, 1958 21 Sheets-Sheet 1

INVENTORS
JOHN H. BALDWIN
HENRY W. BERRY
BY

INVENTORS
JOHN H. BALDWIN
HENRY W. BERRY

Sept. 11, 1962  J. H. BALDWIN ETAL  3,053,487
AIRCRAFT CONTROL APPARATUS
Filed July 23, 1958  21 Sheets-Sheet 6

INVENTORS
JOHN H. BALDWIN
HENRY W. BERRY
BY
George W. Field

Sept. 11, 1962     J. H. BALDWIN ETAL     3,053,487
AIRCRAFT CONTROL APPARATUS
Filed July 23, 1958     21 Sheets-Sheet 7
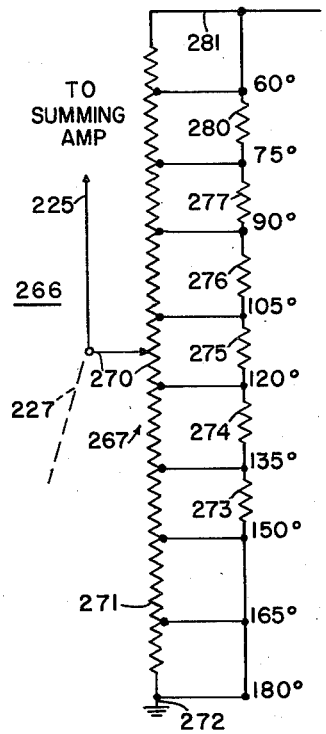
FIG. 11
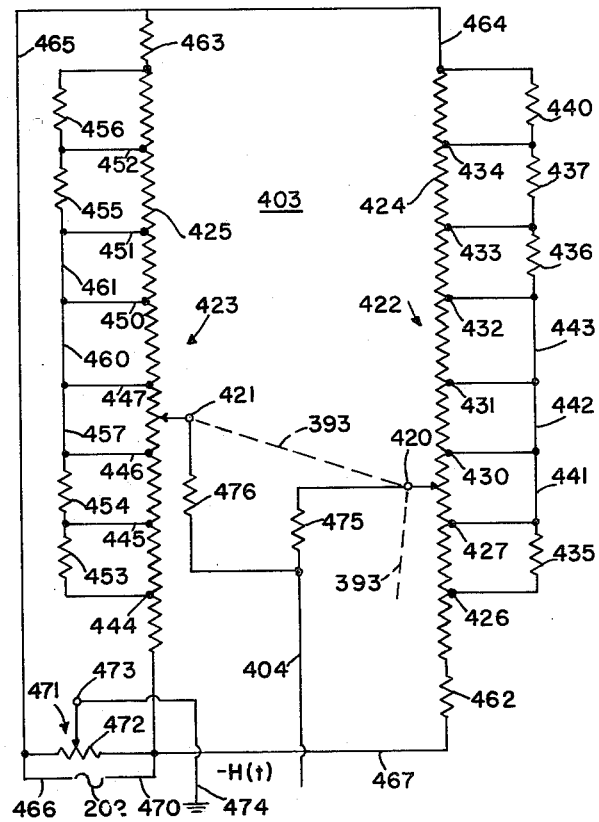
FIG. 14
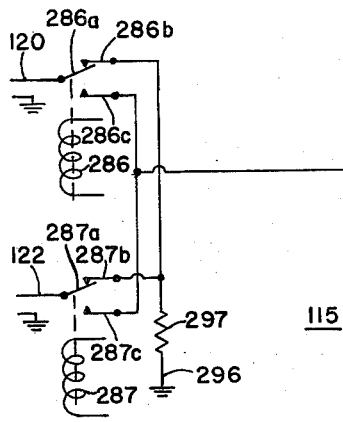
FIG. 12
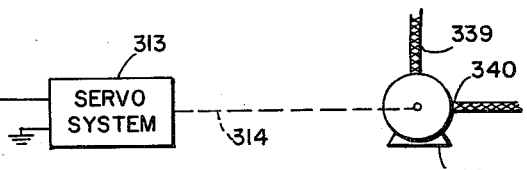
*INVENTORS*
JOHN H. BALDWIN
HENRY W. BERRY
BY
*George W. Field*

Sept. 11, 1962    J. H. BALDWIN ETAL    3,053,487
AIRCRAFT CONTROL APPARATUS
Filed July 23, 1958    21 Sheets-Sheet 11

INVENTORS
JOHN H. BALDWIN
HENRY W. BERRY
BY George W. Field

INVENTORS
JOHN H. BALDWIN
HENRY W. BERRY

Sept. 11, 1962  J. H. BALDWIN ETAL  3,053,487
AIRCRAFT CONTROL APPARATUS
Filed July 23, 1958  21 Sheets-Sheet 14

INVENTORS
JOHN H. BALDWIN
HENRY W. BERRY
BY

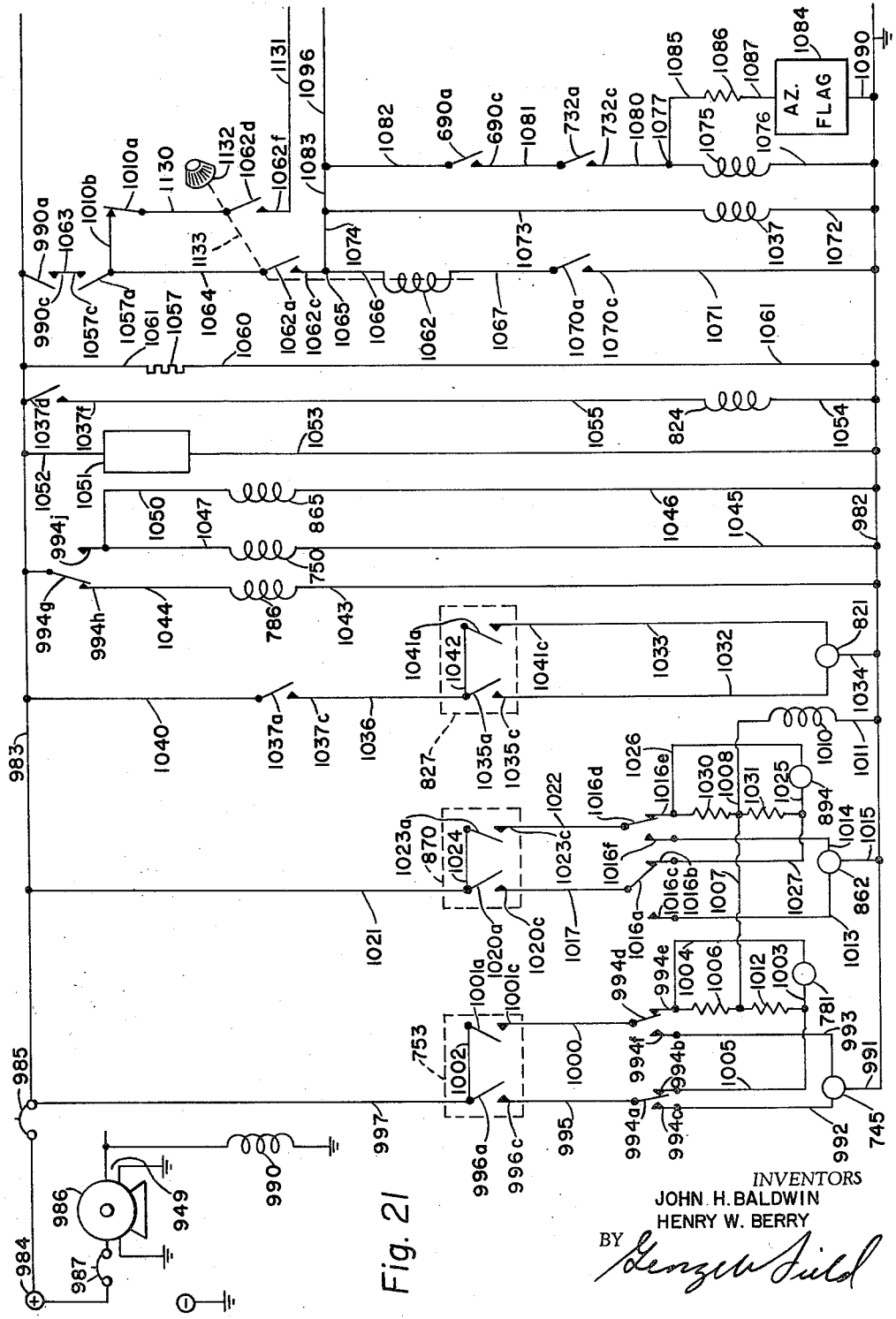

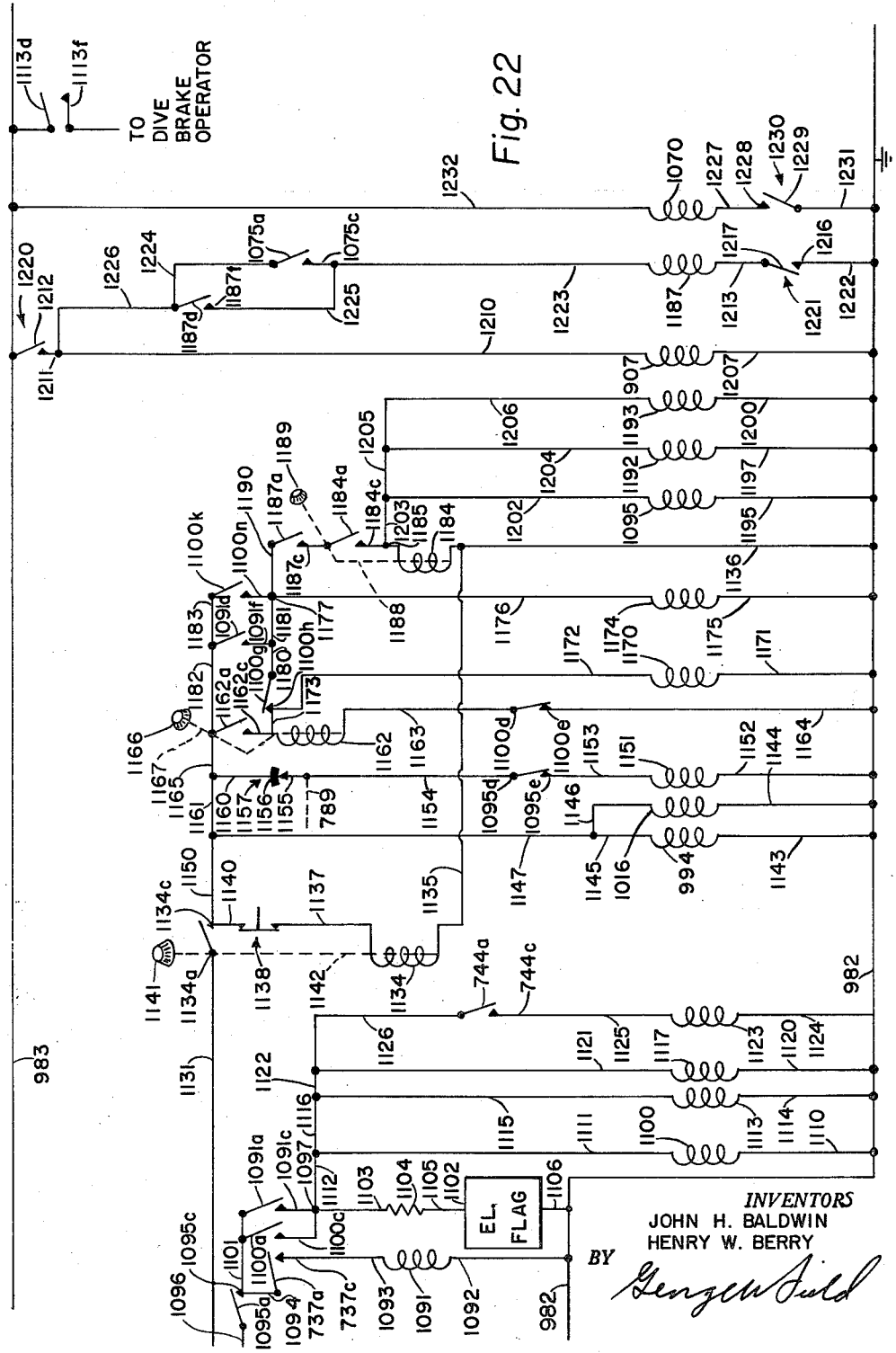

INVENTORS
JOHN H. BALDWIN
HENRY W. BERRY
BY

INVENTORS
JOHN H. BALDWIN
HENRY W. BERRY
BY

INVENTORS
JOHN H. BALDWIN
HENRY W. BERRY

United States Patent Office 3,053,487
Patented Sept. 11, 1962

3,053,487
AIRCRAFT CONTROL APPARATUS
John H. Baldwin, Toronto, Ontario, Canada, and Henry W. Berry, Largo, Fla., assignors to Minneapolis-Honeywell Regulator Company, Minneapolis, Minn., a corporation of Delaware
Filed July 23, 1958, Ser. No. 751,594
12 Claims. (Cl. 244—77)

The present invention relates to the field of aviation, and more specifically to automatic control of aircraft to follow a desired path in space, specifically the curved approach path used in bringing aircraft to rest on the deck of an aircraft carrier.

The apparatus embodying the invention includes a carrier based portion and an airborne portion, and the use of the apparatus involves an initial or "marshalling" phase and a final or "precision" phase. Initially the position of the aircraft is observed by a carrier based "marsnalling" radar and the aircraft is guided by voice vectoring into an "entrance gate." A radar operator uses an aided tracking device to follow the aircraft: when the tracking is accurate the aircraft is said to be "acquired," and the aided tracking device supplies signals representative of the X and Y coordinates of the aircraft on a set of axes aligned with the landing strip on the carrier. These signals are supplied to a computer which derives therefrom further signals representative of the lateral departure of the aircraft from its intended course and of the scheduled bank of the aircraft, that is, the bank angle which, according to a predetermined schedule, an aircraft at the location defined by one of these coordinates should have. These further signals are separately transmitted to the aircraft, combined through appropriate networks, and used to control the aircraft in azimuth: meanwhile it is controlled in elevation by an altitude controller and its power is stabilized by an airspeed controller.

The antenna of a "precision" radar is initially slaved to the output of the aided tracking unit in such a manner that it may be set to follow any particular aircraft in the field of the marshalling radar. As the aircraft proceeds along the curved path it comes closer to the carrier, until presently the precision radar is able to lock on to the particular aircraft and track it independently of the aided tracking unit. The precision radar now supplies inputs to a precision computer which gives the same coordinate signals as the marshalling radar computer, but more precise ones, and also gives range, speed, and elevation signals. At a predetermined point in the approach the precision radar is substituted for the marshalling radar: during the transition the aircraft is first brought to level flight, and the precision radar lateral outputs are maintained at zero until this is accomplished. At the time of transfer, control of the craft in elevation is also transferred from the altitude control to the precision radar, the airspeed of the aircraft is reduced, and its dive brakes are applied. Still later in the approach a glide signal is supplied by the computer to cause descent of the aircraft along a computed path to its final landing altitude. Safety measures provided include disabling the airborne control system unless the aircraft is airborne and unless its landing gear and flaps are down, and restoration of control to the human pilot if the radio communication system fails.

An object of the invention is to provide an improved automatic aircraft control system. More specific objects of the invention are to provide improved means for automatically controlling an aircraft in accordance with observations of its position taken at the landing position, and to provide means for automatically controlling an aircraft to follow a nonlinear path in space in response to such observations.

Various other objects, advantages, and features of novelty not particularly enumerated above which characterize the invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which there is illustrated and described a preferred embodiment of the invention.

Figure 3:
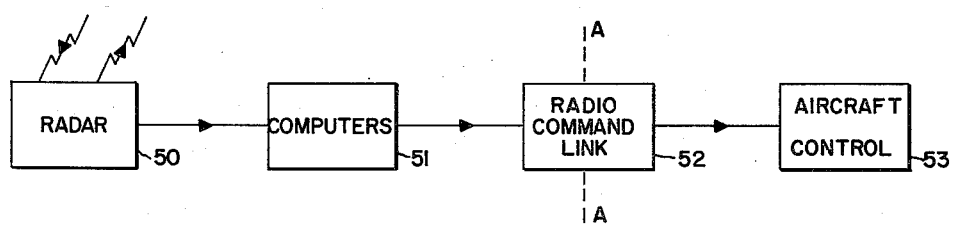
Figure 10:
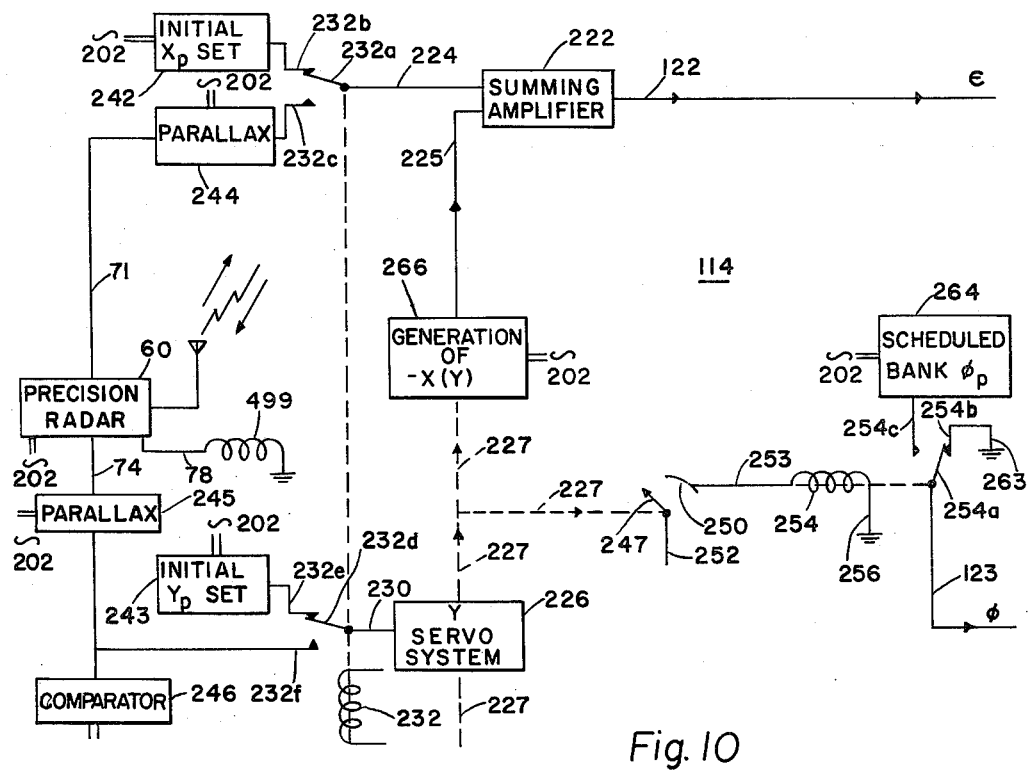
Figure 2:
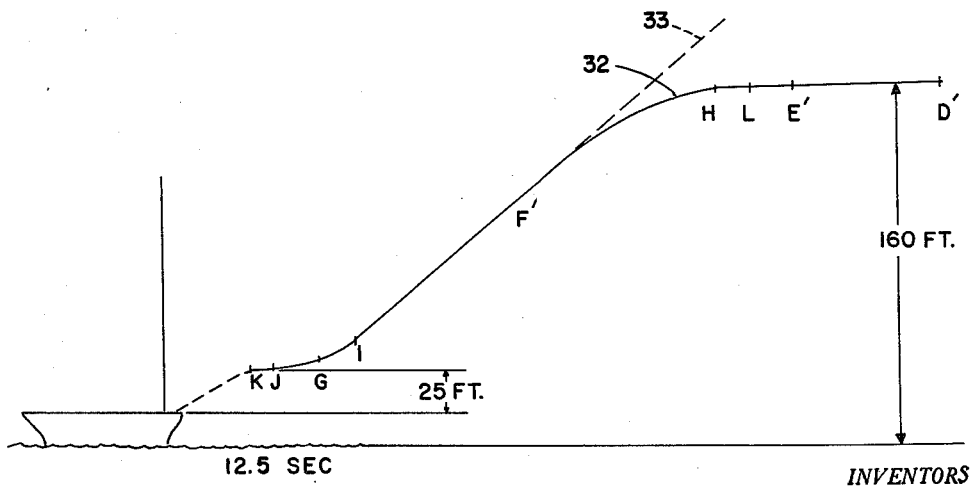
Figure 4:
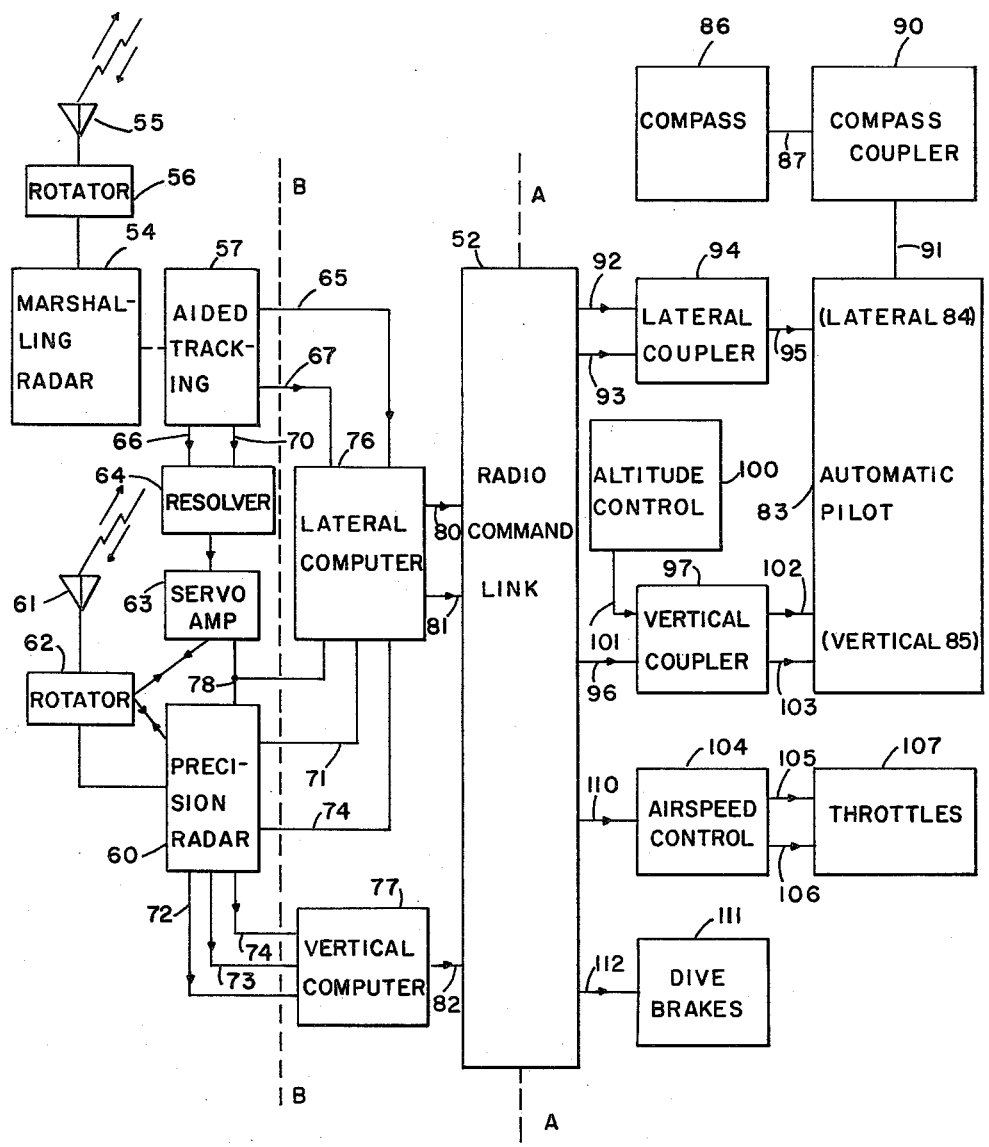
Figure 29:
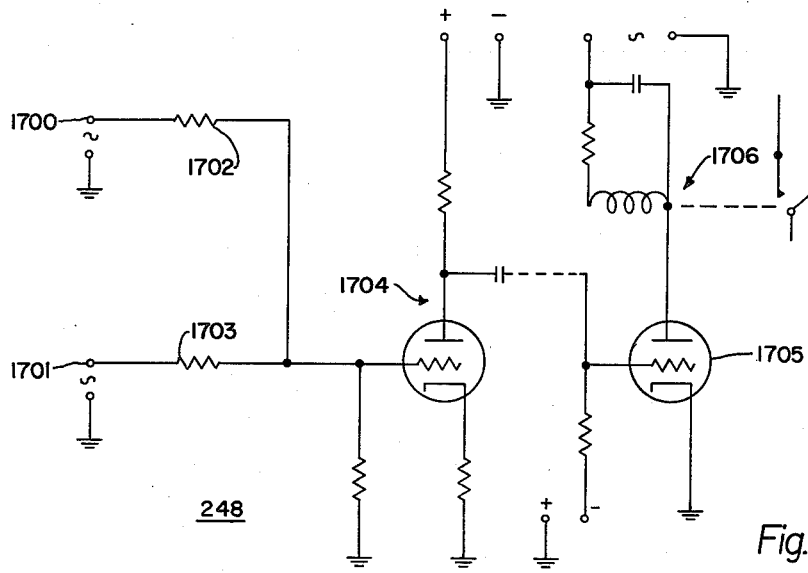
Figure 5:
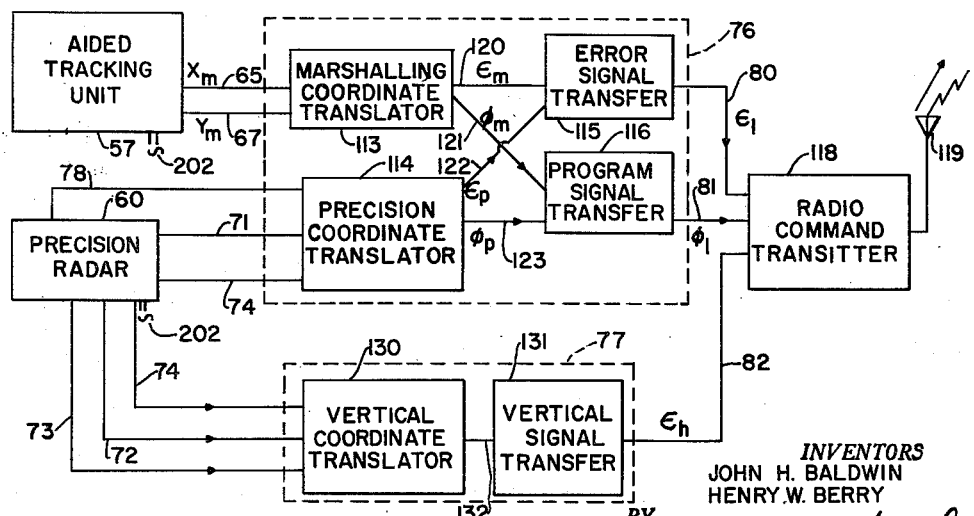
Figure 6:
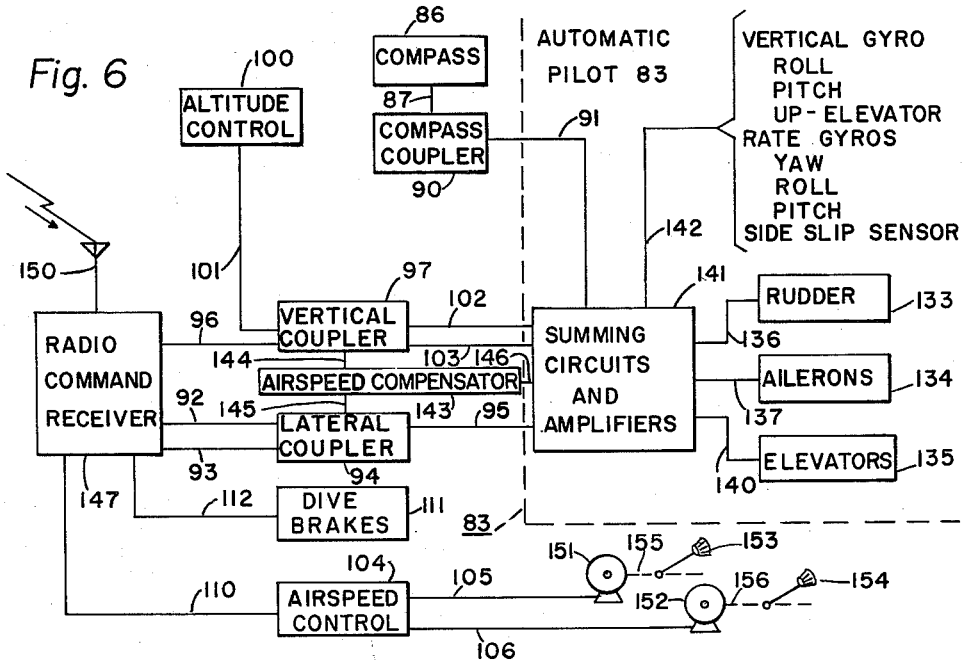
Figure 7:
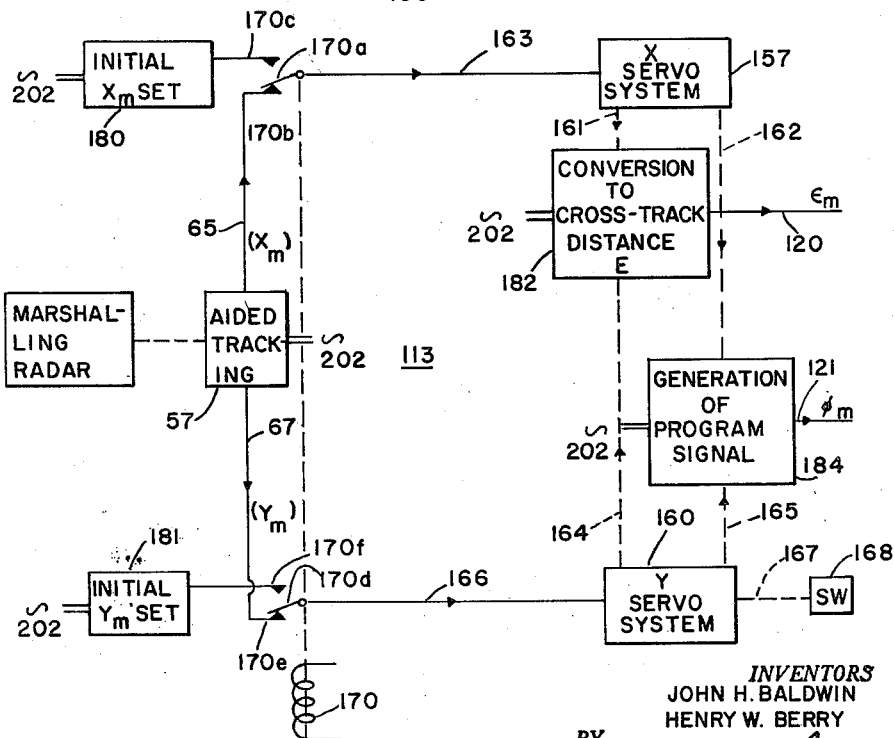
Figure 8:
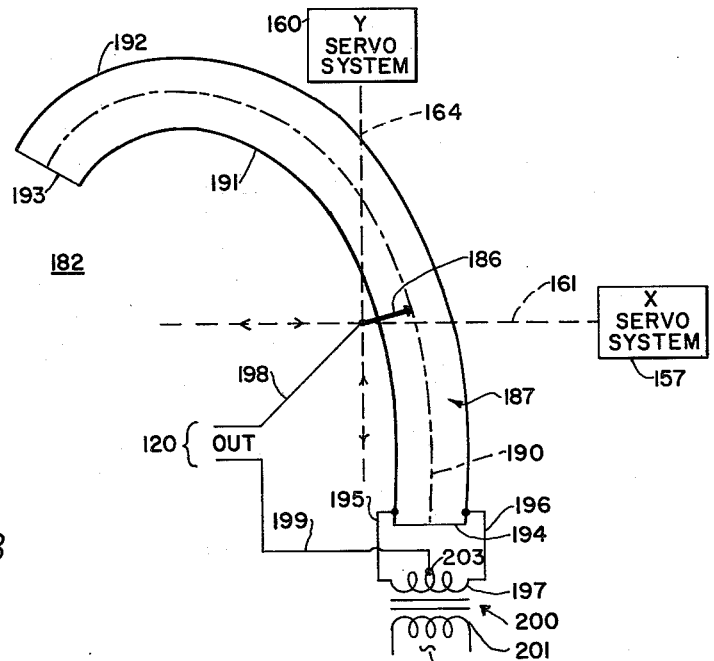
Figure 9:
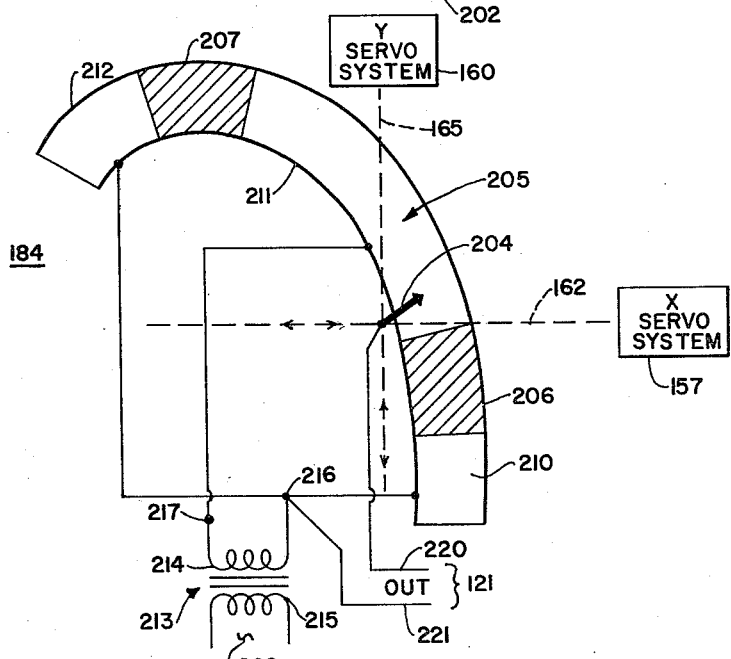
Figure 13:
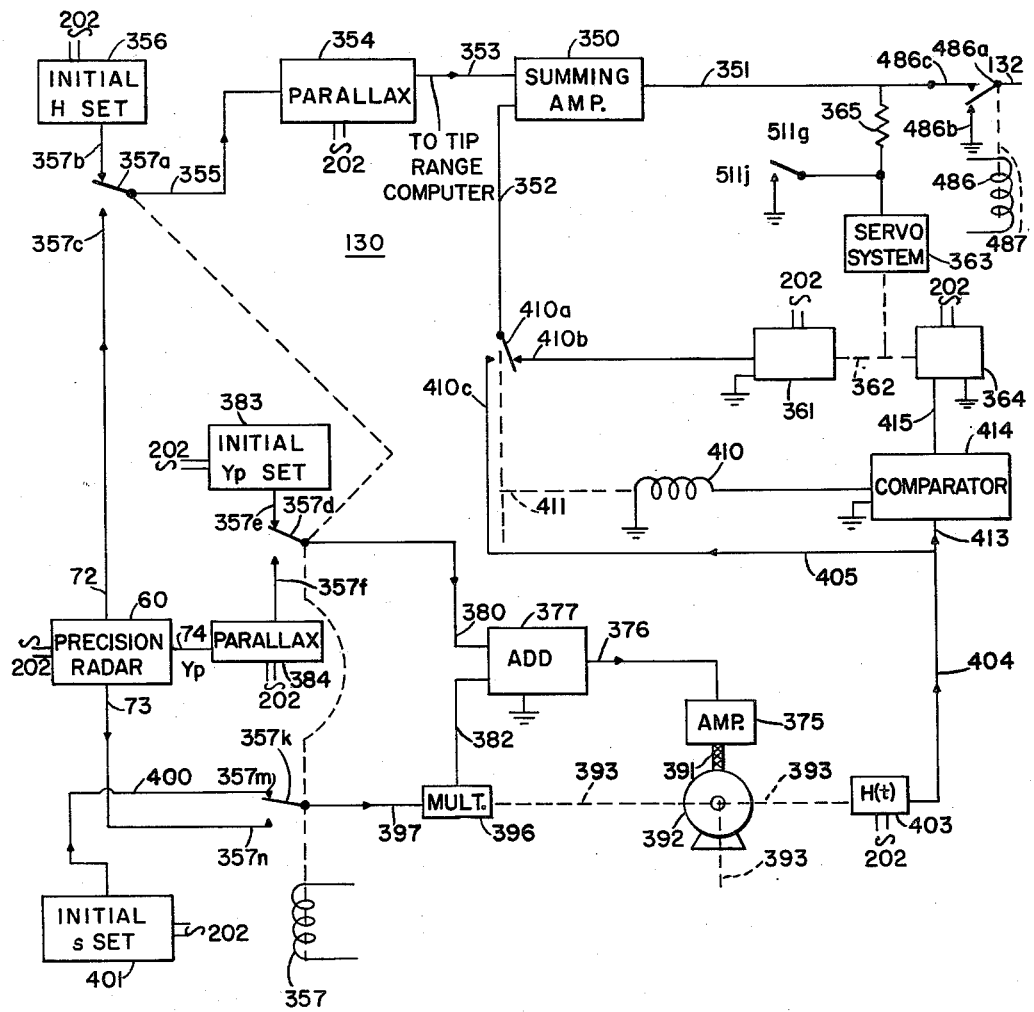
Figure 15:
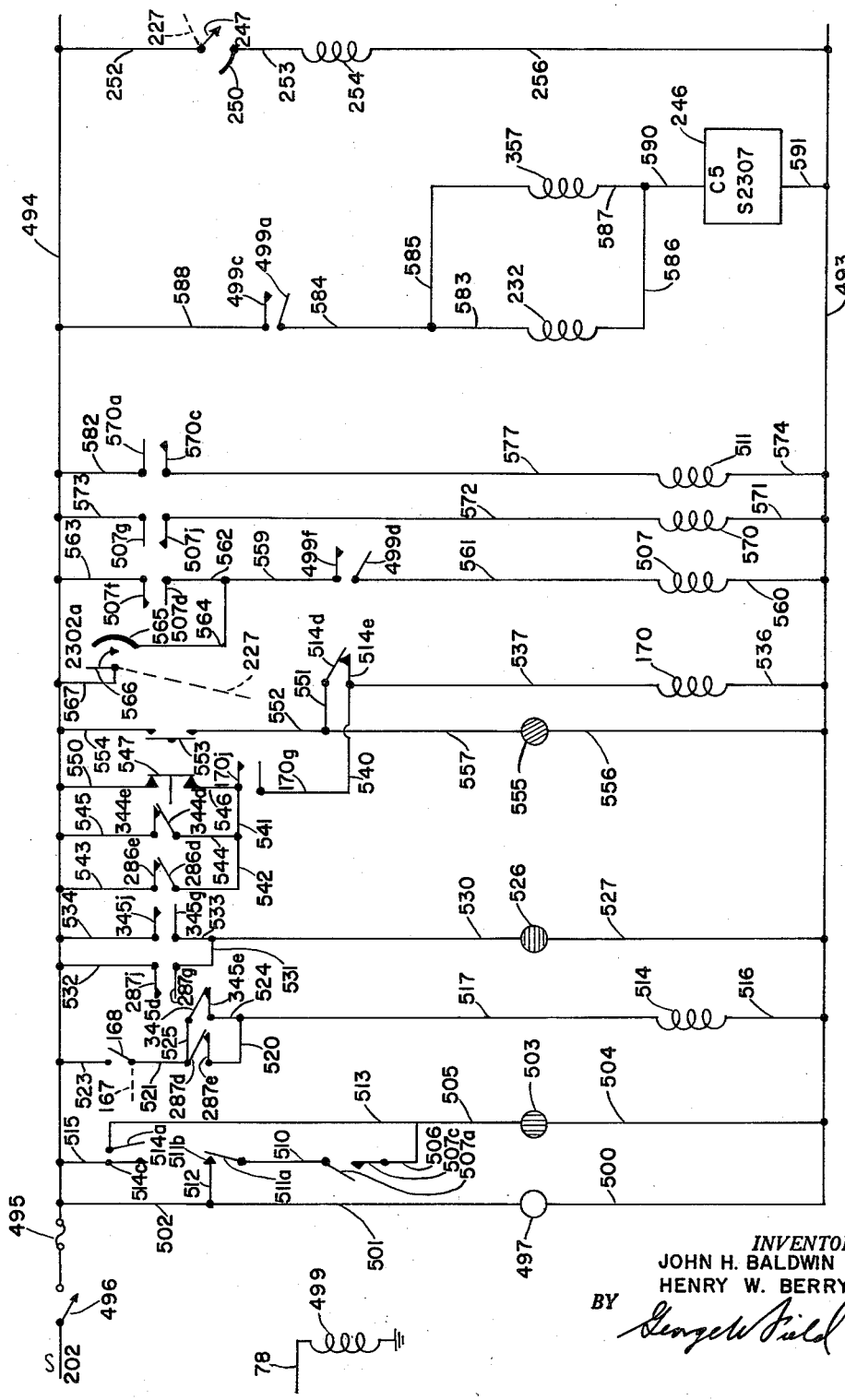
Figure 16:
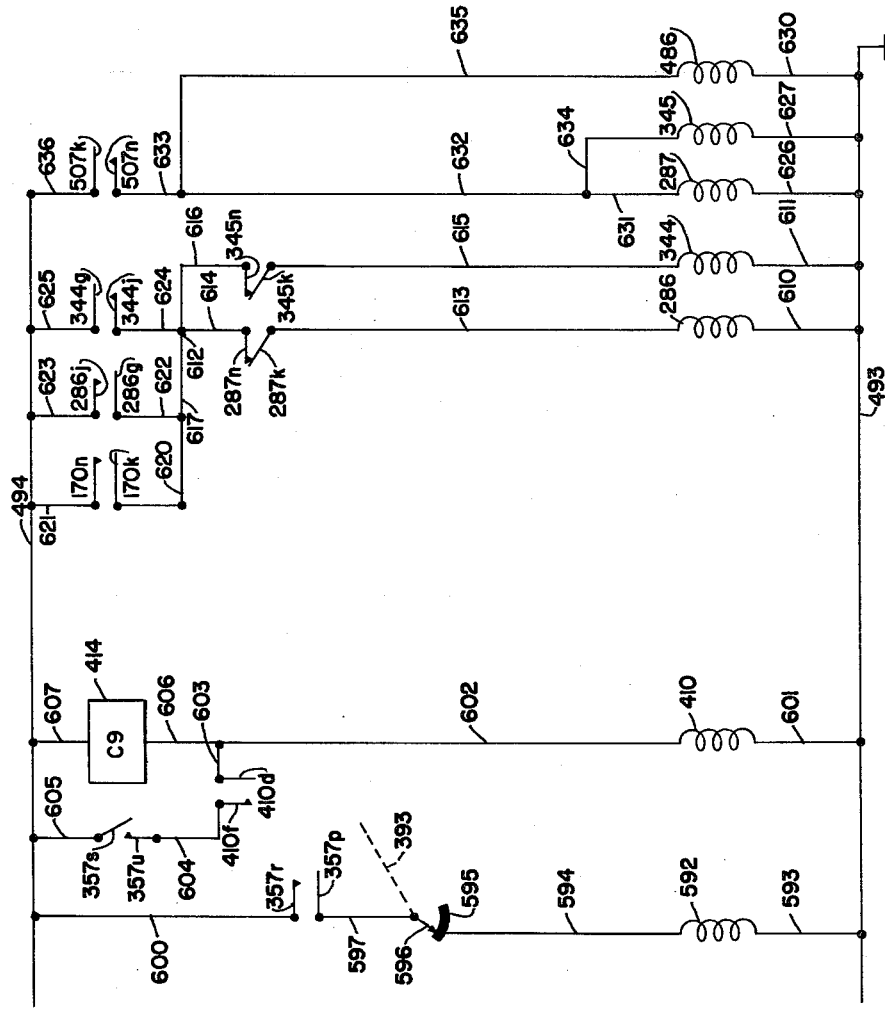
Figure 17:
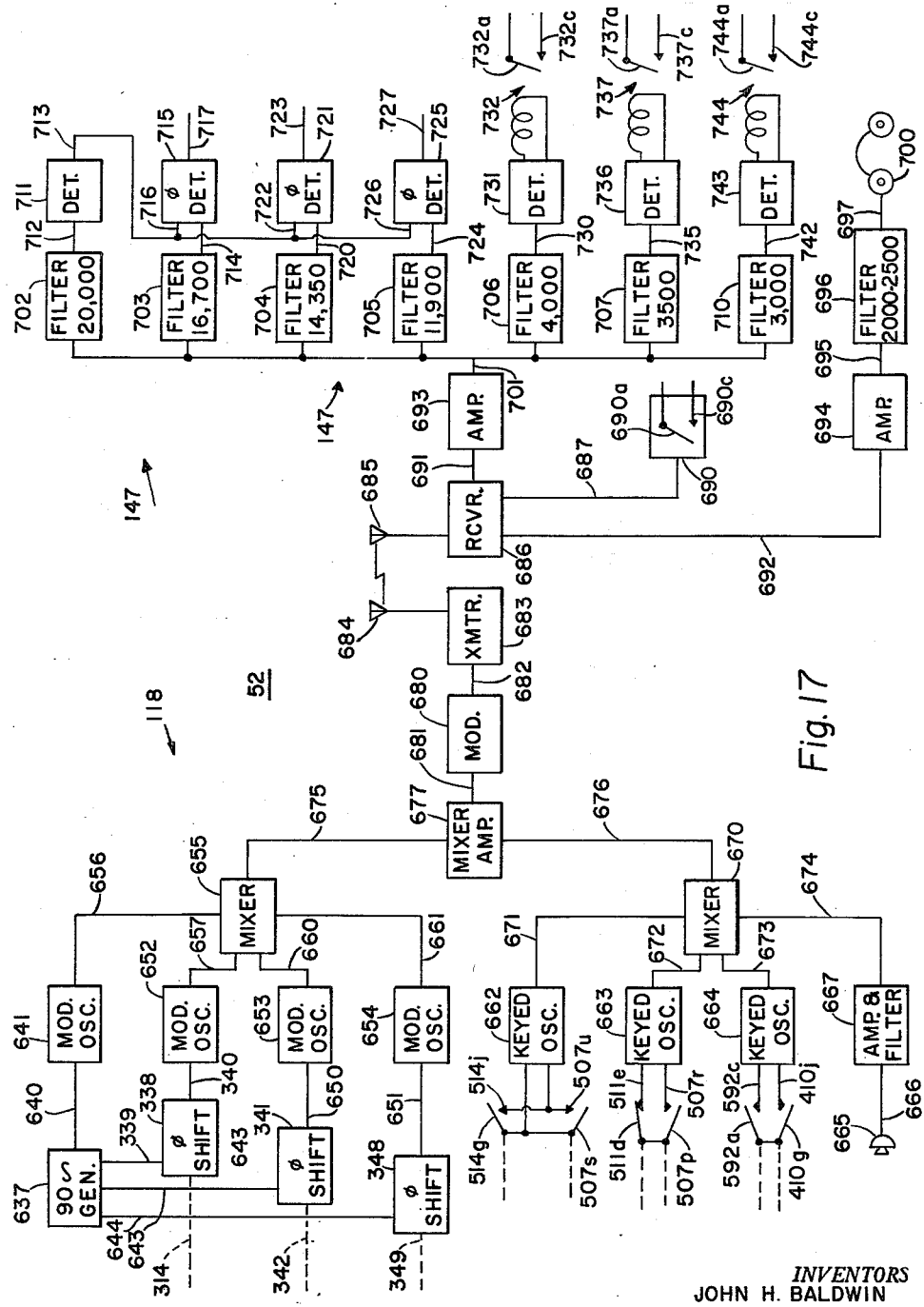
Figure 18:
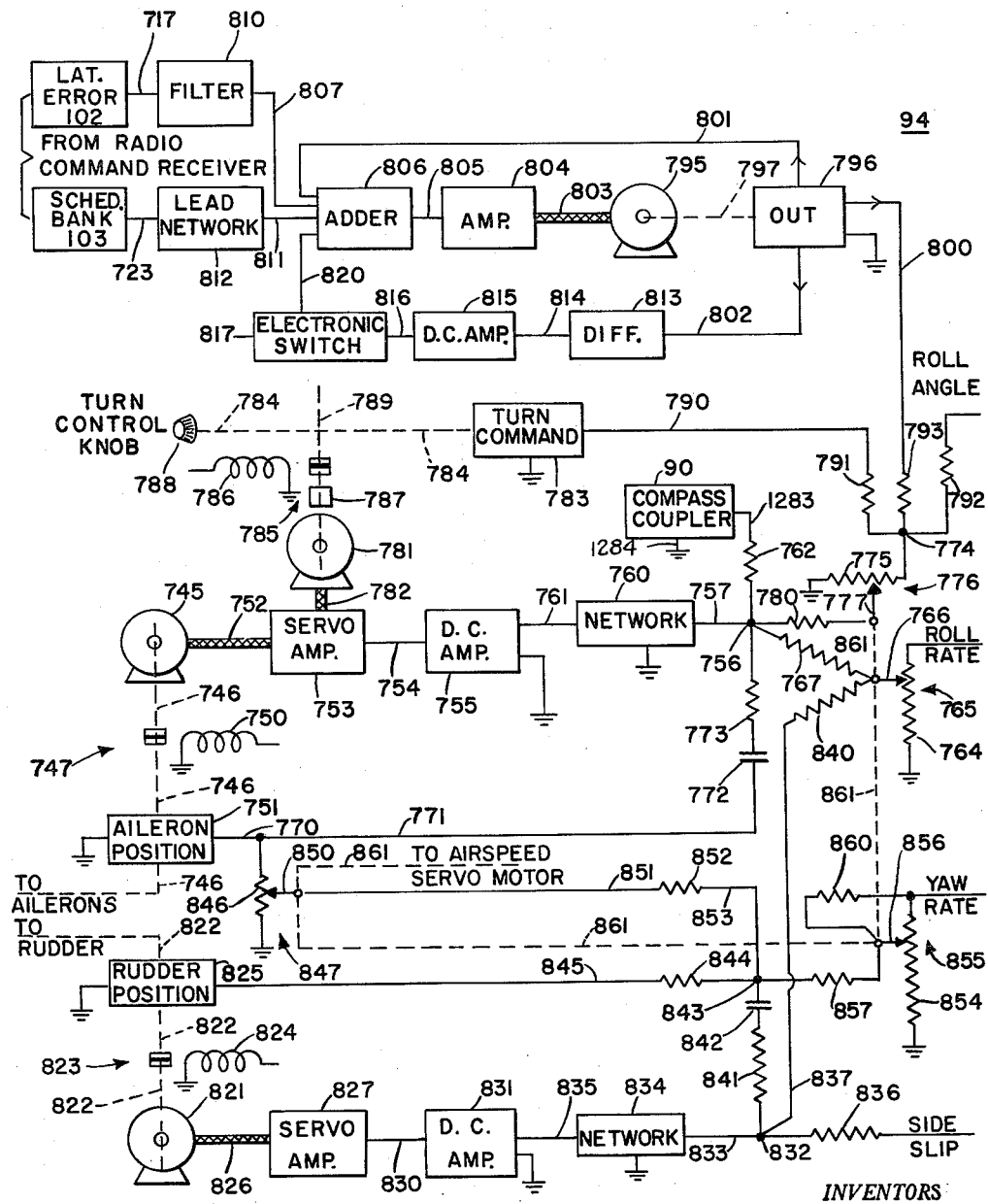
Figure 19:
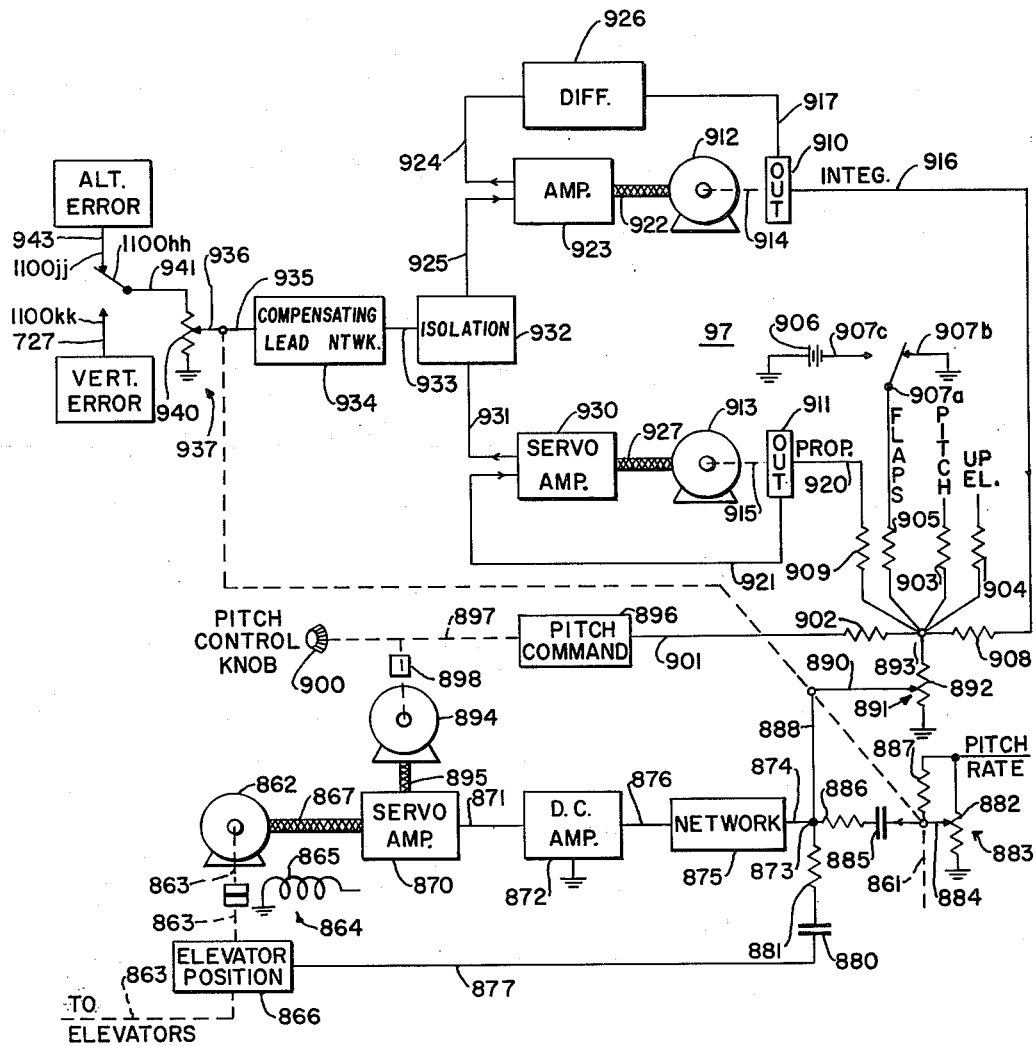
Figure 20:
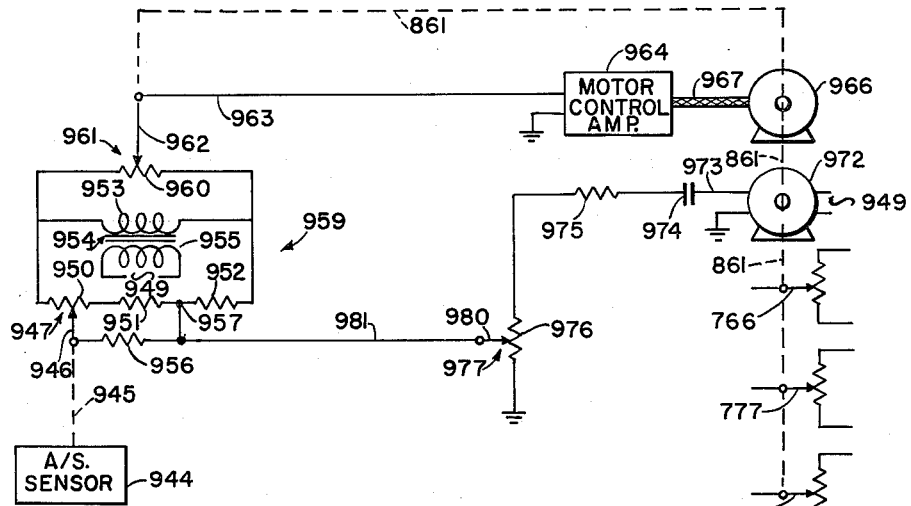
Figure 23:
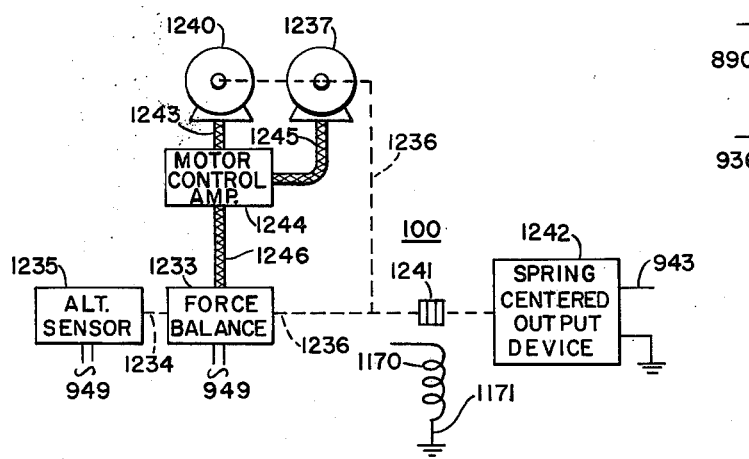
Figure 24:
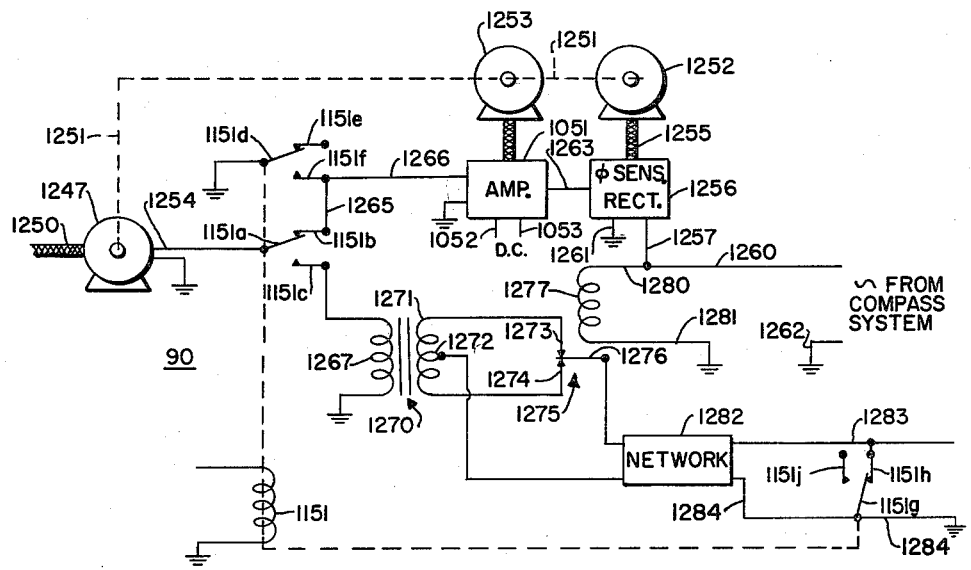
Figure 25:
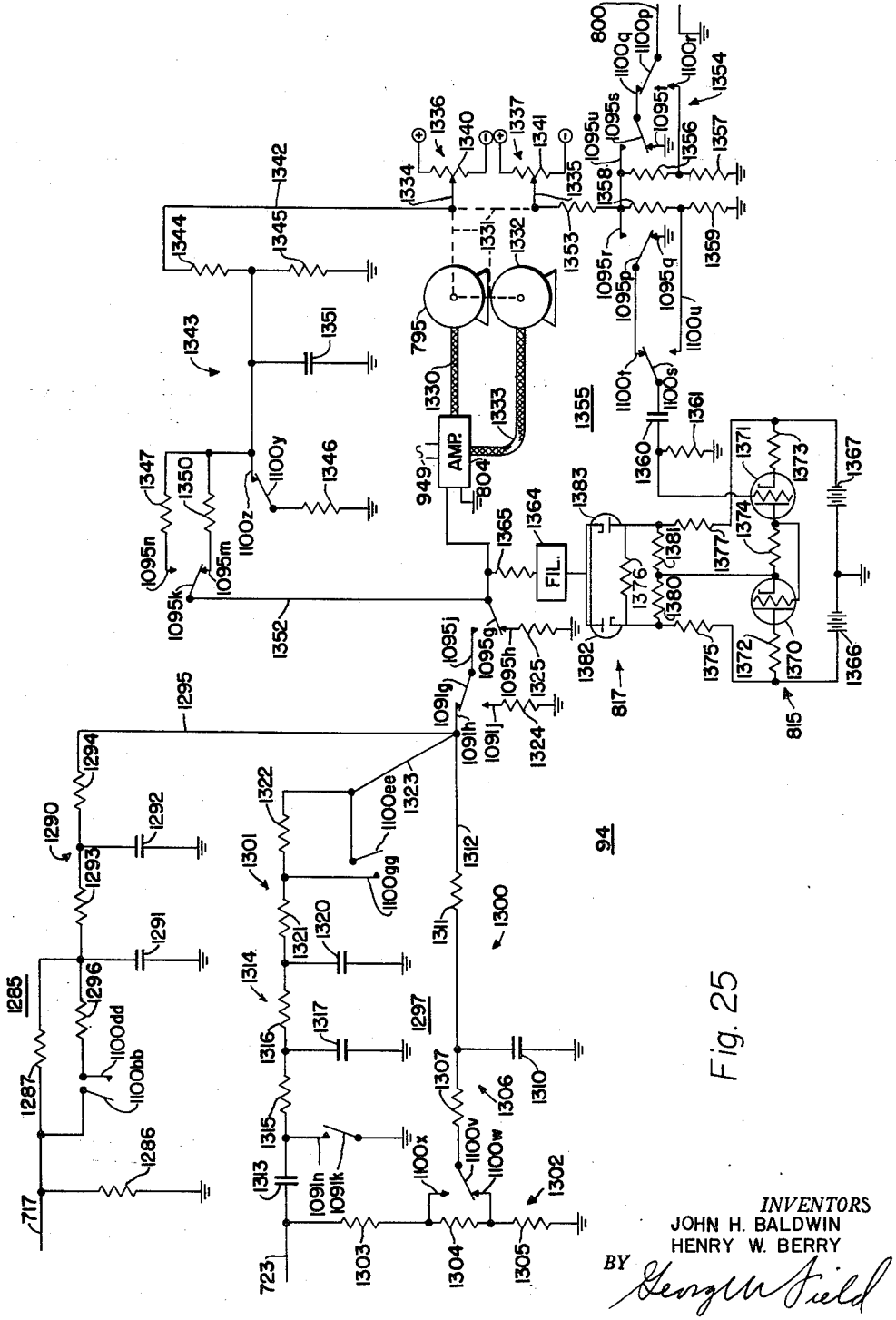
Figure 26:
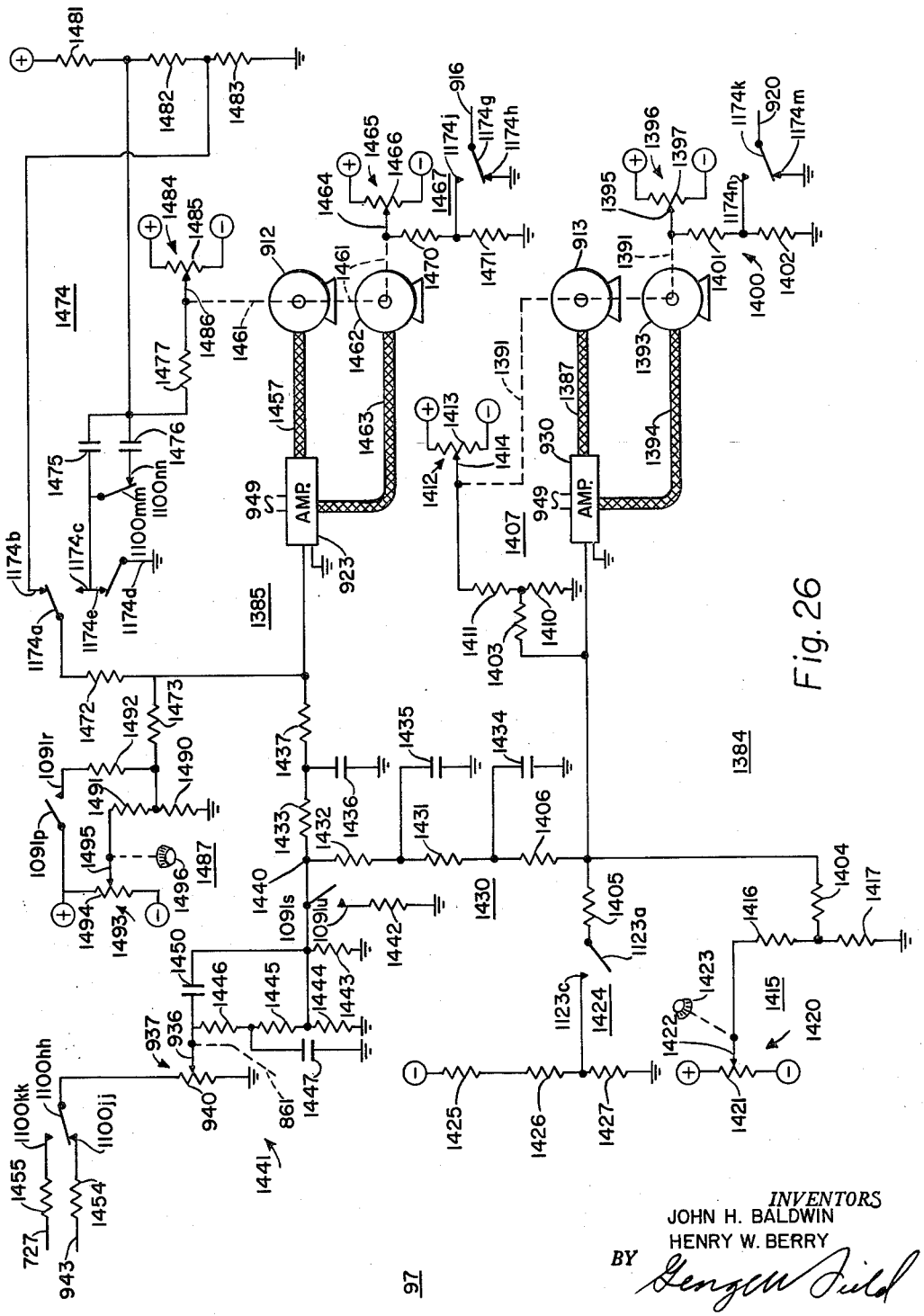
Figure 27:
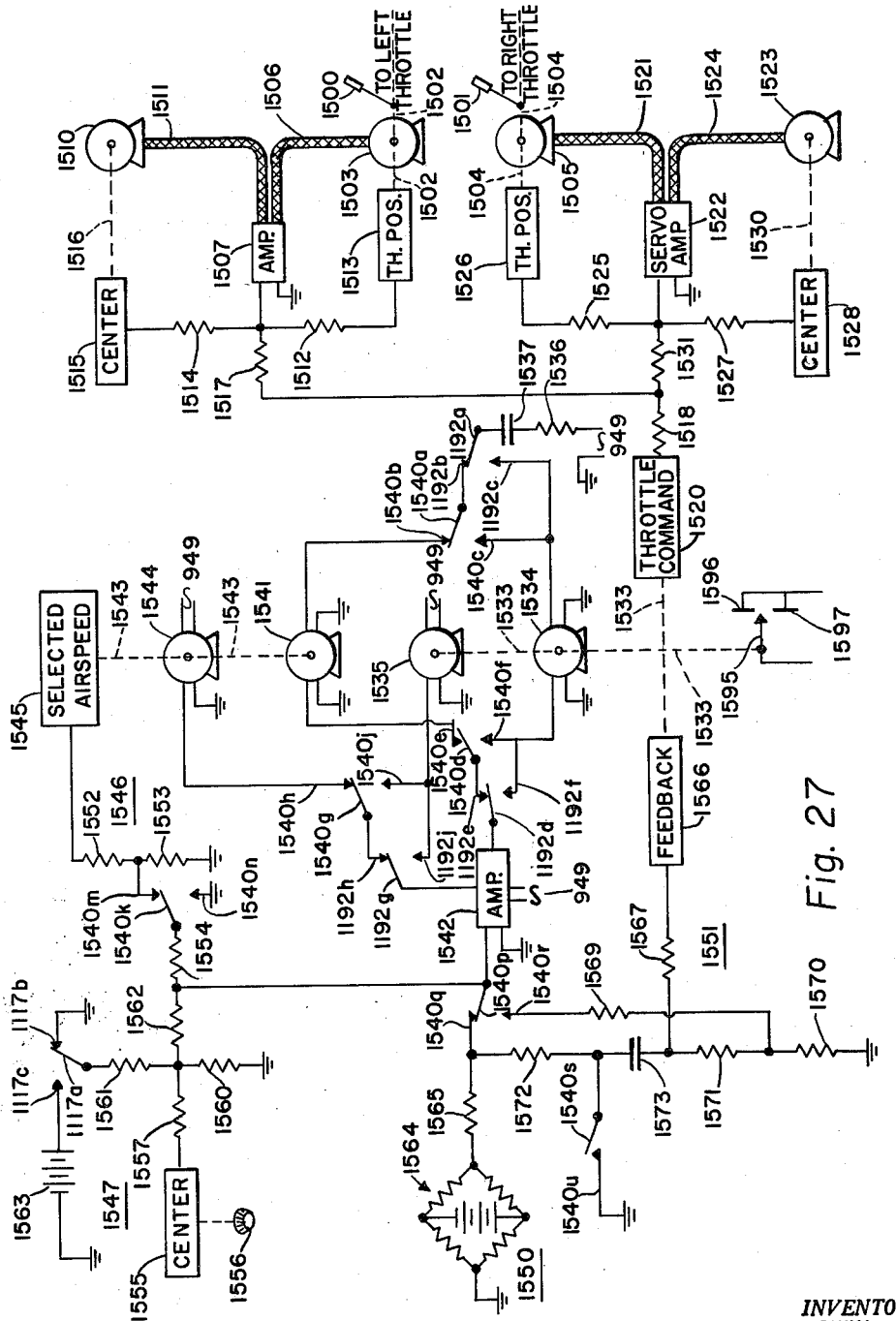
Figure 28:
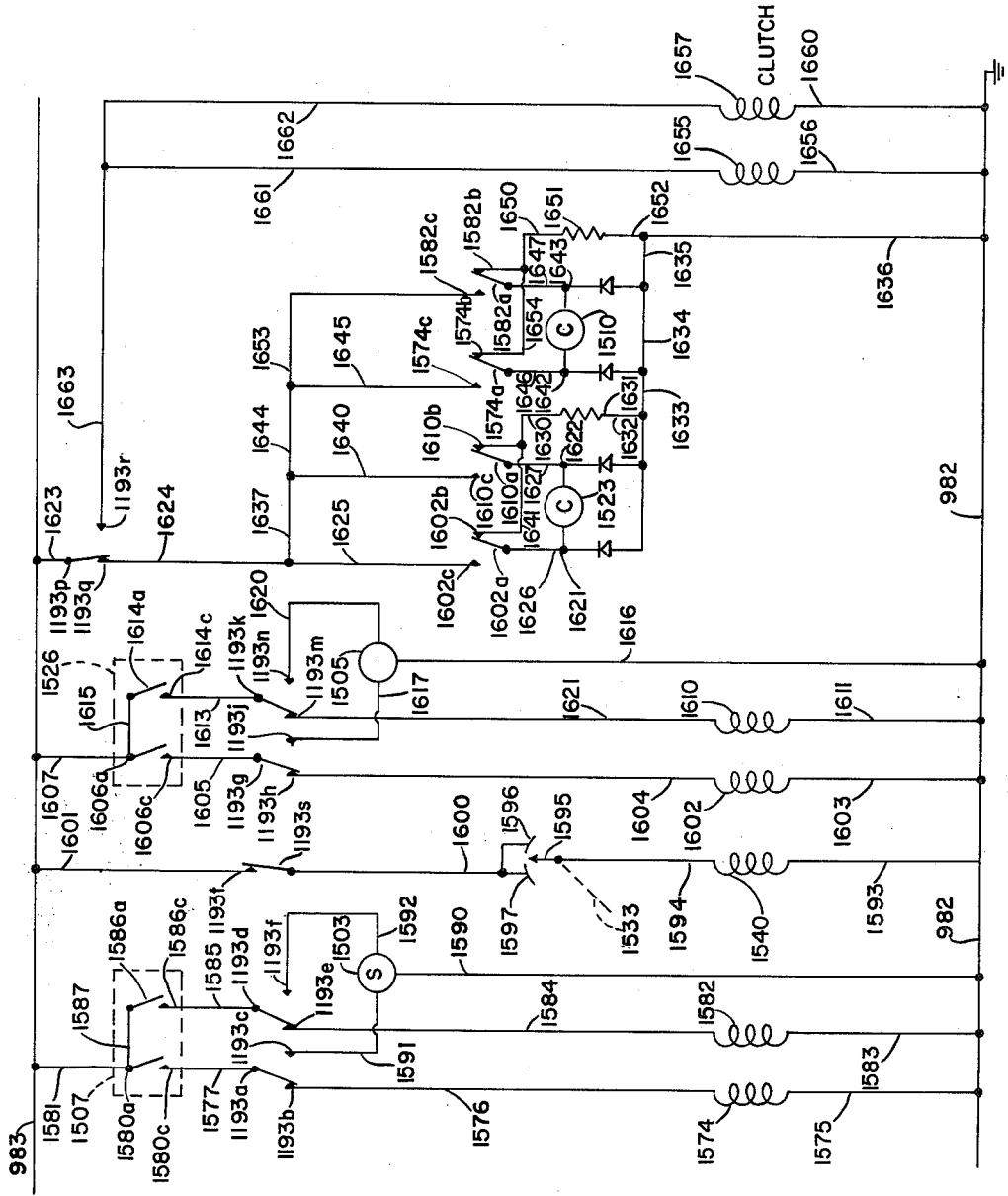

In the drawing, FIGURE 1 is a diagram showing the nonlinear carrier landing path in plan or azimuth; FIGURE 2 shows the developed path in elevation; FIGURE 3 is a simplified system block diagram; FIGURE 4 is a more detailed block diagram of the system; FIGURE 5 is a block diagram giving more details of the signal channels in the ground based portion of the apparatus; FIGURE 6 is a similar diagram of the airborne portion of the apparatus; FIGURE 7 is a block diagram of the marshalling computer, of which FIGURES 8 and 9 show details; FIGURE 10 is a block diagram of the precision computer, of which FIGURE 11 shows details; FIGURE 12 gives details of a typical signal transfer control; FIGURE 13 is a block diagram of the vertical computer, of which FIGURE 14 shows details; FIGURES 15 and 16 show the control circuit of the carrier based equipment; FIGURE 17 shows a radio command link; FIGURES 18 and 19 show respectively the lateral and vertical channels of the automatic pilot for the aircraft; FIGURE 20 shows an airspeed compensator as used in the automatic pilot; FIGURES 21, 22 and 28 show the control circuit of the airborne equipment; FIGURE 23 is a diagram illustrating the altitude control; FIGURE 24 is a diagram illustrating the compass coupler; FIGURE 25 is a diagram illustrating the lateral coupler; FIGURE 26 is a diagram illustrating the vertical coupler; FIGURE 27 is a diagram illustrating the airspeed control; and FIGURE 29 is a diagram of a comparator as used in the equipment.

The general character of the lateral control portion of the invention is dictated by the specialized landing path which experience has indicated to be advantageous for use by naval aircraft in making landings on the flight decks of aircraft carriers. The landing strip on a carrier is relatively tiny, and the vision of an aircraft pilot during flight is considerably restricted in the downwardly forward direction. The problem of landing under such conditions has been met by flying to the carrier, not on a straight line from aft of the flight deck, but rather along a curve which begins with flight beside the carrier at a considerable distance therefrom and in a direction opposite to that of the carrier, and continuing through a 180° turn of large radius, keeping the carrier in sight at the left of the aircraft for almost the entire landing. At the very end of the procedure the pilot must rely on signals given by a Landing Signal Officer for information as to his attitude and rate of descent.

In the automatic system of the present invention the lateral path chosen is not essentially different from the one used by human pilots, and is illustrated in FIGURE 1 as applied to a carrier having a landing strip aligned with its longitudinal axis. The carrier is directed to move into the wind along a path MO, which remains a straight line through the interval required to land an aircraft, and the carrier's forward speed of about 30 knots increases by that amount the permissible landing airspeed of the aircraft, compared to that permissible on a stationary airstrip. The initial path of the aircraft is AB, which ideally is straight and parallel to MO: the point B lies on the perpendicular BN to the line MO through the touchdown point on the carrier. Thereafter the carrier moves along the path MO and the aircraft follows the path BCDEFGO, identified by the reference numeral 30. At the point B the aircraft begins a turn to the left, and between C and D it is turning at a constant radius and hence at a fixed bank angle. From E to F the path of the aircraft is straight, and is displaced by 15° from that of the carrier: from G to O the path is also straight, and coincides with the path of the carrier. The portions BC, DE, FG of the curve are transitional in character, and accompany control surface operation in the aircraft.

The path just identified is the path of the aircraft with respect to the earth's surface, with which the instruments in the aircraft are coordinated. In the practice of the invention the position of the aircraft is determined by radar equipment which is mounted on the carrier and moves with respect to the earth. The aircraft path is replotted to take into account the carrier's movement, and appears as curve A'B'C'D'E'F'GO, which is given the reference numeral 31. It is this curve which the aircraft must appear to follow, when observed by radar, in order to actually make good the desired path relative to the earth. The first path is defined as the "air path" of the aircraft, and the second path is defined as the "ground path" or "radar path" of the aircraft. Point B' may be referred to as the "marshalling gate."

The movement of the aircraft relative to the carrier is defined by a set of Cartesian coordinates whose origin, the touchdown point, lies at O and moves with the carrier, and whose axis of positive ordinates coincides with the longitudinal axis of the landing strip and extends backwards from the carrier. In practice the axis of ordinates is parallel to the path of the carrier, and the displacement of the radar antennas from the touchdown point is compensated for by suitable parallax corrections. The distance OB between the carrier and the aircraft on the initial down wind portion AB of the landing is known as the "down wind displacement" $X_d$ of the aircraft, and is nominally 3000 yards. In a copending application of Berry et al., Serial No. 751,596, filed July 23, 1958 and assigned to the assignee of the present application, there are described details of the subcombination of the present invention whereby the aircraft may begin its landing path at any down wind displacement between 2650 yards and 3500 yards. This copending application also shows a "tromboning" adjustment whereby the maximum ordinate of the path may be adjusted to increase the total path length, so that the time between the instant when and craft crosses the line B'O and its instant of touchdown may be varied.

FIGURE 2 shows the developed vertical landing path 32 of the aircraft, as observed from the carrier, on a different scale: points D', E', F', G, and O are those identified in FIGURE 1. Prior to the point H the aircraft is in level flight at a constant altitude of ideally 160 feet above a datum level, the elevation of the touchdown point, or of about 200 feet above sea level when the carrier is in still water. At the point H the aircraft begins a controlled descent, at least the portion F'I of which is rectilinear, at a constant rate of descent of 12 feet per second, and then returns to level flight at JK at an elevation of about 25 feet above datum. In the copending application of Baldwin et al., Serial No. 751,-597, filed July 23, 1958 and assigned to the assignee of the present application there are disclosed details of the subcombination of the present invention wherein the aircraft may begin its computer glide at any elevation between 130 feet and 190 feet above datum. This second copending application also shows a "final tip" arrangement for producing the ultimate touchdown of the aircraft on the carrier, at a rate of descent of 9 feet per second which takes into account the vertical motion of the deck of the carrier.

The broad aspect of the invention herein is illustrated in FIGURE 3. Radar equipment 50 determines the location of the aircraft with respect to the carrier, and supplies these data to computers 51 which function to derive therefrom signals representative of any needed changes in the lateral or vertical position of the aircraft. These signals are transmitted by a radio command link 52 to the aircraft, and are supplied to aircraft control apparatus 53 which adjusts its control surfaces and power settings. The broken line A—A indicates the division between carrier based equipment and airborne equipment.

In implementing the invention broadly shown in FIGURE 3, certain questions arise which must be considered in the framework of the problem as a whole. It was contemplated that the equipment be useful for controlling not merely one but a plurality of aircraft, which are to land on the carrier in rapid succession, and the question of how much equipment should be replicated to permit rapid handling of a plurality of aircraft became economically important. It was also necessary to consider that a radar of high accuracy is needed in the last part of the approach, when the range of the aircraft from the carrier is small, while a radar of considerable range is needed in the early portion of the approach, where precision is relatively less important. To meet these conflicting requirements it was decided to use two types of radar which are known as the marshalling radar and the precision radar. One precision radar is to be used regardless of how many aircraft are to be supervised: it has high accuracy and its range can be made sufficient for the final portion of the approach. As many marshalling radars are to be provided as are necessary to give the desired rate of aircraft landing.

FIGURE 4 shows the system diagrammatically in somewhat more detail. As in FIGURE 3, the broken line A—A indicates the division between carrier based equipment and airborne equipment. The carrier based equipment includes a marshalling radar 54 whose antenna 55 is continuously swept through 360° in azimuth by a hydraulic rotator 56, an aided tracking unit 57 associated therewith, and a precision radar 60 whose antenna 61 is positioned by a rotator 62 energized either from radar 60 in accordance with change in the position of an aircraft being tracked, or by a servo amplifier 63 in accordance with the output of a resolver 64 fed from aided tracking unit 57. By the latter arrangement it is possible for the operator of the aided tracking unit to direct the precision radar antenna toward a particular aircraft in case there are several in the general field of scan of the radar equipment. It is of course understood that once the precision radar has locked onto a particular aircraft, the slaving from the aided tracking unit is no longer necessary and is interrupted.

Marshalling radar 54 operates to give a P.P.I. display of the location of all aircraft in the area surrounding the carrier. Aided tracking unit 57 comprises index means movable in apparent super-position on the marshalling radar display, means for causing movement of the index into coincidence with any aircraft image in the display, and output means for resolving this movement of the index into components perpendicular and parallel to the axis of the landing strip and for representing these components as alternating voltages of variable amplitude and reversible phase. Thus in FIGURE 4, outputs 65 and 66 are representative of the abscissa $X_m$ of the position of the aircraft being tracked, and outputs 67 and 70 are representative of the ordinate $Y_m$ of that position.

Precision radar 60 supplies a second set of alternating voltage outputs 71 and 74 representative of the abscissa $X_p$ and ordinate $Y_p$ of the position of the aircraft, determined independently of aided tracking unit 57 and its human operator, and further alternating voltage outputs 72 and 73 representative of the altitude of the aircraft and its speed. Outputs 71, 72, 73, and 74 are derived from the same source that energizes aided tracking unit 57. A further "lock-on" output 78 is supplied when the precision radar has locked onto a particular aircraft. This output is used to disconnect rotator 62 from servo amplifier 63, and is also used in a lateral computer 76. Lock-on is arranged to occur when the craft position is such that its ordinate is greater than 2134 yards, as indicated by line 79 in FIGURE 1.

Radar equipment 54—57 and 60—64 can be of any suitable type, and no detailed disclosure of these units has been incorporated in the present specification.

FIGURE 4 shows that the computers 51 of FIGURE 3 are two in number, a lateral computer 76 to which are supplied outputs 65 and 67 of unit 57 and outputs 71 and 74 of radar 60, and a vertical computer 77 to which are supplied outputs 72, 73, and 74 of radar 60. Computers 76 and 77 will be discussed more fully in connection with FIGURES 7–14. Lateral computer 76 supplies a pair of outputs 80 and 81 representative respectively of the lateral error of the aircraft and its scheduled bank, and vertical computer 77 supplies an output 82 representative of the vertical error of the aircraft. Outputs 80, 81, and 82 are supplied as proportional signals to radio command link 52, which also is supplied with switching signals as will be discussed more fully below.

Aircraft control apparatus 53 of FIGURE 3 is shown in FIGURE 4 to comprise an automatic pilot 83 normally stabilizing the attitude of the aircraft about three axes, and having a lateral control channel 84, better shown in FIGURE 18, and a vertical control channel 85, better shown in FIGURE 19. A compass 86 supplies an output 87 to a compass coupler 90, better shown in FIGURE 24, which in turn supplies an output 91 to automatic pilot 83. Radio command link 52 supplies a pair of outputs 92 and 93, corresponding to outputs 80 and 81 of lateral computer 76, to a lateral coupler 94, better shown in FIGURE 25, and the latter supplies to automatic pilot 83 an output 95 which combines 92 and 93. Radio command link 52 also supplies an output 96, corresponding to output 82 of vertical computer 77, to a vertical coupler 97, better shown in FIGURE 26. An altitude control 100, better shown in FIGURE 23, also supplies an output 101 to vertical coupler 97, and coupler 97 supplies to automatic pilot 83 a pair of outputs 102 and 103, output 103 being "proportional" and output 102 being "integral," as will be explained below.

Aircraft control apparatus 53 also includes an airspeed control 104 better shown in FIGURE 27, which acts at 105 and 106 to stabilize the throttles 107 of the aircraft. By a connection 110 radio command link 55 is enabled to reduce the airspeed of the aircraft from its normal value to a predetermined lower value.

The dive brakes of the aircraft are shown at 111 to be controllable by radio command link 52 through a connection 112.

The carrier based equipment of the invention is shown in still further detail in FIGURE 5, particularly as to computers 76 and 77. Lateral computer 76 is shown to comprise a marshalling coordinate translator 113 better shown in FIGURE 7, a precision coordinate translator 114 better shown in FIGURE 10, and a pair of signal transfer controls 115 and 116, better shown in FIGURE 12. Translator 113 derives from outputs 65 and 67 or unit 57 a pair of further outputs 120 and 121 representative respectively of the marshalling lateral error $\epsilon_m$ and scheduled bank $\phi_m$ of the aircraft, and translator 114 derives from outputs 71 and 74 of radar 60 a pair of similar outputs 122 and 123 representative respectively of the precision lateral error $\epsilon_p$ and scheduled bank $\phi_p$ of the aircraft. Transfer control 115 normally converts output 120 to a form $\epsilon_l$ useful at 80 to modulate the transmitter 118 of the radio command link, having an antenna 119, and transfer control 116 normally converts output 121 to a form $\phi_l$ useful at 81 to modulate transmitter 118 of command link 52. However, when the aircraft reaches the transfer area, transfer control 115 acts on output 122 instead of on output 120, and transfer control 116 acts on output 123 instead of output 121.

Vertical computer 77 is shown in FIGURE 5 to comprise a vertical coordinate translator 130 and a signal transfer control 131. Translator 130 receives outputs 72, 73, and 74 from radar 60 and derives therefrom an output 132 representative of the vertical error of the craft: this is converted by transfer control 131 to a form $\epsilon_n$ useful at 82 to modulate transmitter 118. The transmitter sends out from its antenna 119 a single carrier upon which is modulated the data supplied by transfers 115, 116, and 131.

FIGURE 6 is a more detailed showing of the airborne equipment. In the figure automatic pilot 83 is shown to control the rudder 133, ailerons 134, and elevators 135 of the aircraft through connections 136, 137 and 140 respectively through summing circuits and amplifiers indicated generally at 141 and better shown in FIGURES 17 and 18. In addition to the outputs 91, 95, 102, and 103 from the compass, lateral coupler, and vertical coupler, the summing circuits of the automatic pilot are influenced, as indicated generally at 142, by a side slip sensor, by yaw rate, roll rate, and pitch rate gyroscopes, and by roll, pitch and up elevator outputs from a vertical gyroscope. An airspeed compensator 143 is shown as influencing at 144 the vertical coupler, at 145 the lateral coupler, and at 146 the summing circuits. The signals to couplers 94 and 97, to dive brakes 111, and to airspeed control 104 are shown as derived by the receiver 147 of the radio command link through the antenna 150. Outputs 105 and 106 of airspeed control 104 are shown as energizing throttle servomotors 151 and 152 connected to throttle levers 153 and 154 through appropriate mechanical connections 155 and 156, which are extended to control the engine throttles, and which include suitable override mechanism.

FIGURE 7 shows marshalling coordinate translator 113 to comprise an X servo system 157 and a Y servo system 160. Each of these systems is of the self balancing type which supplies a mechanical output in accordance with an input signal. Thus servo system 157 includes a motor which positions shafts 161 and 162 in accordance with an input at 163, and servo system 160 includes a motor which positions shafts 164, 165 and 167 in accordance with an input at 166. A switch 168 is closed by shaft 167 whenever the value of Y is less negative than −440.

The inputs at 163 and 166 are selected by energization of a relay winding 170, to displace movable contacts 170a and 170d out of normal engagement with fixed contacts 170b and 170e and into engagement with fixed contacts 170c and 170f, all respectively. Contact 170c is connected to an initial $X_m$ set signal voltage source 180, and contact 170f is connected to an initial $Y_m$ set signal voltage source 181. Contact 170b is connected to receive an output voltage at 65 from unit 57, and contact 170e is connected to receive an output voltage at 67 from unit 57. Contacts 170a and 170d are connected to supply inputs 163 and 166 respectively.

Shafts 161 and 164 are connected to a converter 182 better shown in FIGURE 8, which gives an alternating output voltage 120, and shafts 162 and 165 are connected to a signal generator 184, better shown in FIGURE 9, which gives an alternating output voltage 121. Referring to FIGURE 8, shafts 161 and 164 are shown diagrammatically as adjusting in mutually perpendicular directions the position of a contactor 186 which engages the surface of a sheet of resistive conducting plastic forming a track 187. The center line 190 of this track follows the curve A′B′C′D′E′ to a reduced scale, and the width of the track corresponds on the same scale to the permitted deviation of the aircraft from the desired path. The edges 191 and 192 of the track are formed by electrical conductors extending the full length of the curves: no conductors are applied to the ends 193 and 194 of the track. Track 187 is so positioned that the tangent to center line 190 at end 194 is parallel to the direction of movement of contact 186 produced by shaft 164.

Conductors 191 and 192 are connected by conductors 195 and 196 to the terminals of the secondary winding 197 of a transformer 200 having a primary winding 201 energized from a source 202 of alternating voltage which also supplies aided tracking unit 57 of FIGURES 4 and 5. Secondary winding 197 is center tapped at 203, and the output 120 of the converter appears on conductors 198 and 199, connected to contactor 186 and center tap 203, respectively. The voltages supplied by devices 180 and 181 are also derived from source 202, and their outputs are alternating voltages.

Contactor 186 is positioned by servo systems 157 and 160 in accordance with the actual position of the aircraft with respect to the radar, to the same scale as that of track 187. Thus as long as the aircraft is at the center of the desired path, the output of converter 182 is zero. If the aircraft is not in a position at the center of the desired path, converter 182 supplies an output proportional to the displacement of the aircraft from the center of the path. A study of FIGURE 8 will make evident the need for this converter: when the craft is near the beginning of the approach its displacement from the center of the track is measured in terms of X, but later on, at the top of the curve, this displacement is measured in terms of Y, and between these points both X and Y are factors of the displacement.

Referring now to FIGURE 9, shafts 162 and 165 are shown diagrammatically in generator 184 as adjusting in mutually perpendicular directions the position of a contactor 204 which engages the surface of a second track 205 having the same shape as track 187. Track 205 is made up of resistive plastic portions 206 and 207 between further portions 210, 211, and 212 of metal or some other good electrical conductor. The boundaries between conductive and resistive portions of the track are perpendicular to the center line, and there are no conductors along the curved edges of portions 206 and 207.

Generator 184 includes a transformer 213 having a secondary winding 214 and a primary winding 215 connected to source 202. Conductive portions 210 and 212 of track 205 are connected to one terminal 216 of secondary winding 214, and conductive portion 211 is connected to the other terminal 217 of the secondary winding. The output 121 of the generator appears as an alternating voltage on conductors 220 and 221, connected to the contactor 204 and transformer terminal 216, respectively.

The purpose of generator 184 will be evident when it is recalled, as was pointed out in connection with FIGURE 1, how the lateral path includes a portion of constant curvature between two straight portions. Aircraft operation at a constant rate of turn requires a constant input to the automatic pilot, and to get such a signal from converter 182 alone, the craft would have to be continuously displaced from its desired path. However, by using generator 184 a signal representative of the desired bank of the aircraft at any position along the approach path is available, and the craft may now follow the desired path exactly.

The decision to use a plurality of radars in successive portions of the approach raised the problem of change over from one radar to the other, and this will be discussed more fully in connection with FIGURES 15 and 16. At this point it need only be said that tracks 187 and 205 are so constructed as to extend well into the area served by the precision radar, so that no gaps in aircraft control can occur. The change-over is made during the portion of the approach between E' and F' in FIGURE 1, when the craft is theoretically in straight and level flight at the center of the path. The copending application first referred to above discloses a subcombination of the present system in which means are provided to permit the apparatus to assume control of an aircraft smoothly regardless of any lateral displacement it may have at the instant of transfer.

FIGURE 10 is a diagrammatic showing of precision coordinate translator 114, which is seen to comprise a summing amplifier 222 supplying an output at 122 representative of the joint effect of a pair of inputs 224 and 225, and a servo system 226 of the type which supplies a mechanical output in accordance with an input signal. Servo system 226 positions a shaft 227 in accordance with an input at 230. Inputs 224 and 230 are selected by operation of a relay 232 to displace a pair of movable contacts 232a and 232d out of normal engagement with a first pair of fixed contacts 232b and 232e and into engagement with a second pair of fixed contacts 232c and 232f, all respectively. Contact 232b is connected to an initial $X_p$ set signal voltage source 242, contact 232e is connected to an initial $Y_p$ set signal source 243, contact 232c is connected to an X parallax compensator 244, to which output 71 of radar 60 is supplied as an alternating voltage input, and contact 232f is connected to a Y parallax compensator 245, to which the output 74 of radar 60 is supplied as an alternating voltage input. Contacts 232a and 232d are connected to supply inputs 244 and 230, respectively. The output of parallax compensator 245 is also supplied to a comparator 246 discussed in connection with FIGURE 15. The voltages supplied by elements 242, 243, 244, 245 and 60 are derived from source 202.

Shaft 227 is shown as extended to drive a movable contact 247 through a path made up in part by a fixed contact 250. When the two contacts are in engagement, an electrical circuit is completed from a source of alternating voltage better shown in FIGURE 16 through a conductor 252, movable contact 247, fixed contact 250, conductor 253 and the relay winding 254 to ground at 256, one terminal of the source being understood to be grounded. Winding 254 displaces a movable contact 254a out of normal engagement with a fixed contact 254b and into engagement with a second fixed contact 254c. Contact 254b is grounded at 263. Contact 254c is connected to a schedule bank signal voltage source 264 energized from source 202. Output 123 of the precision coordinate translator is supplied at movable contact 254a as an alternating voltage.

Shaft 227 is also connected to perform a further function, best shown in FIGURE 15, and to adjust a signal generator 266 of which the output 225 is a joint function of X and Y. Whereas in the marshalling coordinate translator the lateral error came out directly, in the precision coordinate translator this error must be determined by comparing the actual position of the aircraft with a computed value. FIGURE 11 shows generator 266 to comprise a voltage divider 267 having a slider 270 adjustable by shaft 227 along a winding 271 of 180° angular extent. This winding is tapped at every 15° beginning at 60°: the two final taps are connected directly to the adjacent end of the winding, which is grounded at 272, and the remaining taps are shunted by resistors 273, 274, 275, 276, 277, and 280, respectively, selected with regard to the resistance of winding 271 to give a suitable characterized voltage between slider 270 and ground when the other end of the winding is maintained at an alternating potential with respect to ground by a conductor 281 energized from source 202. The signal on slider 270 comprises the output 225 from source 266.

From the foregoing it will be evident that the precision coordinate translator does not determine directly the lateral error of the aircraft, but computes it by comparing the X coordinate of the actual position of the aircraft with a simulation of the center of the path computed from the Y coordinate of the actual position of the aircraft. It is assumed that no appreciable error in the simulation occurs because of the implicit assumption that the Y coordinate represents a location of the aircraft on the center of the path: this assumption is found correct in practice, since an aircraft in the precision portion of the approach is moving substantially parallel to the carrier, and the change of X with Y is relatively slight. It will also be evident that the scheduled bank output available has only two possible values, one of which is zero: the turn of the aircraft between points F and G is so small and is made so quickly that no attempt to program the bank entry and recovery is made.

FIGURE 12 is illustrative of signal transfer controls 115, 116, and 131, and specifically shows the first. Outputs 120 and 122 of translators 113 and 114 appear at the left of the FIGURE, as applied to the movable contacts 286a and 287a of a pair of relays, the windings 286 and 287 of which act to displace the movable contacts out of normal engagement with a first pair of fixed contacts 286b and 287b and into engagement with a second pair of fixed contacts 286c and 287c, all respectively. The energizing circuit for relays 286 and 287 appears in FIGURE 16. Contacts 286b and 287b are grounded at 296 through a common resistor 297. Contacts 286c and 287c are connected to energize a servo system 313, like system 157, giving a mechanical output at 314 whose sense and magnitude are determined by the phase and amplitude of the signal supplied to the system.

Servo system 313 functions to adjust a signal output device in the form of a phase shifter 338 having an input cable 339 and an output cable 340. By this means the servo 313 operates to supply on cable 340 a signal representative of the input to transfer control 115, and of a nature suitable to modulate the command link transmitter, as generally shown at 80 in FIGURE 5, and as specifically shown in FIGURE 17.

It will be appreciated that transfer control 116 can be in every way similar to the unit just described, and will include a phase shifter 341, FIGURE 17, similar to phase shifter 338 and driven by a motor shaft 342, as well as relays 344 and 345, FIGURE 16, corresponding to relays 284 and 285 in FIGURE 12. Transfer 131 is generally the same, and includes a phase shifter 348, FIGURE 17, driven by a motor shaft 349, but since this unit is not used in the marshalling phase of the apparatus only one relay is needed, and is identified in FIGURE 16 by the reference numeral 486.

FIGURE 13 illustrates the vertical coordinate translator 130 of the carrier based apparatus. The vertical control portion of the system is based on a somewhat different idea than the lateral control portion previously discussed. The latter requires only that the aircraft be maintained on a line, but the vertical control equipment must cause the aircraft to follow a line which ends at the touchdown point on the carrier regardless of the speed of the aircraft and of the carrier. To accomplish this a desired path in elevation is computed for the aircraft in which its scheduled altitude at each instant is a function of the time to touchdown, and this in turn is computed from the observed range and observed closing speed of the aircraft measured at the carrier.

Referring again to FIGURE 2, it will be seen that the desired final portion of the landing comprises a glide of nine feet per second, preceded by level flight at 25 foot elevation, preceded by a glide at 12 feet per second from the nominal elevation of about 160 feet. The level portion at 25 feet elevation is provided to give a standard aircraft altitude upon which to base final corrections for deck motion, as described in the second co-pending application referred to above. For present purposes let it be arbitrarily assumed that the time required to fly from the point I, FIGURE 2, where the command for the initial glide is rescinded, to the touchdown point is 12.5 seconds. The descent from 160 feet to point I at 12 feet per second, requires about 11 seconds so that the time required to make the entire descent is 23.5 seconds. It is possible to construct a signal device having a voltage output, for a linearly varying input, which follows the curve KJGIF′ of FIGURE 2 and continues in the direction IF′, as shown by the broken line segment 33 in FIGURE 2. For each combination of $Y_p$ and aircraft speed $s$ there is a particular value of time to touchdown $t$ given by the equation $Y_p = st$, and by adjusting a signal device in accordance with $t$, a computed altitude $h$ from which an aircraft can descend in time $t$ is obtained. For large values of $t$ this computed $h$ lies above the value of 160 feet at which the aircraft is intended to be flying: as the aircraft comes closer to the carrier the computed $h$ decreases. When computed $h$ is equal to H, the actual altitude, the aircraft is at the right distance from the carrier to begin the descent, and should be controlled thereafter to follow the predetermined glide path in elevation. The computation of $h$ from the speed and Y coordinate of the aircraft, its comparison with actual H, and the control of the craft in elevation after the computed $h$ becomes equal to the actual H, are the functions performed by vertical coordinate translator.

Precision radar 60 is shown in FIGURE 13 as giving an output 72 representative of the observed altitude H of the aircraft, an output 74 representative of the observed Y coordinate $Y_p$ of the aircraft, and an output 73 representative of the speeds of the aircraft, or its rate of movement with respect to the touchdown point on the moving carrier. All the signals supplied by radar 60 are derived from source 202.

The vertical coordinate translator 130 is shown as comprising a summing amplifier 350 which supplies a signal on conductor 351 of the translator in response to one or both of a pair of inputs 352 and 353. Input 353 is derived, through a parallax adjuster 354 energized from source 202 and a conductor 355, either from signal 72 or from an initial H set device 356, as determined by a relay winding 357 which actuates a plurality of movable contacts 357a, 357d, and 357k out of normal engagement with a first set of fixed contacts 357b, 357e, and 357m and into engagement with a further set of fixed contacts 357c, 357f, and 357n. Device 356 is connected to contact 357b, radar output 72 is connected to contact 357c, and conductor 355 is connected to contact 357a.

Input 352 for amplifier 350 is derived from one or the other of two sources. The first is a signal device 361 energized from source 202 and adjusted through a mechanical connection 362 by a servo system 363 which operates in accordance with the signal on conductor 351 supplied through an isolating resistor 365. The input to servo system 363 can be grounded by normally open relay contacts 511g and 511j. A further signal device 364 energized from source 202 is also actuated by servo system 363.

Translator 130 is shown to further comprise a motor control amplifier 375 energized at 376 from an adder 377 having two inputs on conductors 380 and 382. Conductor 380 is connected to movable relay contact 357d and normally supplies to adder 377 the output of an initial $Y_p$ set device 383 connected to contact 357e and energized from source 202. When the relay is operated output 74 from radar 60 replaces this signal, being supplied through a parallax connector 384 and relay contact 357f.

Amplifier 375 is shown as energizing through a cable 391 a servomotor 392 whose output shaft 393 operates a multiplier 396, energized with the signal on a conductor 397 which in the normal condition of relay 357 is connected by contacts 357k and 357m and conductor 400 to an initial $s$ set device 401. When relay 357 is operated conductor 397 is connected through relay contacts 357k and 357n to receive the output 73 from radar 60. The output from multiplier 396 comprises input 382 to adder 377. The signals from devices 383 and 401 are derived from source 202, and are in phase opposition.

The inputs to adder 377 in the operated condition of relay 357 are thus $Y_p$ on conductor 380 and $s\theta$ on conductor 382, $\theta$ being the extent of operation of motor 392. For a zero signal to amplifier 375, required to stop motor 392, the two signals must be equal and opposite, that is, $Y_p = s\theta$. This means that $\theta$ is a measure of $t$, and a computed H is derived from $t$ in the following manner.

Shaft 393 of motor 392 is extended to actuate an altitude scheduling device 403, better shown in FIGURE 14, which is energized from source 202 and whose output is supplied by conductors 404 and 405, FIGURE 13, when relay contacts 410c and 410a are closed, to comprise input 352 to amplifier 350. The output of device 403 is also supplied through conductors 404 and 413 to comprise a first input to a comparator 414, which also appears in FIGURE 16, and which has a second input supplied on conductor 415 from source 364. Initially because of the choice of initial set values, and later because of the large value of $Y_p$, the voltage on conductor 415 is less than the signal from device 403, comparator 414 remains inoperative, and amplifier 350 has only one input, that indicated at 353, but when the voltage on conductor 404 becomes less than that on conductor 415 the comparator energizes relay winding 410 to add the output for device 403 as a second input.

Scheduled altitude computer 403 is shown in more detail in FIGURE 14. The shaft 393 of motor 392 is shown as operating the sliders 420 and 421 of a pair of voltage dividers 422 and 423 having identical linear windings 424 and 425, all respectively. Winding 424 is tapped at 426, 427, 430, 431, 432, 433, and 434, comprising respectively 60°, 75°, 90°, 105°, 120°, 135°, and 150° out of a total range of 357°. Shunting resistors 435, 436, 437, and 440 and shunting conductors 441, 442, and 443 are provided to properly characterize voltage divider 422.

Similarly the winding 425 is tapped at 444, 445, 446, 447, 450, 451, 452, and shunting resistors 53, 54, 455, and 456, and shunting conductors 457, 460, and 461 are provided to characterize voltage divider 423. A resistor 462 is connected in series with winding 424, a resistor 463 is connected in series with winding 425, and the two series circuits are connected, by conductors 464, 465, and 466 and conductors 467, and 470, in parallel to A.C. source 202. A further voltage divider 471 has its winding 472 connected across source 202, and its slider 473 grounded at 474. Sliders 420 and 421 are connected through summing resistors 475 and 476 to output conductor 404.

Voltage dividers 422 and 423 are so mounted and sliders 420 and 421 are so connected to shaft 393 that when slider 420 for example is at tap 433, that is, 135° displaced from the bottom of winding 424, slider 421 is half way between taps 451 and 452. By this simple expedient the same result is accomplished as would be accomplished by the use of a physically larger single winding in which taps could be spaced by only 7½°. This is accomplished at the expense of losing 7½° of rotation at each end of the range of motion of the sliders, but this in turn is compensated for by the use of resistors 462 and 463, of which the resistance is equal to that of 7½° along the windings. The full travel of the sliders is in excess of any scheduled altitude output which may be needed in practice, and by adjustment of slider 473 the touchdown point may be brought into correlation with the desired lower end of the travel of sliders 420 and 421.

Referring once against to FIGURE 13, the output on conductor 351 is interrupted by a relay 486 which displaces a movable contact 486a out of normal engagement with its first fixed contact 486b and into engagement with a second fixed contact 486c. Fixed contact 486b is grounded, fixed contact 486c receives conductor 351, and movable contact 486a is connected to supply output 132 to the vertical signal transfer. Relay 486 is a portion of signal transfer control 131.

Shaft 393 of motor 392 is also extended to accomplish a further function as shown in FIGURE 16. Relay 410 also performs other functions as shown in FIGURE 16.

FIGURES 15 and 16 together give the details of control circuitry for the carrier based equipment not shown in previous figures. Extending across the bottom of both figures is a ground bus 493 and extending across the top of both figures is an A.C. bus 494 energized from source 202 through a fuse 495 when a switch 496 is closed. The figure is arranged to show its control functioning, the flow of control being from upper left to lower right. To this end relay contacts have been placed where their function is performed, rather than at the winding which operates them. Throughout this specification each relay is identified by a reference numeral applied to its winding, and the contacts are identified by that number with a letter suffix. The movable contacts are shown in the positions they occupy when their respective windings are de-energized.

Input 78 from precision radar 60 is shown as energizing the winding of a lock-on relay 499.

One side of a white pilot light 497 is grounded through conductor 500. The other side is connected to bus 494 through conductors 501 and 502.

One side of a red pilot light 503 is grounded through conductor 504. The other side may be connected to bus 494 through conductors 505 and 506, normally open relay contacts 507c and 507a, conductor 510, normally closed relay contacts 511a and 511b, and conductors 512 and 502, or through conductors 505 and 513, normally open relay contacts 514a and 514c, and conductor 515.

One side of a ready interlock relay winding 514 is grounded through conductor 516. The other side may be connected to bus bar 494 either through conductors 517 and 520, normally closed relay contacts 287e and 287d, conductor 521, switch 168, and conductor 523 or through conductors 517 and 524, normally closed relay contacts 345e and 345d, conductors 525 and 521, switch 168, and conductor 523.

One side of a blue pilot light 526 is grounded through conductor 527. The other side may be connected to bus 494 either through conductors 530 and 531, normally open relay contacts 287g and 287j and conductor 532, or through conductors 530 and 533, normally open relay contacts 345g and 345j, and conductor 534.

One side of a ready relay winding 170 is grounded through conductor 536. The other side may be connected to bus bar 494 through four different paths. The first path includes conductors 537 and 540, normally open relay contacts 170g and 170j, conductors 541 and 542, normally closed relay contacts 286d and 286e, and conductor 543. The second path includes conductors 537 and 540, relay contacts 170g and 170j, conductors 541 and 544, normally closed relay contacts 344d and 344e, and conductor 545. The third path includes conductors 537 and 540, relay contacts 170g and 170j, conductor 546, normally closed spring return switch 547, and conductor 550. The fourth path includes conductor 537, normally closed relay contacts 514e and 514d, conductors 551 and 552, normally open spring return ready switch 553, and conductor 554.

One side of a green pilot light 555 is grounded through conductor 556. The other side may be connected to bus 494 through four different paths. The first path includes conductors 557 and 552, switch 553, and conductor 554. The second path includes conductors 557 and 551, relay contacts 514d and 514e, conductor 540, relay contacts 170g and 170j, conductors 541 and 542, relay contacts 286d and 286e, and conductor 543. The third path includes conductors 557 and 551, relay contacts 514d and 514e, conductor 540, relay contacts 170g and 170j, conductors 541 and 544, relay contacts 344d and 344e, and conductor 545. The fourth path includes conductors 557 and 551, relay contacts 514d and 514e, conductor 540, relay contacts 170g and 170j, conductor 546, switch 547, and conductor 550.

One side of a transfer start relay winding 507 is grounded through conductor 560. The other side may be connected to bus 494 either through conductor 561, normally open relay contacts 499d and 499f, conductors 559 and 562, normally open relay contacts 507d and 507*f*, and conductor 563, or through conductor 561, relay contact 499*d* and 499*f*, conductors 559 and 564, an arcuate contact 565, a movable contact 566 driven by shaft 227 (see FIGURE 10) and conductor 567.

One side of a time delay relay winding 570 is grounded through conductor 571. The other side may be connected to bus 494 through conductor 572, normally open relay contacts 507*j* and 507*g*, and conductor 573.

One side of a transfer end relay winding 511 is grounded through conductor 574. The other side of the winding may be connected to bus 494 through conductor 577, normally open relay contacts 570*c* and 570*a*, and conductor 582.

One side of a precision standby relay winding 232, also shown in FIGURE 10, may be connected to bus 494 through conductors 583 and 584, normally open relay contacts 499*a* and 499*c*, and conductor 588, and one side of a vertical standby relay winding 357, also shown in FIGURE 13, may be connected to bus 494 through conductors 585 and 584, relay contacts 499*a* and 499*c*, and conductor 588. The other sides of these relays are connected to ground through conductors 586 and 587 respectively, conductor 590, comparator 246, and conductor 591.

The energizing circuit for schedule bank relay 254 of FIGURE 10 is shown in FIGURE 15 as connected to positive bus 494.

In FIG. 16 one side of a rescind nose-down relay winding 592 is grounded through conductor 593. The other side may be connected to bus 494 through conductor 594, an arcuate contact 595, a movable contact 596 driven by shaft 393, (see FIGURE 13), conductor 597, normally open relay contacts 357*p* and 357*r*, and conductor 600.

One side of a nose-down relay winding 410, also shown in FIGURE 13, is grounded through conductor 601. The other side may be connected to bus 494 either through conductors 602 and 603, normally open relay contacts 410*d* and 410*f*, conductor 604, normally open relay contacts 357*u* and 357*s*, and conductor 605, or through conductors 602 and 606, comparator 414, also shown in FIGURE 13, and conductor 607.

One side of a marshalling error relay winding 286, also shown in FIGURE 12, is grounded through conductor 610, and one side of a marshalling program relay winding 344 (also shown in FIGURE 12) is grounded through conductor 611. The other sides of the relays are connected to a junction point 612 through conductor 613, normally closed relay contacts 287*k* and 287*n*, and conductor 614 and through conductor 615, normally closed relay contacts 345*k* and 345*n*, and conductor 616, respectively. Junction point 612 may be connected to bus 494 through conductors 617 and 620, normally open relay contacts 170*k* and 170*n*, and conductor 621, through conductors 617 and 622, normally open relay contacts 286*g* and 286*j* and conductor 623, or through conductor 624, normally open relay contacts 344*j* and 344*g* and conductor 625.

One side of each of a precision error relay winding 287 and a precision program relay winding 345, discussed in connection with FIGURE 12, and one side of a servo lock relay winding 436, is grounded, through conductors 626, 627 and 630 respectively. The other sides of these windings are connected to bus 494 through conductors 631, 632, and 633, conductors 634, 632, and 633 and conductors 635, and 633 respectively, normally open relay contacts 507*n* and 507*k*, and conductor 636.

FIGURE 17 is a schematic showing of the radio command link 52 in considerable functional detail. Transmitter 118 appears at the left of the figure, and receiver 147 at the right. In the transmitter a 90 cycle generator 637 is shown as supplying a first output 640 to a first modulated oscillator 641, and three further outputs 339, 643, and 644 to phase shifters 338, 342, and 348. Phase shifter 338 has already been discussed in connection with signal transfer control 115, and is shown in FIGURE 12 to be adjusted by the shaft 314 of servo 313. In the same way phase shifter 341 gives the output of signal transfer control 116 and phase shifter 348 gives the output of signal transfer control 131. The output of each phase shifter is a 90 cycle alternating voltage whose phase angle relative to the output supplied by generator 637 is representative of the rotation of the phase shifter shaft, that is, of the lateral error, scheduled bank, and vertical error of the craft for phase shifters 338, 341, and 348, respectively. The outputs 340, 650, and 651 of the respective phase shifters are supplied to further modulate oscillators 652, 653, and 654, and the oscillators supply to a mixer 655 outputs 656, 657, 660, and 661, all respectively. In order that the various signals may later be separated, the oscillators operate at distinguishable frequencies, normally 20,000 cycles per second, 16,700 cycles per second, 14,350 cycles per second, and 11,900 cycles per second.

FIGURE 17 shows a plurality of keyed oscillators 662, 663, and 664 controlled by closing the contacts of certain relays, the windings of which are energized as shown in figures previously described. Thus oscillator 662 is keyed upon closure of normally open contacts 514*g* and 514*j* of relay 514 shown in FIGURE 15, or upon closure of normally open contacts 507*s* and 507*u* of relay 507 also shown in FIGURE 15. Oscillator 663 is keyed upon closure of normally open relay contacts 507*p* and 507*r*, unless normally closed relay contacts 511*d* and 511*e* are open: both these relays are shown in FIGURE 15. Oscillator 664 is keyed upon closure of both normally open relay contacts 592*a* and 592*c* and normally open relay contacts 410*g* and 410*j*: both of these relays are shown in FIGURE 16. Oscillators 662, 663, and 664 operate at frequencies which are mutually distinguishable, and which are also distinguishable from the frequencies of oscillators 641, 652, 653, and 654. Normally the frequencies of the keyed oscillators are 4000 cycles per second, 3500 cycles per second, and 3000 cycles per second respectively.

FIGURE 17 shows a voice channel including a microphone 665, connected at 666 to an amplifier 667 which includes filters to limit the voice frequencies to the range of 200 to 2500 cycles per second. Oscillators 662, 663, and 664 and amplifier 667 are connected to a mixer 670 as at 671, 672, 673, and 674 respectively. Mixers 655 and 670 may include such isolation stages as are required to prevent interaction between the various signals supplied thereto: their outputs 675 and 676 are supplied to a further mixer and amplifier 677, which supplies to a modulator 680 an output 681 which includes all the proportional signals, all the keyed signals, and the voice signal. Modulator 680 supplies a signal 682 to and may comprise a part of transmitter 683, and there is radiated from the antenna 684 a carrier modulated with the sum of the input signals.

It should be appreciated that details of command link 52 are shown by way of illustration only, and that any known generators, oscillators, modulators, transmitters, etc., can be used. In the preferred form of the invention generator 637 is tuning fork controlled, oscillators 641, 652, 653, and 654 are carrier shift modulated, oscillators 662, 663, and 664 are tone keyed, and transmitter 683 is phase modulated, the carrier frequency being 235.4 megacycles per second.

This completes the description of the carrier based portion of the apparatus. In the aircraft the electromagnetic radiations are picked up by a receiving antenna 685 and supplied to receiver 686 which amplifies and demodulates them to remove the carrier. Reception of a signal at an acceptable level supplies an output from receiver 686 along the conductor 687 to operate a switch 690, the normally open contacts 690*a* and 690*c* of which are shown in FIGURE 21. The complex audio signal is supplied at 691 and 692 to a pair of amplifiers 693 and 694. The output 695 of amplifier 694 is fed through a filter 696, and thence by a conductor 697 to the pilot's headphones 700.

The output 701 of amplifier 693 contains the proportional and switching information in the form of signals of different frequencies and is supplied to a plurality of sharply tuned filters 702, 703, 704, 705, 706, 707, and 710. Filter 702 passes frequencies in a narrow band centering on 20,000 cycles per second, and supplies to a detector 711 a signal 712 determined by the reference signal 640. The output 713 of detector 711 is a 90 cycle voltage of fixed phase.

Filter 703 passes frequencies in a narrow band centered at 16,700 cycles per second, and its output 714 is supplied to a phase detector 715 together with a signal 716 from detector 711: the output 717 from detector 715 is a direct voltage which varies in magnitude and reverses in polarity with the amount and direction of displacement of phase shifter 338.

Filter 704 passes frequencies in a narrow band centered at 14,350 cycles per second, and its output 720 is supplied to a phase detector 721 together with a signal 722 from detector 711: the output 723 from detector 721 is a direct voltage which varies in magnitude and reverses in polarity with the amount and direction of displacement of phase shifter 341.

Filter 705 passes frequencies in a narrow band centered at 11,900 cycles per second, and its output 724 is supplied to a phase detector 725 together with a signal 726 from detector 711: the output 727 from detector 725 is a direct voltage which varies in magnitude and reverses in polarity with the amount and direction of displacement of phase shifter 348.

Filter 706 passes frequencies in a narrow band centered at 4000 cycles per second, and its output 730 is supplied to a detector 731 which energizes a relay winding 732 having normally open contacts 732a and 732c which close when oscillator 662 is keyed. Filter 707 passes frequencies in a narrow band centered at 3500 cycles per second, and its output 735 is supplied to a detector 736 which energizes a relay 737 having normally open contacts 737a and 737c which close when oscillator 663 is keyed. Filter 710 passes frequencies in a narrow band centered at 3000 cycles per second, and its output 742 is supplied to a detector 743 which energizes a relay 744 having normally open contacts 744a and 744c which close when oscillator 664 is keyed. Relay contacts 732a, 732c, 737a, 737c, 744a, and 744c are shown in FIGURES 20 and 21, outputs 717 and 723 appear in FIGURE 25, and output 727 appears in FIGURE 26.

Reference should now be made to FIGURE 18, which shows the lateral control portion of the airborne equipment. An aileron servomotor 745 is shown as supplying a mechanical output 746 for adjusting the ailerons of the aircraft through a normally disengaged clutch 747 having an engaging solenoid 750 energized as will be described in connection with FIGURE 21. When clutch 747 is not energized, the normal control column operation of the ailerons may be exercised: when the clutch is energized the ailerons are adjusted by motor 745, which the manual control column may override if desired. An aileron position signal device 751 is positioned simultaneously with the ailerons regardless of whether that adjustment is made by motor 745 or by the human pilot.

Motor 745 is energized through a cable 752 by a servo amplifier 753 as will be shown in more detail in connection with FIGURE 21. Servo amplifier 753 is energized at 754 from a D.C. amplifier 755, energized in turn from a summation point 756 through conductor 757, a network 760, and conductor 761.

A first signal voltage is supplied to summation point 756 through a summing resistor 762 from compass coupler 90 better shown in FIGURE 24: when the compass coupler is not engaged the signal is zero. A signal voltage is supplied by a roll rate gyroscope to the winding 764 of a voltage divider 765 having a slider 766 connected by summing resistor 767 to a summation point 756. Aileron position signal device 751 is connected to supply a signal through conductors 770 and 771, capacitor 772 and summing resistor 773 to a summation point 756. A complex signal at a summation point 774 is supplied to the winding 775 of a voltage divider 776 whose slider 777 is connected to summation point 756 by a summing resistor 780.

Servo amplifier 753 is shown as energizing a centering motor 781 through a cable 782: as will be described in connection with FIGURE 21, centering motor 781 is energized alternately with servomotor 745. Motor 781 adjusts a turn command signal device 783, through a mechanical connection 784, which includes a normally disengaged clutch 785, having an engaging solenoid 786 energized as will be described in connection with FIGURE 21, and a suitable gear train 787. When clutch 785 is de-energized, it is possible for the human pilot to adjust turn control signal device 783 by means of a manual knob 788 without having to drive motor 781 through gear train 787. When clutch 785 is energized, motor 781 drives device 783 and knob 788. This knob has a normal position, and when it is displaced therefrom in either direction, a mechanical connection 789 is operated to open a switch shown in FIGURE 22. Turn command signal device 783 is connected to supply a signal through conductor 790 and summing resistor 791 to summation point 774.

A second signal is supplied to summation point 774 through a summing resistor 792 by a vertical gyroscope in accordance with the angle of bank or roll angle of the aircraft.

A third signal is supplied to summation point 774 through a summing resistor 793 from lateral coupler 94 described in more detail in connection with FIGURE 25. In FIGURE 18 the coupler is shown generally to comprise a servomotor 795 which drives an output signal device 796 through a mechanical connection 797. When coupler 94 is engaged an output is supplied on conductor 800 connected to summing resistor 793: when the coupler is not engaged conductor 800 is grounded. Output signal device 796 also supplies two further signals on conductors 801 and 802.

Servomotor 795 is energized through a cable 803 from a motor control amplifier 804 energized at 805 with the output of an adder 806 having four inputs. The first input is supplied on conductor 801 and is a feedback input. The second input is supplied through conductor 807, a filter network 810 and conductor 717 (see FIGURE 17) and is representative of the lateral error of the aircraft as determined by the carrier based equipment. The third input to adder 806 of FIGURE 18 is supplied through conductor 811, a lead network 812, and conductor 723 (see FIGURE 17) and is representative of the scheduled bank of the aircraft as determined by the carrier based equipment. The fourth input to adder 806 of FIGURE 18 is supplied from conductor 802 through a differentiator 813, conductor 814, a D.C. amplifier 815, conductor 816, an electronic switch 817, and conductor 820. When switch 817 conducts, this rate feedback converts coupler 94 from a simple amplifier to an integrator.

From the foregoing it will be evident that the input to network 760 is the sum of signals representative of the rate of change of aileron position, roll rate, turn command, and roll angle, and may include a compass signal and a lateral coupler signal in which both the lateral error and scheduled bank of the air craft are included. It will be shown in connection with FIGURES 21 and 22 that the compass signal and the coupler signal are not available concurrently.

Referring again to FIGURE 18, a rudder servomotor 821 is shown as supplying a mechanical output 822 for adjusting the rudder of the aircraft through a normally disengaged clutch 823 having an engaging solenoid 824 energized as will be described in connection with FIGURE 21. When clutch 823 is not engaged, the normal pedal control of the rudder may be exercised: when the clutch is engaged the rudder is adjusted by motor 821. A rudder position signal device 825 is adjusted simultaneously with the rudder regardless of whether the adjustment is made by motor 821 or by the human pilot.

Motor 821 is energized through a cable 826 by a servo amplifier 827 as will be shown in more detail in FIGURE 21. Servo amplifier 827 is energized at 830 from a D.C. amplifier 831, energized in turn from a summation point 832 through conductor 833, a network 834 and conductor 835.

A first signal voltage is supplied to summation point 832 through a summing resistor 836 from a side slip sensor, and a second signal voltage is supplied to summation point 832 through conductor 837 and summing resistor 840 from the slider 766 of voltage divider 765. A complex signal voltage is supplied to summation point 832 through isolation resistor 841 and capacitor 842 from a summation point 843.

Three signal voltages are supplied to summation point 843: the first is supplied through resistor 844 and conductor 845 from rudder position signal device 825. The winding 846 of a voltage divider 847 having a slider 850 is connected between conductor 770 and ground, and slider 850 is connected through conductor 851 summing resistor 852 and conductor 853 to summing point 843. A signal voltage is supplied by a yaw rate gyroscope to the linear winding 854 of a voltage divider 855 having a slider 856 connected to summation point 843 by a summing resistor 857. A characterizing resistor 860 is connected between slider 857 and winding 854 to give the output of the voltage divider a desired nonlinearity.

From the foregoing it will be evident that the input to network 834 is the sum of signals representative of side slip and roll rate and of rate of change of yaw rate, rudder position, and aileron position.

Sliders 766, 777, 850, and 856 are shown as adjusted by a mechanical connection 861 which is actuated, as will be discussed more fully in connection with FIGURE 20, in accordance with the air speed of the aircraft.

FIGURE 19, to which reference should now be made, shows the vertical control portion of the airborne equipment. An elevator servomotor 862 is shown as supplying a mechanical output 863 for adjusting the elevators of the aircraft through a normally disengaged clutch 864 having an engaging solenoid 865 energized as will be described in connection with FIGURE 21. When clutch 864 is not engaged, the normal control stick operation of the elevators may be exercised: when the clutch is engaged the elevators are adjusted by motor 862. Elevator position signal device 866 is adjusted simultaneously with the elevators regardless of whether that adjustment is made by motor 862 or by the human pilot.

Motor 862 is energized through a cable 867 by a servo amplifier 870, as will be shown in detail in connection with FIGURE 21. Servo amplifier 870 is energized at 871 from a D.C. amplifier 872, energized in turn from a summation point 873 through conductor 874, network 875 and conductor 876.

The output of elevator position signal device 866 is supplied by conductor 877, capacitor 880, and summing resistor 881 to summation terminal 873. A pitch rate gyroscope supplies an electric signal to the winding 882 of a voltage divider 883 whose slider 884 is connected by capacitor 885 and summing resistor 886 to terminal 873. A characterizing resistor 887 is connected between slider 884 and winding 882 to give the output of voltage divider 883 a desired nonlinearity. A complex signal is supplied to summation point 873 through conductor 888 from the slider 890 of the voltage divider 891 whose winding 892 is energized from a summation point 893.

Servo amplifier 870 is shown as energizing a centering motor 894 through a cable 895: as will be described in connection with FIGURE 21 centering motor 894 is energized alternatively with servomotor 862. Motor 894 adjusts a pitch command signal device 896 through a mechanical connection 897 which includes a suitable gear train 898, and which is extended to carry a manual pitch centering knob 900. Pitch command signal device 896 is connected to supply a signal through conductor 901 and summing resistor 902 to summation point 893.

Further input voltages are supplied to the summation point 893 through summing resistors 903 and 904 from a vertical gyroscope, to comprise pitch angle and up-elevator signals, respectively. A further input to summation point 893 may be supplied through a summing resistor 905, which is either zero or that of a fixed voltage source 906 according as a movable relay contact 907a engages a first fixed contact 907b or is actuated to engage a second fixed contact 907c. The energizing circuit for relay 907 will be described in connection with FIGURE 22.

Two further input voltages are supplied to summation point 893 through summing resistors 908 and 909 from vertical coupler 97, which is shown to comprise a pair of output devices 910 and 911 adjusted by servomotors 912 and 913 through mechanical connections 914, and 915, all respectively. Device 910 supplies a first output on conductor 916 to resistor 908, and a second output on conductor 917. Device 911 supplies a first output on conductor 920 to summing resistor 909, and a second output on conductor 921. When the coupler is not engaged the first outputs of devices 910 and 911 become zero.

Servomotor 912 is energized through a cable 922 from a motor control amplifier 923 having a first input 924 and a second input 925. Input 924 is derived from conductor 917 through differentiator 926 to comprise a rate feedback, so that elements 923, 924 and 926 comprise an integrator. Similarly servomotor 913 is energized through a cable 927 from a motor control amplifier 930 having output 921 as a first or feedback input, and having a second input 931. Inputs 925 and 931 are derived through an isolation device 932, a connection 933, a compensating lead network 934 and conductor 935 from the slider 936 of a voltage divider 937 whose winding 940 is connected by conductor 941 to the movable relay contact 1100hh which normally engages a first fixed contact 1100jj, but may be moved into engagement with a second fixed contact 1100kk. Contact 1100kk is connected to conductor 727, FIGURE 17, to supply a signal representative of the vertical error of the aircraft as determined by the carrier based apparatus. Contact 1100jj is connected by a conductor 943 to receive a signal from the altitude control 100 of the aircraft, representative of the altitude error of the aircraft.

From the foregoing it will be evident that the input to network 875 is the sum of signals representative of the rate of change of elevator position and of pitch rate, and of pitch command, flap position, and pitch attitude, together with an up elevator signal, and, if vertical coupler 997 is engaged, signals representative of the vertical error of the aircraft and its integral based either on radar data or on altitude control data.

Whereas the signals on the carrier based equipment are preferably alternating voltages, those in the airborne equipment are preferably direct voltages, and may be derived from any suitable source.

Sliders 884, 890, and 936 are shown as actuated by mechanical connection 861, described in the discussion of FIGURE 18 as operated in accordance with the airspeed of the aircraft. The airspeed ratio control system performing this adjustment is illustrated in FIGURE 20, to which reference should now be made.

In FIGURE 20 an airspeed sensor 944, which may be a differential air pressure responsive bellows system, acts through a mechanical connection 945 to displace the slider 946 of a voltage divider 947 with respect to the winding 950. The winding is connected, in series with fixed resistors 951 and 952, across the secondary winding 953 of a transformer 954 whose primary winding 955 is energized from an airborne source 949 of alternating voltage, normally 400 cycles. A characterizing resistor 956 is connected between slider 946 and the junction point 957 between resistors 951 and 952.

Also connected across secondary winding 953 is the winding 960 of a voltage divider 961 having a slider 962 connected by a conductor 963 to the input of a motor control amplifier 964. Slider 962 is adjusted through mechanical connection 861 by a servomotor 966 energized through a cable 967 from amplifier 964.

Mechanical connection 861 is extended to drive a velocity generator 972 having a primary winding energized from source 949. Velocity generator 972 functions to supply an output between conductor 973 and ground which varies in magnitude with the speed of motor 966, and which reverses in phase with reversal of the motor. Conductor 973 is connected through a network including a capacitor 974 and a resistor 975 to the winding 976 of a voltage divider 977 having a slider 980 connected by conductor 981 to junction point 957. Mechanical connection 861 is further extended to actuate sliders 766, 777, 850, 856, 884, 890, and 936, as is also shown in FIGURES 17 and 18.

As is shown in FIGURE 20, the elements having numbers between 946 and 962 make up an A.C. bridge 959 whose input terminals are the terminals of secondary winding 953, and whose output terminals are slider 952 and junction point 957. Operation of motor 966 adjusts two adjacent arms of the bridge equally and oppositely, and operation of airspeed sensor 944 adjusts the resistance of a third arm of the bridge relative to the fixed resistance 952 of the fourth arm of the bridge.

It will be appreciated that the unbalance voltage from bridge 959 resulting from linear response by sensor 944 is nonlinear, and that the amount of adjustment of slider 962 by motor 972 must accordingly be nonlinear as well. This means that the outputs on sliders 766, 777, 850, 890 and 936 are nonlinear with variation of sensor 944 even though the windings of the voltage dividers are themselves linear. As concerns the output of sliders 856 and 884 this is also true, with the further condition that by reason of loading resistors 860 and 887 the voltage outputs are still further characterized. By this method of double loading a pair of outputs are obtained which are more heavily characterized than would be possible by loading a single voltage divider, and yet recourse to graded windings or other costly expedients is avoided.

FIGURES 21 and 22 together give the details of control circuitry for the airborne equipment not shown in previous figures. Extending across the bottom of both figures is a ground bus 982 and extending across the top of both figures is a D.C. bus 983 energized from a positive terminal 984 of the aircraft battery when a circuit breaker 985 is closed. The figures are arranged to show the control functioning, the flow of control being from upper left to lower right. To this end, as in FIGURES 15 and 16, relay contacts have been placed where their function is performed rather than at the windings which operate them. The movable contacts are shown in the positions which they occupy when their respective windings are de-energized. The airborne inverter shown at 986 is energized from terminal 984 when a circuit breaker 987 is closed. The output of alternator 986 was represented by reference numeral 949 in FIGURE 20, and is also supplied to an A.C. failure relay winding 990.

Servomotor 745 is a series D.C. motor and has forward and reverse windings, with a common ground conductor 991 and separate input conductors 992 and 993. The circuit for forward operation of the motor may be completed to bus 983 through normally open relay contacts 994c and 994a, conductor 995, normally open relay contacts 996c and 996a in servo amplifier 753, and conductor 997. The circuit for reverse operation of motor 745 may be completed to bus 983 through normally open relay contacts 994f and 994d, conductor 1000, normally open relay contacts 1001c and 1001a in servo amplifier 753, and conductors 1002 and 997.

Centering motor 781 is a reversible D.C. motor and reverses with reversal in the polarity of the voltage applied across input conductors 1003 and 1004. The circuit for forward operation of the motor may be completed from bus 983 through conductor 997, relay contacts 996a and 996c in servo amplifier 753, conductor 995, normally closed relay contacts 994a and 994b, conductors 1005 and 1003, motor 781, conductor 1004, resistor 1006, conductors 1007 and 1008, anti-engage relay winding 1010 and conductor 1011 to bus 982. The circuit for reverse operation of motor 781 may be completed from bus 983 through conductors 997 and 1002, relay contacts 1001a and 1001c, conductor 1000, normally closed relay contacts 994d and 994e, conductor 1004, motor 781, conductor 1003, resistor 1012, conductors 1007 and 1008, anti-engage relay winding 1010, and ground connection 1011 to bus 982.

Servomotor 862 is like motor 745, having forward and reverse input conductors 1013 and 1014 and a common ground conductor 1015. The circuit for forward operation of the motor may be completed to bus 983 through normally open relay contacts 1016c and 1016a, conductor 1017, normally open relay contacts 1020c and 1020a in servo amplifier 870, and conductor 1021. The circuit for reverse operation of the motor 862 may be completed to bus 983 through normally open relay contacts 1016f and 1016d, conductor 1022, relay contacts 1023c and 1023a, in servo amplifier 870, and conductors 1024 and 1021.

Centering motor 894 is like motor 781 and has input conductors 1025 and 1026. This circuit for forward operation of the centering motor may be completed from bus 983 through conductor 1021, relay contacts 1020a and 1020c in servo amplifier 870, conductor 1017, normally closed relay contacts 1016a and 1016b, conductors 1027 and 1025, motor 894, conductor 1026, resistor 1030, conductor 1008, anti-engage relay winding 1010 and conductor 1011. The circuit for reverse operation of motor 894 may be completed from bus 983 through conductors 1021 and 1024, relay contacts 1023a and 1023c in servo amplifier 870, conductor 1022, normally closed relay contacts 1016d and 1016e, conductor 1026, motor 894, conductor 1025, resistor 1031, conductor 1008, anti-engage relay winding 1010, and conductor 1011.

Servomotor 821 is like motor 745, having forward and reverse input conductors 1032 and 1033 and a common ground conductor 1034. The circuit for forward operation of the motor may be completed to bus 983 through normally open relay contacts 1035c and 1035a in servo amplifier 827, conductor 1036, normally open relay contacts 1037c and 1037a, and conductor 1040. The circuit for reverse operation of motor 821 is completed through normally open relay contacts 1041c and 1041a in servo amplifier 827, conductors 1042 and 1036, relay contacts 1037c and 1037a, and conductor 1040.

One end of turn control clutch winding 786 is grounded through conductor 1043. The other end may be connected to bus 893 through conductor 1044 and normally closed relay contacts 994h and 994g.

One end of each of aileron engage clutch winding 750, FIGURE 18, and elevator engage clutch winding 865, FIGURE 19, is grounded, through conductors 1045 and 1046, respectively, and the other end may be connected to bus 983 through conductors 1047 and 1050 respectively and relay contacts 994j and 994g.

Block 1051 represents the heaters of the electron tubes in the compass coupler: they are energized through conductors 1052 and 1053.

One end of rudder engage clutch winding 824 (FIGURE 18) is grounded through conductor 1054. The other end may be connected to bus 983 through conductor 1055 and normally open relay contacts 1037f and 1037d.

The heater 1057 of a thermal time delay relay is energized through conductors 1060 and 1061.

An energizing circuit for the holding winding 1062 of a manually operable Yaw Damper Engage switch may be completed through normally open relay contacts 990a and 990c, conductor 1063, time delay relay contacts 1057c and 1057a, conductor 1064, switch contacts 1062a and 1062c, junction point 1065, conductor 1066, winding 1062, conductor 1067, normally open relay contacts 1070a and 1070c, and conductor 1071.

One end of yaw damper engage relay winding 1037 is grounded through conductor 1072: the other end is connected by conductors 1073 and 1074 to junction point 1065.

One end of ready to engage relay 1075 is grounded through conductor 1076. The other end may be connected through junction point 1077, conductor 1080, normally open relay contacts 732c and 732a, conductor 1081, normally open relay contacts 690c and 690a, and conductors 1082, 1083, and 1074 to junction point 1065.

Block 1084 represents one of the warning flags in the pilot's cross pointer meter which are withdrawn from sight when energized. This "lateral" flag is energized from junction point 1077 through conductor 1085, resistor 1086, and conductor 1087, the circuit to ground being completed through conductor 1090.

One end of lead network relay winding 1091 is grounded through conductor 1092. The other end may be connected through conductor 1093, normally open relay contacts 737c and 737a, conductor 1094, normally open relay contacts 1095c and 1095a, and conductors 1096, 1083, and 1074 to junction point 1065.

A junction point 1097 may be connected to junction point 1065 either through normally open relay contacts 1091c and 1091a or through normally open relay contacts 1100c and 1100a, thence through conductor 1101, relay contacts 1095c and 1095a, and conductors 1096, 1083, and 1074.

Block 1102 represents the other warning flag on the pilot's cross pointer meter. This "vertical" flag is energized from junction point 1097 through conductor 1103, resistor 1104, and conductor 1105, the circuit to ground being completed through conductor 1106.

One end of precision path relay winding 1100 is grounded through conductor 1110. The other end is connected through conductors 1111 and 1112 to junction point 1097.

One end of dive brake relay winding 1113 is grounded through conductor 1114. The other end is connected through conductors 1115, 1116 and 1112 to junction point 1097.

One end of airspeed step relay winding 1117 is grounded through conductor 1120. The other end is connected through conductors 1121, 1122, 1116, and 1112 to junction point 1097.

One end of glide slope relay 1123 is grounded through conductor 1124. The other end may be connected through conductor 1125, normally open relay contacts 744c and 744a, and conductors 1126, 1122, 1116, and 1112 to junction point 1097.

A circuit may be completed from positive bus 983, FIGURE 21, through relay contacts 990a and 990c, conductor 1063, relay contacts 1057c and 1057a, normally closed relay contacts 1010b and 1010a, conductor 1130, switch contacts 1062d and 1062f, to conductor 1131, leading to FIGURE 22.

A manual knob 1132 is arranged for displacing switch contacts 1062a and 1062d through a mechanical connection 1133. The arrangement is such that unless the winding 1062 of the switch is energized, the contacts will not hold in.

Referring now to FIGURE 22, one end of the winding 1134 of an Automatic Pilot Engage switch is connected to ground through conductors 1135 and 1136. The other end may be connected through conductor 1137, a normally closed Automatic Pilot Release switch 1138, conductor 1140, and switch contacts 1134c and 1134a to conductor 1131. A manual knob 1141 is arranged for displacing movable contact 1134a through a mechanical connection 1142: the arrangement here is like that described in connection with the Yaw Damper Engage switch 1062.

One end of each of aileron and elevator engage relay windings 994 and 1016 is connected to ground through conductors 1143 and 1144, and the other ends may be connected through conductors 1145 and 1146, all respectively, conductor 1147, conductor 1150, and switch contacts 1134c and 1134a to conductor 1131.

One end of compass relay winding 1151 is grounded through conductor 1152. The other end may be connected through conductor 1153, normally closed relay contacts 1095e and 1095d, conductor 1154, movable contact 1155 and fixed contact 1156 of a turn control switch 1157, conductors 1160, 1161, and 1150, and switch contacts 1134c and 1134a to conductor 1131. Movable contact 1155 is operated through mechanical connection 789 by the yaw rate gyro which supplies the signal to voltage divider 855 of FIGURE 18.

One end of the winding 1162 of an Altitude Control Engage switch is grounded through conductor 1163, normally closed relay contacts 1100d and 1100e, and conductor 1164. The other end may be connected through switch contacts 1162c and 1162a, conductors 1165, 1161 and 1150, and switch contacts 1134c and 1134a to conductor 1131. A manual knob 1166 is arranged for displacing movable contacts 1162a through a mechanical connection 1167: the arrangement here is like that described in connection with Yaw Damper Engage switch 1062.

One end of an altitude control engage solenoid winding 1170 is grounded through conductor 1171. The other end may be connected through conductors 1172 and 1173, switch contacts 1162c and 1162a, conductors 1165, 1161, and 1150, and switch contacts 1134c and 1134a to conductor 1131.

One end of an altitude control relay winding 1174 is grounded through conductor 1175, and the other end is energized through a conductor 1176 from a junction point 1177. Junction point 1177 may be energized from conductor 1131 through switch contacts 1134a and 1134c, conductors 1150, 1161, 1165, and one of three paths, of which the first includes switch contacts 1162a, 1162c, conductor 1173, normally closed relay contacts 1100h and 1100g, and conductors 1180 and 1181, the second includes conductor 1182, normally open relay contacts 1091d and 1091f, and conductor 1181, and the third includes conductors 1182 and 1183 and normally open relay contacts 1100k and 1100n.

One end of the winding 1184 of an Automatic Carrier Controlled Approach switch is grounded through conductor 1136. The other end may be connected through junction point 1185, switch contacts 1184c and 1184a, normally open relay contacts 1187c and 1187a, and conductor 1190 to junction point 1177. A manual knob 1189 is arranged for displacing movable contact 1184a through a mechanical connection 1188: the arrangement here is like that described in connection with Yaw Damper Engage switch 1062.

One end of the winding of each of automatic carrier controlled approach relay 1095, synchronizer lock-out relay 1192, and power control engage relay 1193 is grounded through conductors 1195, 1197, and 1200 respectively. The other end of relay winding 1095 is connected through conductors 1202 and 1203 to junction point 1185. The other end of relay winding 1192 is connected through conductors 1204, 1205, and 1203 to junction point 1185. The other end of relay winding 1193 is connected through conductors 1206, 1205, and 1203 to junction point 1185.

One end of flap relay winding 907 is grounded through conductor 1207. The other end may be connected to bus 983 through conductor 1210 and the contacts 1211 and 1212 of a flap switch 1220 which is closed when the landing flaps of the aircraft are lowered into operative position.

One end of engage interlock relay winding 1187 may be grounded through conductor 1213, the contacts 1217 and 1216 of a gear down switch 1221, and conductor 1222. Switch 1221 is closed when the landing gear of the aircraft is down. The other end of winding 1187 may be connected through conductor 1223, relay contacts 1075c and 1075a and conductor 1224, or through conductors 1223 and 1225 and relay contacts 1187f and 1187d, to conductor 1226 and thence through switch contacts 1211 and 1212 to bus 983.

One end of scissors relay winding 1070 may be grounded through conductor 1227, the contacts 1228 and 1229 of a scissors switch 1230, and conductor 1231. Switch 1230 is open when the weight of the aircraft is on the landing gear, and closes when the aircraft becomes airborne. The other end of winding 1070 is connected to bus 983 through conductor 1232.

Energy may be supplied to the dive brake actuators of the aircraft from bus 983 through normally open relay contacts 1113d and 1113f.

Reference should now be made to FIGURE 23, which shows altitude controller 100 in more detail. A force balance 1233 is subject to a first mechanical input 1234 from an altitude sensor 1235, and to a second mechanical input supplied by the shaft 1236 of a servomotor 1237, which also drives a velocity generator 1240, and further acts through a normally disengaged clutch 1241 having an engaging solenoid 1170 to adjust a spring centered output device 1242. Velocity generator 1240 is the same as generator 972 in FIGURE 20, and supplies an antihunt signal on a cable 1243 to a motor control amplifier 1244 which energizes servomotor 1237 through a cable 1245. The signal input 1246 to amplifier 1244 is supplied from force balance 1233. In the operation of the system motor 1237 continually runs to maintain balance as the input 1234 varies with altitude, so that shaft 1236 continuously represents by its position the altitude of the craft. As long as clutch 1241 is disengaged, device 1242 is spring centered and no output appears on conductor 943. When clutch 1241 is engaged motor 1237 drives device 1242, which thereafter gives on conductor 943 a D.C. voltage representative of any departure of the aircraft from the altitude at which the clutch was engaged.

Referring now to FIGURE 24, which shows compass coupler 90 in more detail, reference numeral 1247 identifies a compass follower which conventionally takes the form of a synchro having supplied thereto on a cable 1250 a three phase electrical signal representative of the departure of the heading of the aircraft from a selected value. The synchro rotor is adjusted through a mechanical connection 1251 by a servomotor 1252 together with a velocity generator 1253 like velocity generator 972. When the rotor of follower 1247 is aligned with that of the compass transmitter, no output appears between a conductor 1254 and ground: otherwise an alternating voltage is there supplied whose amplitude and phase are representative of the amount and sense of the heading error of the aircraft.

Servomotor 1252 is energized through a cable 1255 from a phase sensitive rectifier 1256, powered through conductors 1257 and 1260 and ground connections 1261 and 1262 from the source of alternating voltage supply in the compass system. The source is often of a different frequency from that supplied at 949 by the ship's alternator. Rectifier 1256 obtains its signal at 1263 from amplifier 1051 powered with D.C. on conductors 1052 and 1053 as shown in FIGURE 21. Thus although rectifier 1256 is powered when the compass system is on, it receives no signal until the circuit breaker 985 of FIGURE 21 is closed and amplifier 1051 warms up. It is of course understood that the primary of velocity generator 1263 must also be energized from the compass system.

Operation of the compass coupler is determined by compass relay 1151, which is shown to have movable contacts 1151a, 1151d, and 1151g normally engaging fixed contacts 1151b, 1151e and 1151h, and movable into engagement with fixed contacts 1151c, 1151f and 1151j. Normally a circuit is completed from conductor 1254 through relay contacts 1151a and 1151b and conductors 1265 and 1266 to amplifier 1051.

Contact 1151d is grounded, and contact 1151c is connected to the primary winding 1267 of a transformer 1270 whose secondary winding 1271 is center tapped at 1272. The ends of winding 1271 are connected to the opposite fixed contacts 1273 and 1274 of a synchronous vibrator or chopper 1275, whose movable contact 1276 is maintained in vibration by a coil 1277 energized from the compass source through conductors 1280 and 1260 and ground connections 1281 and 1262. Contact 1276 and center tap 1272 are connected through a network 1282 to supply the compass coupler output on conductors 1283 and 1284, the latter being signal ground. For the normal condition of relay 1151 these conductors are short circuited by relay contacts 1151g and 1151h.

Referring now to FIGURE 25, the lateral coupler is show as receiving inputs between conductors 717 and 723, FIGURE 17, and ground, and as supplying an output between conductor 800 (FIGURE 18) and ground. A first input network 1285 connected to conductor 717 is shown to comprise a shunt resistor 1286, a series resistor 1287, a filter 1290 including capacitors 1291 and 1292 and resistor 1293, and a summing resistor 1294: the network output appears on conductor 1295. A second series resistor 1296 is shunted across resistor 1287 when relay contacts 1100bb and 1100dd are engaged.

A second input network 1297 is shown as connected to conductor 723 and has a proportional portion 1300 and an integral portion 1301. Proportional portion 1300 is shown to comprise a voltage divider 1302 made up of resistors 1303, 1304, and 1305, and connected by relay contacts 1100x, 1100w, and 1100v to a network 1306 including series resistor 1307 and shunt capacitor 1310. The output of this portion of network 1297 is supplied through summing resistor 1311 to conductor 1312.

The integrating portion 1301 of network 1297 is shown to comprise an integrating capacitor 1313 and a filter 1314 including series resistors 1315 and 1316 and shunt capacitors 1317 and 1320, and its output is supplied through summing resistors 1321 and 1332 to a conductor 1323. Capacitor 1313 may be grounded by relay contacts 1091k and 1091n and resistor 1322 may be shorted out by relay contacts 1100ee and 1100gg.

Conductors 1295, 1312, and 1323 are connected to relay contact 1091h, normally engaged by contact 1091g; contact 1091j is grounded through resistor 1324. Contact 1091g is connected to contact 1095j, contact 1095h is grounded through resistor 1325, and contact 1095g is connected to the input of motor control amplifier 804 which energizes servomotor 795 through a cable 1330 to cause operation of the motor in a direction determined by the polarity of any input voltage to the amplifier. Motor 795 acts through a mechanical connection 1331 to drive a velocity generator 1332, which supplies an anti-hunt signal to amplifier 804 through a cable 1333. Mechanical connection 1331 is extended to actuate the sliders 1334 and 1335 of a pair of voltage dividers 1336 and 1337, each of whose windings 1340 and 1341 is energized with unidirectional voltage of opposite polarities with respect to ground.

The signal from slider 1334 is supplied through conductor 1342 to a feedback network 1343 made up of a voltage divider comprising resistors 1344 and 1345, a filter capacitor 1351, a grounding resistor 1346 which may be removed from the network by opening relay contacts 1100y and 1100z, and one of two summing resistors 1347 and 1350 as determined by relay contacts 1095k, 1095m, and 1095*n*. The output from the network is taken from contact 1095*k* through conductor 1352.

The signal from slider 1335 is supplied through an isolating resistor 1353 to an output network 1354 and a second feedback network 1355. Network 1354 includes a voltage divider made up of resistors 1356 and 1357 and a switching circuit including relay contacts 1095*s*, 1095*t* and 1095*u*, and relay contacts 1100*p*, 1100*q*, and 1100*r*. Output conductor 800 is connected to contact 1100*p*, and is normally grounded.

Feedback network 1355 includes a voltage divider made up of resistors 1358 and 1359, a switching circuit including relay contacts 1095*p*, 1095*q*, and 1095*r*, relay contacts 1100*s*, 1100*t*, and 1100*u*, a differentiating capacitor 1360, a grid resistor 1361, cascode amplifier 815, electronic switch 817, a filter 1364, and a summing resistor 1365. Amplifier 815 is shown to comprise a pair of voltage sources in the form of batteries 1366 and 1367, a pair of triodes 1370 and 1371, a pair of dropping resistors 1372 and 1373, and a load resistor 1374. The arrangement is such that with zero signal on relay contact 1100*s*, the cathode of triode 1370 is at ground potential, and when contact 1100*s* departs from ground potential, the potential of the cathode varies above or below ground in the same proportion.

Electronic switch 817 includes a voltage dropping chain made up of resistors 1375, 1376, and 1377 connected across sources 1366 and 1367, a pair of isolating resistors 1380 and 1381, and a pair of diodes 1382 and 1383. As long as the voltage at the cathode of triode 1370 is not further from ground than the bias on the diodes, neither can conduct and no signal is supplied to amplifier 815 through summing resistor 1365. If the cathode voltage exceeds the bias voltage one or the other of the diodes conducts, completing the rate feedback circuit through capacitor 1360 and giving the system integrating as well as merely amplifying properties.

From the foregoing it will be clearly evident that the lateral coupler functions to combine the lateral error and scheduled bank signals, after modifying them in separate input networks, to give a combined lateral control output. The advantage of this arrangement is that the carrier based equipment can be the same for all aircraft, and the networks in the lateral couplers can be modified as may be required to fit the characteristics of individual aircraft in which the airborne equipment is installed. Thus a succession of different aircraft may use the system without any consideration being given to their different landing characteristics at the carrier while the landings are being carried out.

Referring now to FIGURE 26, the vertical coupler is shown as receiving D.C. inputs between conductors 943, (FIGURE 23) and 727 (FIGURE 17) and ground, representative respectively of the altitude error and vertical path error of the aircraft, and as supplying outputs between conductors 916 and 920 (FIGURE 19) and ground. The coupler includes a proportional channel 1384 and an integrating channel 1385.

In the proportional channel servomotor 913 is energized through a cable 1387 from motor control amplifier 930 like amplifier 804 of FIGURE 25. By a mechanical connection 1391 motor 913 actuates a velocity generator 1393 which supplies an anti-hunt signal to amplifier 930 through a cable 1394. Mechanical connection 1391 is extended to actuate slider 1395 of a voltage divider 1396 whose winding 1397 is energized with unidirectional voltages of opposite polarity with respect to ground. Voltage divider 1396 is part of proportional output network 1400, which includes a fixed voltage divider made up of resistors 1401 and 1402, and an output circuit including relay contacts 1174*k*, 1174*m*, and 1174*n*, by means of which conductor 920 is either grounded or supplied with the output of channel 1384.

Inputs are supplied to amplifier 930 through a plurality of summing resistors 1403, 1404, 1405, and 1406. Summing resistor 1403 is a part of a feedback network 1407 which also includes a fixed voltage divider made up of resistors 1410 and 1411 and a variable voltage divider 1412 whose winding 1413 is energized with unidirectional voltages of opposite polarities with respect to ground and whose slider 1414 is driven by motor 913 through mechanical connection 1391.

Summing resistor 1404 is part of a centering network 1415 which also includes a fixed voltage divider made up of resistors 1416 and 1417 and a variable voltage divider 1420 whose winding 1421 is energized with unidirectional voltages of opposite polarity with respect to ground and whose slider 1422 is adjustable by a manual knob 1423.

Summing resistor 1405 is part of a flap-down signal network 1424 which also includes a fixed voltage divider made up of resistors 1425, 1426, and 1427, connected between ground and a source of negative unidirectional voltage, and relay contacts 1123*a* and 1123*c*. When the flaps of the aircraft are up the relay contacts are in the disengaged position shown.

Summing resistor 1406 is part of an isolation network 1430 which also includes resistors 1431, 1432, and 1433, filter capacitors 1434, 1435, and 1436, a further summing resistor 1437 and an input terminal 1440 to which is applied the signal from an input network 1441. Network 1441 includes relay contacts 1091*s* and 1091*u*, resistors 1442, 1443, 1444, 1445, and 1446, and capacitors 1447 and 1450, and is energized from the slider 936 of voltage divider 937 whose winding 940 is energized either with the signal on conductor 943 through isolating resistor 1454, or with the signal on conductor 727, through isolating resistor 1455, according as relay contacts 1100*hh*, 1100*jj*, and 1100*kk* are in normal or in operated position.

In the integrating channel 1385 of the vertical coupler servomotor 912 is energized through a cable 1457 from motor control amplifier 923 like amplifier 804 of FIGURE 25. By a mechanical connection 1461 motor 912 actuates a velocity generator 1462 which supplies an anti-hunt signal to amplifier 923 through a cable 1463. Mechanical connection 1461 is extended to actuate the slider 1464 of a voltage divider 1465 whose winding 1466 is energized with unidirectional voltages of opposite polarity with respect to ground. Voltage divider 1465 is a part of an integral output network 1467 which also includes a fixed voltage divider made of resistors 1470 and 1471 and an output switching circuit including relay contacts 1174*g*, 1174*h*, and 1174*j*, by means of which conductor 916 is either grounded or supplied with the output of channel 1385.

Inputs are supplied to amplifier 923 through a plurality of summing resistors 1472, 1473, and 1437. Resistor 1437 is a part of isolation network 1430 previously described. Resistor 1472 is a part of a rate feedback network 1474, which includes relay contacts 1174*a*, 1174*b*, and 1174*c*, relay contacts 1174*d* and 1174*e*, relay contacts 1100*mm* and 1100*nn*, one or both of differentiating capacitors 1475 and 1476, isolating resistor 1477, a fixed voltage divider made up of resistors 1481, 1482, and 1483 connected between ground and the source of positive potential, and a variable voltage divider 1484 having a winding 1485 energized with unidirectional voltages of opposite polarity with respect to ground and a slider 1486 adjusted by servomotor 1462 through mechanical connection 1461.

Summing resistor 1473 comprises a part of a setting network 1487 which also includes a fixed voltage divider made up of resistors 1490 and 1491, a summing resistor 1492, relay contacts 1091*p* and 1091*r*, and a variable voltage divider 1493 having a winding 1494 energized with unidirectional voltages of opposite polarity with respect to ground and a slider 1495 adjusted by a manual knob 1496.

FIGURE 27, to which reference should now be made, shows apparatus for controlling the throttles of the aircraft. The conventional throttle levers are shown at 1500 and 1501. Left throttle lever 1500 is driven through a mechanical connection 1502 by a servomotor 1503, and right throttle lever 1501 is driven through a mechanical connection 1504 by a servomotor 1505. Connections 1502 and 1504 may include such clutches or mechanical overrides as are deemed appropriate.

Motor 1503 is energized through a cable 1506 from a motor control amplifier 1507 like amplifier 804 of FIGURE 25. Energized from amplifier 1507 alternatively with motor 1503, as is better shown in FIGURE 29, is a centering motor 1510 connected to the amplifier by a cable 1511.

Three inputs are supplied to amplifier 1507. The first is supplied through a summing resistor 1512 from a throttle position signal device 1513 adjusted through mechanical connection 1502 simultaneously with lever 1500. The second input to amplifier 1507 is supplied through a summing resistor 1514 from a centering signal device 1515 driven through a mechanical connection 1516 by centering motor 1510. The third input to amplifier 1507 is supplied through an isolating resistor 1517 and a summing resistor 1518 from a throttle command signal device 1520 adjusted as will presently be described.

Motor 1505 is energized through a cable 1521 from a motor control amplifier 1522 like amplifier 804 of FIGURE 25. Energized from amplifier 1522 alternatively with motor 1505, as is better shown in FIGURE 29, is a centering motor 1523 connected to the amplifier by cable 1524.

Three inputs are supplied to amplifier 1522. The first is supplied through summing resistor 1525 from a throttle position signal device 1526 adjusted through mechanical connection 1504 simultaneously with lever 1501. The second input to amplifier 1522 is supplied through a summing resistor 1527 from a centering signal device 1528 driven through a mechanical connection 1530 by centering motor 1523. The third input to amplifier 1522 is supplied through an isolating resistor 1531 and summing resistor 1518 from throttle command signal device 1520.

Throttle command device 1520 is driven through a mechanical connection 1533 by a servomotor 1534. Connection 1533 is extended to drive a velocity generator 1535, and to further operate a switch shown in FIGURE 28. The line phase winding of motor 1534 is energized from source 949 through resistor 1536, phasing capacitor 1537, relay contacts 1192a, 1192b, 1192c, and relay contacts 1540a, 1540b, and 1540c, alternatively with the line phase winding of a second servomotor 541. The amplifier phase windings of motors 1534 and 1541 are alternatively energized from a motor control amplifier 1542 like amplifier 804 of FIGURE 25, through relay contacts 1192d, 1192e, and 1192f and relay contacts 1540d, 1540e, and 1540f. Through a mechanical connection 1543 motor 1541 drives a velocity generator 1544, and also a selected air speed signal device 1545. The primary windings of generators 1535 and 1544 are energized from source 949. The secondary windings are connected alternatively to supply anti-hunt signals to amplifier 1542 through relay contacts 1540g, 1540h, and 1540j, and relay contacts 1192g, 1192h, and 1192j.

The inputs to amplifier 1542 may be considered as being supplied from a selecting network 1546, a setting network 1547, a condition responsive network 1550 and a feedback network 1551. Selecting network 1546 includes signal device 1545, a fixed voltage divider made up of resistors 1552 and 1553, relay contacts 1540k, 1540m, and 1540n, and a summing resistor 1554.

Setting network 1547 includes a centering signal device 1555 adjustable by a manual knob 1556, resistors 1557, 1560, 1561 and 1562, relay contacts 1117a, 1117b, and 1117c, and a source 1563 of fixed unidirectional voltage.

Condition responsive network 1550 is shown to include an airspeed transducer 1564 and in the form of a D.C. strain gage bridge, and a summing resistor 1565.

Feedback network 1551 is shown to include a feedback signal source 1566 actuated through mechanical connection 1533 by motor 1534, resistors 1567, 1569, 1570, 1571, and 1572, capacitor 1573, and relay contacts 1540s and 1540u. Relay contacts 1540p, 1540q, and 1540r affect both the condition responsive network 1550 and the feedback network 1551.

FIGURE 28 shows the control circuit for the airspeed portion of the complete system, and may be considered as a continuation of FIGURES 21 and 22. Positive bus 983 extends across the top of the figure and ground bus 982 extends across the bottom of the figure.

One end of a first centering relay winding 1574 is grounded through conductor 1575, and the other end may be connected through conductor 1576, normally closed relay contacts 1193b and 1193a, conductor 1577, normally open relay contacts 1580c and 1580a in amplifier 1507, and conductor 1581 to bus 983.

One end of a second centering relay winding 1582 is grounded through conductor 1583, and the other end may be connected through conductor 1584, normally closed relay contacts 1193e and 1193d, conductor 1585, normally open relay contacts 1586c and 1586a in amplifier 1507, and conductors 1587 and 1581 to bus 983.

The common lead 1590 of servomotor 1503 is grounded. The motor can be energized for forward operation through conductor 1591, normally open relay contacts 1193c and 1193a, conductor 1577, relay contacts 1580c and 1580a, and conductor 1581, and for reverse operation through conductor 1592, normally open relay contacts 1193f and 1193d, conductor 1585, normally open relay contacts 1586c and 1586a, and conductors 1587 and 1581.

One end of airspeed calibration relay winding 1540 is grounded through conductor 1593. The other end may be connected through conductor 1594, switch arm 1595, one of switch contacts 1596 and 1597, conductor 1600, normally closed relay contacts 1193s and 1193t, and conductor 1601 to bus 983. Switch contact 1595 is normally centered out of contact with either contact 1596 or contact 1597, but is moved out of that position by mechanical connection 1533 when motor 1534 of FIGURE 27 operates.

One end of a third centering relay winding 1602 is grounded through conductor 1603 and the other end may be connected through conductor 1604, normally closed relay contacts 1193h and 1193g, conductor 1605, normally open relay contacts 1606c and 1606a in amplifier 1526 and conductor 1607 to bus 983.

One end of a fourth centering relay winding 1610 is grounded through conductor 1611, and the other end may be connected through conductor 1612, normally closed relay contacts 1193m and 1198k, conductor 1613, normally open relay contacts 1614c and 1614a in amplifier 1526, and conductors 1615 and 1607 to bus 983.

The common lead 1616 of servomotor 1505 is grounded. The motor may be energized for forward operation through conductor 1617, normally open relay contacts 1193j and 1193g, conductor 1605, normally open relay contacts 1606c and 1606a, and conductor 1607 and for reverse operation through conductor 1620, normally open relay contacts 1193n and 1193k, conductor 1613, normally open relay contacts 1614c and 1614a, and conductors 1615 and 1607.

Centering motor 1523 is a reversible D.C. motor and reverses with reversal of the polarity of voltage applied across its input terminals 1621 and 1622. The circuit for forward operation of motor 1523 may be completed from bus 983 through conductor 1623, normally closed relay contacts 1193p and 1193q, conductors 1624 and 1625, normally open relay contacts 1602c and 1602a, conductor 1626, terminal 1621, motor 1523, terminal 1622, conductor 1627, normally closed relay contacts 1610a and 1610b, conductor 1630, resistor 1631, and conductors 1632, 1633, 1634, 1635, and 1636 to ground bus 982.

The circuit for reverse operation of motor 1523 may be completed from bus 983 through conductor 1623, relay contacts 1193p and 1193q, conductors 1624, 1637, and 1640, normally open relay contacts 1610c and 1610a, conductor 1627, terminal 1622, motor 1523, terminal 1621, conductor 1626, relay contacts 1602a and 1602b, conductors 1641 and 1630, resistor 1631 and conductors 1632, 1633, 1634, 1635, and 1636 to ground bus 982.

Centering motor 1510 is a reversible D.C. motor and reverses with the reversal of the polarity of the voltage supplied to its input terminals 1642 and 1643. The circuit for forward operation of motor 1510 may be completed from bus 983 through conductor 1623, relay contacts 1193p and 1193q, conductors 1624, 1637, 1644, and 1645, normally open relay contacts 1574c and 1974a, conductor 1646, terminal 1642, motor 1510, terminal 1643, conductor 1647, normally closed relay contacts 1582a and 1582b, conductor 1650, resistor 1651, and conductors 1652 and 1636 to ground bus 982. The circuit for reverse operation of motor 1510 may be completed from bus 983 through conductor 1623, relay contacts 1193p and 1193q, conductors 1624, 1627, 1644 and 1653, normally open relay contacts 1582c and 1582a, conductor 1647, terminal 1643, motor 1510, terminal 1642, conductor 1646, relay contacts 1574a and 1574b, conductors 1654 and 1650, resistor 1651 and conductors 1652 and 1636 to ground bus 982.

One end of engage clutch 1655 of servomotor 1503 is grounded through conductor 1656, and one end of engage clutch 1657 of servomotor 1505 is grounded through conductor 1660. The other ends of these solenoids may be energized through conductors 1661 and 1662 respectively, conductor 1663, normally open relay contacts 1193r and 1193p, and conductor 1623 from bus 983.

FIGURE 29 is a wiring diagram of a typical comparator such as is shown at 246 in FIGURES 10 and 15 and at 414 in FIGURES 13 and 16. Alternating signal voltages of the same frequency but opposite phases with respect to ground are supplied at a pair of input terminals 1700 and 1701. These voltages are added in parallel through summing resistors 1702 and 1703 and their algebraic sum comprises the input to an amplifier 1704. The amplifier output is supplied to the grid of a control tube 1705 whose plate circuit includes the winding of relay 1706.

The control tube is energized with alternating voltages in phase with a first of the input signals. As long as the second input signal is greater than the first—or vice versa depending on the number of amplifier stages—the grid voltage on the control tube is out of phase with the plate voltage. When the relative magnitudes of the two input signals reverse, the grid and plate of the control tube are energized in phase and the tube conducts during alternate half cycles, so that relay 1706 is pulled in.

Operation

To illustrate the operation of the system, consider the case of an aircraft approaching the carrier from a remote point, and under the direct control of the human pilot. The aircraft is symmetrically loaded: it is in stable flight in some particular attitude about pitch and roll axes, and has some particular heading, some particular altitude, and some particular airspeed. Its landing gear, landing flaps, and dive brakes are retracted. For these initial aircraft conditions circuit breakers 985 and 987 of FIGURE 21 are open. The relay contacts of FIGURES 21, 22 and 28 are as shown in the figures, and switch 1062 of FIGURE 21 and switches 1134, 1138, 1162, 1184, 1220, and 1221 of FIGURE 22 are as shown. Switch 1230 of FIGURE 22 is closed. Turn control knob 788 is ordinarily centered, in which position device 783, FIGURE 18, gives a zero output, and switch 1157, FIGURE 22, is closed. Clutch 1241 of FIGURE 23 and clutch 785 of FIGURE 18 are disengaged, as are elevator, aileron, rudder, and throttle engage clutches in their respective servomotors. Contact 1595 may or may not be engaging one or the other of contacts 1596 and 1597, FIGURE 27.

As a first step in placing the system in operation, the human pilot turns on the compass system. As shown in FIGURE 24, this acts through conductor 1260 to energize rectifier 1256, and with it the line phase of motor 1252 and the primary winding of velocity generator 1253, as well as starting vibrator 1275. Unless the aircraft happens to be on the heading last selected, a signal is also supplied by follower 1247 through conductor 1254, relay contacts 1151a and 1151b and conductors 1265 and 1266 to amplifier 1051. This amplifier is not yet energized, however, so no operation of motor 1252 takes place.

The pilot next adjusts the heading selector of the compass system into agreement with the actual heading of the aircraft. The input to and hence the output of follower 1247 are thus reduced to zero.

The pilot now closes circuit breaker 985, FIGURE 21. This energizes amplifier 1051, FIGURE 24, through bus 983 and conductors 1052, and 1053. Now if the aircraft departs from the initial heading, follower 1247 supplies an output through relay contacts 1151a and 1151b to amplifier 1051, energizing motor 1252 through rectifier 1256 to readjust the follower until the signal supply thereby is reduced to zero. Thus follower 1247 is synchronized with the heading of the aircraft. The heaters in the lateral and vertical couplers may conveniently be energized at the same time.

Closing circuit breaker 985, FIGURE 21, results in energization of turn control clutch solenoid 786 through bus 983 and relay contacts 994g and 994h to connect motor 781 of FIGURE 18 to shaft 784. Heater 1057 of the time delay relay, FIGURE 21, is energized through conductors 1060 and 1061 and begins to heat, and scissors relay winding 1070, FIGURE 22, is energized through switch 1230, so that its contacts 1070a and 1070c, FIGURE 21, are now closed.

Closing circuit breaker 985 also results in energizing relay 1540, FIGURE 28, if movable contact 1595 is in an engagement with either of fixed contacts 1596 and 1597.

The human pilot now closes circuit breaker 987, starting alternator 986. Amplifiers 753, 755, 827 and 831 of FIGURE 18, amplifiers 870 and 872, of FIGURE 19, amplifiers 923 and 930 of FIGURES 19 and 26, amplifier 964 of FIGURE 20, amplifier 1244 of FIGURE 23, and amplifiers 1507 and 1522 of FIGURE 27, are energized from alternator 986 in conventional fashion, not shown. Alternating voltage is supplied to transformer 954 and velocity generator 972 to FIGURE 20, force balance 1233 and altitude sensor 1235 of FIGURE 23, amplifier 804 and the heaters of amplifier 1815 and electronic switch 817, of FIGURES 18 and 25, and amplifier 1542, velocity generators 1535 and 1544, and motor 1541 of FIGURE 27, the latter through resistor 1536, capacitor 1537, relay contacts 1192a and 1192b and relay contacts 1540a and 1540b. Relay winding 990 of FIGURE 21 is also energized, and its contacts 990a and 990c, FIGURE 21, close and remain closed as long as circuit breaker 987 remains closed, unless inverter 986 fails. Most of the signal sources in the airborne equipment are energized with D.C. which is derived in a conventional fashion from the output of alternator 986. Accordingly when circuit breaker 987 is closed there results energization of the yaw rate, roll rate, side slip and roll angle sensors, the aileron and rudder position devices, and turn command device 783 of FIGURE 18, the pitch rate, pitch angle, and up-elevator sensors, elevator position device 866, and pitch command device 896 of FIGURE 19, output device 1242 of FIGURE 23, voltage dividers 1336 and 1337 of FIGURE 25, voltage dividers 1396, 1465, 1412, 1420, 1484, and 1493 of FIGURE 26, and members 1513, 1515, 1520, 1528, 1526, 1545, 1555, and 1566 of FIGURE 27. In addition, the signals represented by reference numerals 906 of FIGURE 19, 1366 and 1367 of FIGURE 25, and 1563 of FIGURE 27, as well as the source energizing bridge 1564 of FIGURE 27, may also be obtained in the same manner, and the fixed potential across resistors 1425, 1426 and 1427 and that across resistors 1481, 1482, and 1483 of FIGURE 26, may also be derived from the same source.

After amplifier 964, FIGURE 20, warms up, motor 966 operates to position its shaft in accordance with the unbalance of bridge 959, so that sliders 766, 777, 850, 856, 884, 890, and 936 are set at positions along their windings determined by the airspeed of the aircraft. After amplifier 1244, FIGURE 23, warms up, motor 1237 positions shaft 1236 in accordance with the actual altitude of the aircraft, but since clutch 1241 is disengaged no output from device 1242 results. After amplifier 804 of FIGURE 25 warms up, motor 795 operates to center slider 1334, since the only signal to amplifier 804 is that from slider 1334: slider 1335 is simultaneously centered.

After amplifier 923 of FIGURE 26 warms up motor 912 operates to center slider 1486 since the only signals to amplifier 923 are those from rebalance slider 1486 and centering slider 1495: slider 1464 is simultaneously centered. In the same fashion, after amplifier 930 warms up motor 913 operates to center slider 1414, since the only signals to amplifier 930 are those from rebalance slider 1414 and centering slider 1422: slider 1395 is simultaneously centered.

In FIGURES 27 and 28, if movable contact 1595 is not centered between fixed contacts 1596 and 1597, relay 1540 is energized and contacts 1540a and 1540c, contacts 1540d and 1540f, contacts 1540g and 1540j, contacts 1540k and 1540n, contacts 1540p and 1540r, and contacts 1540s and 1540u are in engagement. After amplifier 1542 warms up motor 1534 runs to center feedback slider 1566 to zero, since the only inputs to amplifier 1542 are the feedback and centering inputs: at the same time the throttle command signal from device 1520 is reduced to zero. When this has been accomplished, movable contact 1595 is between fixed contacts 1596 and 1597, and relay 1540 is de-energized. After amplifier 1507 warms up relay 1580 or relay 1586, FIGURE 28 pulls in, if there is any input to the amplifier, energizing relay 1574 or relay 1582. This causes operation of centering motor 1510 in one direction or the other, adjusting centering device 1515, FIGURE 27, to return the amplifier input to zero. After amplifier 1522 warms up, relay 1606 or relay 1614, FIGURE 28, pulls in, if there is any input to the amplifier, energizing relay 1602 or relay 1610. This causes operation of centering motor 1523 in one direction or the other, adjusting centering device 1528, FIGURE 27, to restore the input to zero. Thereafter any adjustment of throttle levers 1500 and 1501 by the human pilot results in adjustment of centering devices 1515 and 1528 by the centering motors, and the power control system is synchronized with the throttle levers.

In the aileron channel of the automatic pilot, referring to FIGURE 18, signal device 751 is supplying an output representative of the position of the ailerons of the aircraft: if this output is changing a signal determined by the rate of change is supplied to summation point 756 through capacitor 772. A signal representative of the roll rate of the craft is supplied to summation point 756 through summing resistor 767, after non-linear modification in voltage divider 765 in accordance with the airspeed of the aircraft. No signal is supplied through summing resistor 762 by compass coupler 763, since its output is grounded by relay contacts 1151g and 1151h, FIGURE 24. The vertical gyroscope of the aircraft supplies to summation point 774, FIGURE 21, a signal representative of the roll angle of the craft, through summing resistor 792. No signal is supplied through summing resistor 793 by lateral coupler 94, since its output conductor 800 is grounded through relay contacts 1100p and 1100q, and relay contacts 1095s and 1095t, FIGURE 25.

Turn command device 783, FIGURE 18, supplies to summation point 774 through summing resistor 791 a signal determined by where the knob is set, that is, a zero signal. The signal on summation point 774 is supplied to summation point 756, after non-linear modification in voltage divider 776 in accordance with the airspeed of the aircraft. For the stable condition of level flight in a fixed direction, the roll rate and roll angle signals are zero and the aileron position is unchanging: the input to network 760 is accordingly zero and no energization of servo amplifier 753 takes place.

It is not essential, however, that the aircraft achieve stable, level, directed flight before the system can be used. If the aircraft is banking or has a rate of turn, or if the ailerons are moving, one or more of the signals through resistors 792, 767, and 773 is other than zero. The sum of all such signals is supplied through network 760 and D.C. amplifier 735 to servo amplifier 753, which acts, after it warms up, to close relay contacts 996a and 996c or relay contacts 1001a and 1001c, FIGURE 21, depending on the sense of the signal at amplifier 760. If relay contacts 996a and 996c close, the circuit for forward operation of centering motor 781 is completed through relay contacts 994a and 994b, and the motor operates until the signal from command device 783 of FIGURE 18, when supplied to summation point 756, is just sufficient in magnitude and proper in sense to balance out the sum of all the other signals. When this condition is reached, the servo amplifier opens the relay contacts and the centering motor operation ceases.

If relay contacts 1001a and 1001c of FIGURE 21 close, the circuit for reverse operation of centering motor 781 is completed through relay contacts 994d and 994e, and the motor again operates to adjust device 783 until the amplifier input is once more zero.

Return of the roll angle and roll rate signals to zero causes opposite operation of motor 781 to recenter device 783.

Whenever device 783 is actuated away from its normal central position, switch 1157 of FIGURE 22 opens its contacts: at this time, however, such operation is without effect in the system.

In the rudder channel of the automatic pilot, referring again to FIGURE 18, signal device 825 is supplying a signal representative of the position of the rudder of the aircraft through summing resistor 844 to summation 843. Signal device 751 is supplying a second signal proportional to the position of the ailerons of the aircraft through summing resistor 852 to summation point 843. If the aircraft has any yaw rate, a signal representative thereof is also supplied through summing resistor 857 to summation point 843. If the voltage at that point is changing, due to change in any of the above three voltages, a signal representative of the rate of that change is supplied through capacitor 842 to summation point 832. If the aircraft is sideslipping, a signal representative thereof is supplied to summation point 832 through resistor 836, and if the aircraft has any roll rate a signal representative thereof is supplied to summation point 832 through summing resistor 840. The roll rate, aileron position, and yaw rate signals are modified as non-linear functions of airspeed by voltage dividers 765, 847, and 855, the latter modification being rendered further non-linear by the resistor 860. For the stable condition of level flight in a fixed direction the roll rate, yaw rate, and side slip signals are zero and the aileron and rudder position signals are unchanging: the input to network 834 is accordingly zero and no energization of servo amplifier 827 takes place. If the aircraft is rolling, yawing, or sideslipping, or if the rudder or ailerons are moving, one or more of the signals through resistors 840, 857, 836, 844 and 852 is other than zero. The sum of all such signals is supplied through network 834 and D.C. amplifier 831 to servo amplifier 827, which acts, after it warms up, to close relay contacts 1035a and 1035c or relay contacts 1041a and 1041c, FIGURE 21, depending on the sense of the residual signal. In either case, however, the energizing circuit for motor 821 is at present interrupted at relay contacts 1037a and 1037c, and no operation of the motor results.

In the elevator channel of the automatic pilot, referring now to FIGURE 19, signal device 866 is supplying an output representative of the position of the elevators of the aircraft: if their position changes a signal is supplied to summation point 873, through capacitor 880, which is proportional to the rate of change. If the craft has any pitch rate, a voltage representative thereof appears on slider 884, after nonlinear modification in accordance with the airspeed of the aircraft, and if the modified voltage has any rate of change a signal determined thereby is supplied to summation point 873 through capacitor 885. No signals are supplied to summation point 893 through summing resistors 908 and 909, by vertical coupler 97, since its outputs are grounded by relay contacts 1174g and 1174h and relay contacts 1174k and 1174m, respectively, FIGURE 26. No signal is supplied to summation point 893 (FIGURE 19) through resistor 905, because of the grounding action of relay contacts 907a and 907b. Pitch command device 896 is in some random position and supplies a random signal to summation point 893 through summing resistor 902, and pitch angle and up-elevator signals are supplied to summation point 893 from the vertical gyroscope through summing resistors 903 and 904. The signal at point 893 is supplied to summation point 873 after nonlinear modification in accordance with the airspeed of the aircraft.

For the stable condition of level flight the pitch rate and up-elevator signals are zero and the elevator position is unchanging, but if the craft is pitching or rolling, all the signals may become values other than zero. If the sum of all the signals supplied to summation point 873 is not zero, the residual signal is supplied through network 875 and D.C. amplifier 872 to servo amplifier 870, which acts, after it warms up, to close relay contacts 1020a and 1020c or relay contacts 1023a and 1023c, FIGURE 21, depending on the sense of the residual signal. If relay contacts 1020a and 1020c close, the circuit for forward operation of centering motor 894 is completed through relay contacts 1016a and 1016b, and the motor operates until the signal from command device 896 of FIGURE 19, when supplied to summation point 873, is just sufficient in magnitude and proper in sense to balance out the sum of all the other signals. When this condition is reached, the servo amplifier opens the relay contacts and centering motor operation ceases.

If relay contacts 1023a and 1023c of FIGURE 21 close, the circuit for reverse operation of centering motor 894 is completed through relay contacts 1016d and 1016e and the motor operates until the amplifier is again zero.

Upon operation of aileron centering motor 781 or elevator centering motor 894, in either direction, anti-engage relay winding 1010 is energized, and relay contacts 1010a and 1010b, FIGURE 21, are held open, thus preventing engagement of the aileron or elevator channels of the automatic pilot by the human pilot. When both centering motors are inoperative, the relay contacts close.

As the aircraft changes in attitude, by reason of external forces or of operation of the controls by the human pilot, motors 781 and 894 operate to continuously maintain the electrical automatic pilot in coordination with the aircraft, so that the automatic pilot may be placed in control of the aircraft regardless of what attitude the aircraft may be in, as long as it is not in a transient condition which results in operation of one or both of the centering motors. Coordination between the aileron and rudder channels of the automatic pilot is brought about by the roll rate signals supplied to summation point 832, and the coordination between the aileron and elevator channels of the automatic pilot is brought about by the up-elevator signals supplied to summation point 893.

It will be appreciated that the automatic pilot disclosed in FIGURES 18 and 19 is in simplified form, and that many refinements have been omitted for the sake of clarity in illustrating the invention. It will be obvious to those skilled in the art that caging of the vertical gyroscope, roll erection cut-out during turns, and other well-known features can be added at the choice of the designer.

After a predetermined warm-up interval the time delay relay 1057, FIGURE 21, closes its contacts 1057a and 1057c, and these contacts remain closed as long as circuit breaker 985 remains closed.

The next step is for the human pilot to operate yaw damper engage knob 1132, FIGURE 21, completing the holding circuit for yaw damper engage switch 1062 through contacts 1070a and 1070c of scissors relay 1070, which is energized because the scissors switch is closed as described above. Switch 1062 now remains closed—unless the inverter fails, or unless circuit breaker 987 opens, allowing the relay contacts 990a and 990c to open, or unless circuit breaker 985 opens—until the weight of the aircraft is taken on the landing gear, when scissors switch 1230, FIGURE 22, de-energizes relay winding 1070, allowing the contacts 1070a and 1070c to open. Of course the pilot can disengage the yaw damper engage switch at any time by manually operating knob 1132.

Closure of yaw damper engage switch 1062 completes at contacts 1062a and 1062c the energizing circuit for yaw damper engage relay 1037, and relay contacts 1037a and 1037c complete the circuit from bus 983 to relay contacts 1035a and 1041a in rudder servo amplifier 827. Relay 1037 also acts through contacts 1037d and 1037f to energize the rudder servo clutch 824.

Now if the signal at summation point 832, FIGURE 18, is zero, no operation of rudder servomotor 821 takes place, but if the signal at summation point 832 is not zero, rudder servomotor 821 operates to change the rudder position and to vary the voltage at source 825. Change of the rudder position also results in a change in the yaw rate of the aricraft and modifies its side slip, and the accompanying roll of the aircraft results in a roll rate signal: and if the ailerons are adjusted by the human pilot, the signal from source 751 also changes. The rudder channel ultimately reaches a dynamic equilibrium determined, in accordance with the aerodynamic characteristics of the particular aircraft being used, by the choice of source voltage values, and values of component resistors and capacitors. A circuit of this sort is known as a yaw damper, and is necessary for modern aircraft which are not inherently stable.

When yaw damper engage switch 1062 has been operated and anti-engage relay 1010, FIGURE 21, is de-energized, autopilot engage switch 1134 of FIGURE 22 will remain closed if operated, and the next step is for the human pilot to operate this switch by knob 1141. Switch contacts 1134a and 1134c complete the switch holding circuit, and the switch remains operated unless automatic pilot release switch 1138 is operated by the human pilot, or unless the yaw damper engage switch 1062 opens. Operation of release switch 1138 does not, however, release the yaw damper engage switch.

Closure of contacts 1134a and 1134c also completes the energizing circuit for aileron engage relay 994 and elevator engage relay 1016. Relay 994 de-energizes turn control clutch 786, FIGURE 21, at contacts 994g and 994h, and acts through relay contacts 994a and 994b and contacts 994d and 994e to interrupt the circuit energizing centering motor 781, and through contacts 994a and 994c and contacts 994d and 994f to complete instead the circuit energizing servomotor 745. Relay contacts 994g and 994j energize the aileron and elevator engage solenoids 750 and 865.

Relay 1016 acts through contacts 1016a and 1016b and contacts 1016d and 1016e to interrupt the circuit energizing elevator centering motor 894, and through contacts 1016a and 1016c and contacts 1016d and 1016f to complete instead the circuit energizing servomotor 862.

Closure of switch 1134, FIGURE 22, completes the energizing circuit through turn control contact 1156. If the aircraft is not in straight, wing-level flight turn command device 783 of FIGURE 18 is giving some output, and contact 1155 of FIGURE 22 is displaced from contact 1156. To complete whatever maneuver is in progress the human pilot operates pitch control knob 900 and turn control knob 788 of FIGURES 19 and 18: the later operation is facilitated by the fact that shaft 784 is now disconnected from motor 781 by de-energization of clutch 785. When straight, wing-level flight is achieved, turn command device 783 no longer supplies an output, and contacts 1155 and 1156 of FIGURE 22 are in engagement. A circuit is then completed through relay contacts 1095d and 1095e to energize relay winding 1151. As shown in FIGURE 24 this acts through relay contacts 1151a and 1151b to disconnect compass follower 1247 from amplifier 1051, and to connect it instead, through contacts 1051a and 1051c, to transformer 1270: through relay contacts 1151d and 1151f the input to amplifier 1051 is grounded, thus immobilizing motor 1252, and contacts 1151g and 1151h unground the output of the compass coupler. Now if the aircraft is on the selected heading, follower 1247 supplies no output, no voltage appears across the secondary winding of coil 1270, and network 1282 supplies no output. If the aircraft deviates from the selected heading an alternating voltage of one phase or the other from follower 1247 appears across secondary winding 1271, is rectified by synchronous vibrator 1275 and filtered by network 1282, and appears between conductor 1283 and ground as a direct voltage. The magnitude of this output voltage is determined by the amplitude of the follower output, that is, by the amount of the deviation of the heading of the aircraft from that selected, and the polarity of the output voltage is determined by the phase of the follower output, that is, by the sense of the deviation.

The result of closing the automatic pilot engage switch is accordingly to disable the aileron and elevator centering motors, thus fixing the signals supplied by source 783, FIGURE 18, and source 896, FIGURE 19, and to connect the outputs of the aileron and elevator servo amplifiers to the aileron and elevator servomotors. In addition, a heading control signal is made available to the automatic pilot from compass coupler 90 which can be disabled by operation of turn control knob 788 to adjust signal source 783 if the human pilot desires to change the heading of the aircraft.

If the aircraft was truly in level, directed flight when the yaw damper engage switch and automatic pilot engage switch were closed, no operation of any control surface servomotor results. If it was not in such flight, or if it departs therefrom, signals may appear which are representative of the pitch and roll angles and the heading error of the aircraft, its side slip, its pitch, roll, and yaw rates, and the displacement of its control surfaces from stream-lined positions. These signals, appropriately modified in accordance with the airspeed of the aircraft, or their rates of change, are supplied to the servo amplifiers, and the control surfaces of the aircraft are adjusted in accordance with the signals, until stable flight in the desired direction and attitude is achieved.

If after the automatic pilot is engaged the human pilot desires to change the heading of the craft temporarily or permanently, he turns knob 788. As shown in FIGURE 22, this disengages contacts 1155 and 1156, de-energizing relay 1151. In FIGURE 24 it is shown that this disconnects follower 1247 from transformer 1270 and ungrounds conductor 1266, so that the compass coupler is restored to the condition in which motor 1252 adjusts follower 1247 to agree with the compass output, and the compass coupler signal is removed from the aileron circuit of FIGURE 18 by relay contacts 1151h and 1151g. In FIGURE 18 it is shown that operation of knob 788 adjusts device 783, so that a new signal is supplied on conductor 790 and the input to aileron servo amplifier 753 is no longer zero. Servomotor 745 operates to adjust the ailerons, thus changing the roll angle and roll rate of the aircraft, and starting a change of heading which is accompanied by a yaw rate. The changed aileron position, yaw rate and roll rate signals result in an input to rudder servo amplifier 827 which is no longer zero, and adjustment of the rudder of the craft to coordinate the turn results. There quickly follows a stable turn of the aircraft in the desired direction, at a rate determined by the amount of rotation of knob 788. If the turn is to be permanent, the human pilot adjusts the heading selector in the compass to the new desired heading. Motor 1252 of FIGURE 24 adjusts follower 1247 into agreement with the heading selected. Then when the aircraft achieves the desired heading, the human pilot simply returns turn control knob 788 to its central position. This restores the signal from device 783 to zero, and by action of the contacts 1155 and 1156 of FIGURE 22 restores the compass signal, which is instantaneously zero. By operations just the reverse of what has been described, the aircraft returns to level flight in the new direction.

If the turn is to be temporary, on the other hand, the human pilot does not adjust the heading selector. When a sufficient turn has been made he simply restores the turn control knob to its central position, and then displaces it in the opposite direction, to return the craft to its original course.

The airborne apparatus is now as wholly in operation as is possible until radio signals are received from the carrier based equipment, and the human pilot turns on the radio receiver 147 and listens for voice communications. The carrier based equipment is put in operation as will now be described.

The initial condition of the carrier based equipment is as follows. Aided tracking device 57, FIGURE 4, is in some random position depending on where it was last set, and the same is true of the antenna 61 of precision radar 60. Initial set devices 180 and 181 of FIGURE 7 are set at +3000 yards and −1000 yards. The movable contacts of FIGURES 8 and 9 are at random positions determined by where they were last set, and switch 168, FIGURE 7, may be either open or closed. Parallax devices 244 and 245 of FIGURE 10 have been adjusted in accordance with the horizontal components of the displacement of the precision radar antenna from the touchdown point, and initial set devices 242 and 243 are set at +289 yards and +2000 yards. Comparator 246 is set to operate when $Y_p$ becomes less than +2134 yards. Parallax devices 354 and 384 of FIGURE 13 have been adjusted in accordance with the vertical and longitudinal displacements of the precision radar antenna from the touchdown point, and initial set devices 356 and 383 of that figure are set at +160 feet and +1940 yards, respectively. Comparator 414 is set to operate when the signal on conductor 415 becomes greater than that on conductor 413. Initial set device 401 is set at the sum of the minimum landing speed of the aircraft added to the forward speed of the carrier: for one combination of aircraft and carrier speed this setting is 106.5 knots. Slider 473 of FIGURE 14 is set so as to coordinate the lower end of the travel of sliders 420 and 421 with the mean elevation of the touchdown point. The various relays and motor driven switches in FIGURES 7, 10, 12, 13, 15, and 16 are in the positions shown, switches 496 and 553 of FIGURE 15 are open, and switch 547 is closed.

As the first step in putting the carrier based equipment into operation the marshalling and precision radars are turned on and allowed to warm up, and the marshalling antenna 55 is set in motion.

The alternating voltage supply indicated by reference numeral 202 is turned on, and energizes the output devices of aided tracking unit 57, initial set devices 180 and 181, converter 182, and generator 184 of FIGURE 7, the output devices of precision radar 60, parallax devices 244 and 245, initial set devices 242 and 243, and generators 266 and 264 of FIGURE 10, the output devices of precision radar 60, parallax devices 354 and 384, initial set devices 356, 383 and 401, and signal devices 361, 364, and 403 of FIGURE 13, and switch 496 of FIGURE 15. Electrical energy is supplied in any conventional fashion to servo systems 157 and 160, FIGURE 7, 226, FIGURE 10, 313, FIGURE 12, and 363, FIGURE 13, to amplifiers 222, FIGURE 10 and 350 and 375, FIGURE 13, and comparators 246, FIGURE 10 and 414, FIGURE 13.

When servo system 157 of FIGURES 7 and 8 warms up, shafts 161 and 162 are driven to positions determined by the output 65 from unit 57, and when servo system 160 warms up shafts 164, 165, and 167 are driven to positions determined by output 67 of unit 57. Outputs are accordingly supplied at 120 and 121: as shown in FIGURE 12 conductor 120 is grounded at relay contacts 286a and 286b of signal transfer control 115, and the similar relay 344 performs the same function for conductor 121 in signal transfer control 116. Servo system 313 of control 115, FIGURE 12, accordingly has a zero input signal, and when the servo system warms up phase shifter 338 is driven to a zero position. Phase shifter 341, FIGURE 17, is likewise driven to zero because of the similar action of a pair of relays 344 and 345.

When servo system 226, FIGURE 10, warms up, generator 266 is adjusted in accordance with initial set device 243. The output of amplifier 222, after it warms up, is determined by the sum of the signal supplied by initial set device 242 and that supplied by generator 266, and appears at 122. A zero signal appears at 123, because of the grounding action of relay contacts 254a and 154b. As shown in FIGURE 12 conductor 122 is grounded at relay contacts 287a and 287b of signal transfer control 115, and the similar relay 345 performs the same function in signal transfer control 116.

Precision radar 60 is giving random signals at 71 and 74 of FIGURE 10, but they are without significance at this time, and are cut off by the contacts of relay 232. Random signals are also being supplied by the precision radar at 72, 73, and 74 of FIGURE 13: these are without significance and are cut off by the contacts of relay 357.

When amplifier 375 of FIGURE 13 warms up, device 396 is adjusted in accordance with the relationship between the signals from initial set devices 383 and 401. This part of the system is a computer of $t$, the time required for an aircraft moving at a speed $s$ to travel a distance $Y_p$ according to the well known principle that rate of motion multiplied by time of travel equals distance traveled. The time $t$ appears as the rotation of shaft 393, and device 403 is adjusted accordingly. Device 403 is arranged to give an output which is a non-linear function of time $t$ and represents the relation between altitude and time for a particular let-down course, as previously described. Due to the effect of the initial set devices 383 and 401, device 403 is set to a maximum value of altitude which is somewhat greater than that at which any aircraft is expected to be flying, and a constant, relatively large signal appears at 413. Devices 361 and 364 are supplying some random signals depending on where they were set when servo system 363 was turned off, but the signal 415 from device 364 is in any case less than that from device 403, so that comparator 414 does not operate. The signal to amplifier 350 is thus the sum of that from initial set device 356 and that from device 361. If that sum does not equal zero amplifier 350 supplies an output at 351, and this causes operation of servo system 363 to adjust device 361 until the signals are zero, that is, until the servo system output is equal to the initial set value.

The signal on conductor 351 is thus brought to zero, but in any case the input to vertical signal transfer control 131 is grounded by the contacts of relay 486, so that phase shifter 348 is driven to zero.

Radio command transmitter 118, FIGURE 17, is now turned on, and when it is warmed up generator 637 and oscillators 641, 652, 653, and 654 begin to operate. As just explained, phase shifters 338, 341, and 348 have been set at zero positions, so that oscillators 652, 653, and 654 are all modulated at zero phase angle compared to the modulation of oscillator 641. Oscillators 662, 663, and 664 warm up into their unkeyed conditions. Amplifier 667 warms up and voice transmission from microphone 665 becomes possible. The four modulated oscillator signals and the voice signal are mixed and their sum acts, when units 655, 670, 677, 680, and 683 warm up, to modulate transmitter 683. As a result there is radiated from antenna 684 and received at antenna 685 a complex radio signal. This signal is amplified and its carrier is removed in receiver 686, the voice frequencies are transmitted through amplifier 694 and filter 696 to head phones 700, and the modulated sub-carriers are separated by filters 702, 703, 704, and 705 to supply zero D.C. outputs at 717, 723 and 727. These signals are without effect in lateral computer 94 and vertical computer 97 because of relay contacts which prevent them from reaching the respective coupler amplifiers.

Referring to FIGURE 25 it will be evident that in the lateral computer the signal on conductor 717 is fed through resistance-capacitance network 1285 to conductor 1295, that a selected portion of the signal on conductor 723 is fed through resistance-capacitance network 1307 to conductor 1312, and that the full signal on conductor 723 is fed through resistance-capacitance network 1314 to conductor 1323. Conductors 1295, 1312, and 1323 are connected together, but are cut off from amplifier 804 at relay contact 1095j. Capacitor 1360 is grounded at relay contact 1095q, so that no effect is exercised on amplifier 804 through resistor 1365. Thus the only input to amplifier 804 is that supplied through relay contacts 1095k and 1095m from follow-up device 1336, and motor 795 accordingly runs to set slider 1334 at the point of ground potential at the center of winding 1340. At this motor shaft position the voltage on slider 1335 is also zero. The output circuit of the lateral coupler is grounded at contact 1095t, so that no control effect is exerted by the coupler.

Referring to FIGURE 26, it will be evident that in the vertical coupler the signal on conductor 727 is cut off from the rest of the coupler at relay contact 1100kk. Conductor 943 leads to device 1242 of the altitude controller, which is at present spring centered and gives no output. Two signals do appear at the input to amplifier 923. The first signal is supplied through resistor 1473 and is a centering voltage derived from voltage divider 1493. The second signal is supplied through resistor 1472 and relay contacts 1174a and 1174b in accordance with the voltage drop across resistor 1483: this voltage is determined by the resistance of resistors 1481, 1482, and 1483, when slider 1486 is at the same potential as the common point between resistors 1481 and 1482: for all other settings of the slider the voltage drop across resistor 1483 has a component determined by the position of slider 1486. Amplifier 923 causes operation of motor 912 to reduce the amplifier output to zero by adjusting slider 1486, and slider 1464 is simultaneously adjusted. Motor 912 stops with sliders 1486 and 1464 positioned to be at ground potential.

Also in FIGURE 26 it will be evident that two signals are fed to amplifier 930. One of these is a centering voltage supplied through resistor 1404 from voltage divider 1420, and the other is a rebalance voltage supplied through resistor 1403 from voltage divider 1412.

Motor 913 operates to adjust slider 1414 until the signals are equal, and slider 1395 is simultaneously adjusted. Motor 913 stops with sliders 1414 and 1395 positioned to be at ground potential.

Resistors 1433 and 1437 are chosen to have high resistance compared to resistor 1443, as are resistors 1431 and 1406. By this means a high degree of isolation of the two amplifiers from one another is obtained, and the centering and feedback voltages are substantially without effect except on a single amplifier.

The outputs from the vertical coupler are grounded at relay contacts 1174g and 1174h and contacts 1174k and 1174m, so that no control effect can be exerted by the coupler.

The operator of the carrier based equipment is now in position to observe on the marshalling radar screen the location of all aircraft in an area surrounding the carrier, and to communicate by voice with any of them which have suitable receivers. It is understood that a conventional radio receiver is available at the carrier, by which the operator can receive voice transmission from aircraft approaching the carrier, and the pilots of the aircraft call the carrier by radio to identify themselves. By requesting an identified pilot to perform a routine maneuver, such as a 15 degree turn for example, it is possible for the operator to correlate each approaching aircraft with a particular pip on the radar screen. These matters are secondary to the invention, and it will now be assumed for simplicity that there is only one aircraft in the area.

Switch 496 of FIGURE 15 is now closed, causing white pilot light 497 to go on. If switch 168 is closed, relay 514 pulls in, and its contacts 514a and 514c cause red pilot light 503 to go on. If this occurs, the operator adjusts the Y control of aided tracking unit 57 to a value more negative than −440 yards, switch 168 opens, relay 514 drops out, and the red pilot light goes out. This operation of relay 514 keys oscillator 662 of FIGURE 17 and thus transmits a signal which would operate relay 732 of an aircraft within range of the transmitter, as will be more fully disclosed below. Accordingly it is better practice to adjust the Y control of the aided tracking unit before closing switch 496.

The carrier equipment operator next momentarily closes ready switch 553, completing a circuit through relay contacts 514d and 514e to ready relay 170, which pulls in, closing its own holding circuit at contacts 170g and 170j through switch 547, and acting at contacts 170k and 170n, FIGURE 16, to energize relay windings 286 and 344 through relay contacts 287k and 287n and relay contacts 345k and 345n respectively. Green pilot light 555 of FIGURE 15 is also energized. As shown in FIGURE 7 relay 170 acts to supply to servo systems 157 and 160 a pair of initial condition signals from devices 180 and 181, which were set at +3000 yards and −1000 yards respectively. These are the values which X and Y from the aided tracking unit will have when the aircraft being tracked reaches the point A', FIGURE 1. Since the combination of X=−1000 and Y=+3000 represents a point on the desired path, the operation of servo systems 157 and 160 (FIGURES 8 and 9) in response to these inputs brings movable contacts 186 and 204 to positions of zero potential, and the signals supplied to transfer controls 115 and 116, FIGURE 5, are zero.

Relays 286 and 344, FIGURE 16, complete holding circuits for themselves independent of relay 170, through contacts 286g and 286j and contacts 344g and 344j, and also open at contacts 286d and 286e and contacts 344d and 344e respectively, FIGURE 15, holding circuits which rendered relay 170 independent of switch 547.

When ready switch 553 is released no change in relay operations takes place.

By this time the aircraft has come close enough to the command transmitter for the signal received therefrom to become reliable, and relay 690 of FIGURE 17 pulls in. No immediate change in the system results, however, because relay contacts 690a and 690c of FIGURE 21 are in series with relay contacts 732a and 732c which are now open.

Marked on the face of the marshalling radar is a reproduction of curve A'B'C'D'E' of FIGURE 1, to a suitable scale. When an aircraft appears on the marshalling radar screen, the carrier operator directs the pilot to fly his aircraft so that its image on the radar screen approaches and follows the path marked thereon. This process is begun when the aircraft is at some distance from the carrier, and the human pilot brings the aircraft to the desired altitude shortly before the point A' is reached.

At this time the wing flaps and landing gear are let down, closing the switches 1220 and 1221 in FIGURE 22, respectively. Relay 907 is energized and as shown in FIGURE 19 its contacts 907a and 907c act to add in the elevator control a fixed signal which is selected to compensate for the change in aircraft aerodynamics about the pitch axis resulting from lowering the flaps.

The human pilot next closes altitude control engage switch 1162, FIGURE 22, by knob 1166. The holding circuit for the switch is completed through contacts 1162a and 1162c and relay contacts 1100d and 1100e as long as relay 1100 remains un-energized. Relay winding 1174 is energized through further relay contacts 1100g and 1100h, and the winding of 1170 altitude control engage clutch 1241, FIGURE 23, is also energized, locking device 1242 to shaft 1236, so that thereafter the operation of device 1242 is representative of the departure of the aircraft from the desired altitude.

As shown in FIGURES 23 and 26, the output on conductor 943 from device 1242 is supplied to amplifier 923, after modification in accordance with airspeed in voltage divider 937, together with the centering voltage from slider 1495. Capacitor 1475 is ungrounded by relay contacts 1174d and 1174e, and a feedback circuit from slider 1486 through resistor 1477 and capacitors 1475 and 1476 in parallel is completed through relay contacts 1174c and 1174a and summing resistor 1472 to amplifier 923.

An output circuit is at the same time completed by contacts 1174g and 1174j to supply a signal on conductor 916 to the elevator channel of the automatic pilot, and because of the capacitors 1475 and 1476 and the gear ratio in motor 1462 this output is a time integral function of the input on conductor 943. Capacitor 1450 in the input circuit modifies the input in accordance with its rate of change.

The modified input is also supplied through isolation network 1430 to amplifier 930, together with the centering voltage from slider 1422. An output circuit is at the same time completed by contact 1174k and 1174n to supply a further signal on conductor 920 to the elevator channel, and this signal by reason of feedback circuit 1407 is representative of the input on conductor 943.

As long as the aircraft remains at the desired altitude, the signal on conductor 943 is zero and no output is supplied to the elevator channel, but if the aircraft departs from the desired altitude a combined proportional and integral correction for the departure is made.

During this interval the aircraft has been approaching the point A': it is desired to have the aircraft moving along the line B'A' extended so that the carrier operator will be able to operate aided tracking device 57, FIGURE 4, into complete coordination with the aircraft motion as shown by the marshalling radar scope. When this is done the precision radar antenna is following the aircraft by reason of operation of resolver 64 and servo amplifier 63, and when the aircraft is a point A', the carrier operator pushes start switch 547 of FIGURE 15.

Operation of switch 547 extinguishes lamp 555 and de-energizes relay 170 by opening its holding circuit. This results in substituting the aided tracking signals and 61 for the initial set signals, in FIGURE 7, as inputs to servo systems 157 and 160. If the aircraft is actually at the point A', switch over from set to actual values of X and Y produces no change. If the aircraft is not at the point A' the actual X signal of the actual Y signal, or both, differ from the set values. Accordingly operation of either or both of servo systems 157 and 160, FIGURE 7, begins and a signal other than zero is supplied to transfer control 115, FIGURE 5: because of the construction of generator 184, FIGURE 9, no signal is supplied at 121, since movable contact 204 is in contact with member 210. Phase shifter 338 of FIGURE 17 is readjusted, the phase modulation produced by modulator 652 is changed, and a new complex signal is transmitted to the aircraft and demodulated. The resulting new D.C. potential supplied on conductor 717 to FIGURE 25 is modified in network 1285 and is transmitted through relay contacts 1091h and 1091g to relay contact 1095j, but relay 1095 is not now energized and the combined signal is not supplied to amplifier 804.

Releasing the start switch produces no circuit change. The aircraft continues, under control of the human pilot as instructed by the aided tracking operator, to move generally along the line A'B' until it reaches a position where Y becomes less negative than —440 yards. Switch 168, FIGURE 15, closes, energizing relay 514. By contacts 514a and 514c red pilot light 503 is illuminated. Relay contacts 514d and 514e open to disable ready switch 553 from energizing ready relay 170. Relay contacts 514g and 514j, FIGURE 17, close to key oscillator 662. The resulting signal at 671 appears as a component of the complex radio signal to the aircraft, and results in energization of relay 732. Contacts 732a and 732c, FIGURE 21, complete the circuit to relay 1075 and lateral flag 1084, withdrawing the latter to indicate that lateral control signals are being received from the marshalling computer.

Relay 1075 acts at contacts 1075a and 1075c of FIGURE 22 to energize relay winding 1187. Relay contacts 1187d and 1187f complete a holding circuit for relay 1187, and relay contacts 1187a and 1187c close to complete a circuit as far as A.C.C.A. switch contact 1184a.

As soon as red light 503 of FIGURE 15 goes on the carrier operator instructs the pilot to close switch 1184 of FIGURE 22, by operation of knob 1189. Contacts 1184a and 1184c complete the holding circuit for switch 1184, and also energize relay windings 1095, 1192, and 1193. The relay contacts 1095a and 1095c in FIGURE 22 close, enabling later energization of circuitry there shown. Relay contacts 1095d and 1095e in FIGURE 22 open, de-energizing compass relay winding 1151 so that the compass is no longer able to influence the control of the aircraft in azimuth. In FIGURE 25 relay contacts 1095g and 1095h disengage to unground the input to amplifier 804, and contacts 1095g and 1095j engage to complete an input circuit to the amplifier. Relay contacts 1095k and 1095m disengage, and relay contacts 1095k and 1095n engage, to change the summing resistor in the feedback circuit. Relay contacts 1095p and 1095q unground the feedback capacitor 1360, and relay contacts 1095p and 1095r couple it to the output of slider 1335. Relay contacts 1095s and 1095t unground output conductor 800, and relay contacts 1095s and 1095u connect the output conductor to slider 1335.

The result of this is that amplifier 804 is supplied with an input signal on conductor 1295, zero signals on conductors 1312 and 1323, and a filtered feedback signal on conductor 1352. A further feedback signal is taken from output slider 1335 and differentiated in capacitor 1360 and resistor 1361. If the differentiated voltage is large enough switch 817 operates and the further feedback signal reaches the amplifier: since it is a differentiated signal its effect is to make the amplifier to some extent an integrator, causing more rapid operation of motor 795. The output on conductor 800 is supplied to the automatic pilot and acts to change the heading of the aircraft. In response, the aircraft turns towards the desired path: its approach thereto is accompanied by decreasing signals from signal transfer control 115 transmitted to conductor 717, until when the craft is on the desired path the signal is zero.

Energization of relay 1193, FIGURE 22, by closure of A.C.C.A. engage switch 1184, is effective in FIGURE 28 to disconnect relay windings 1574, 1582, 1602, and 1610 from amplifiers 1507 and 1526, and to substitute servo-motors 1503 and 1505 therefor. In addition, relay contacts 1193p and 1193q de-energize the centering motor circuit, and relay contacts 1193p and 1193r energize the throttle servo engage clutches 1655 and 1657 so that servomotors 1503 and 1505, FIGURE 27 are enabled to operate the throttle levers.

Energization of relay 1192, FIGURE 22, by closure of the A.C.C.A. engage switch 1184, is effective in FIGURE 27 to disconnect amplifier 1542 from motor 1541 and velocity generator 1544, and to connect the amplifier to motor 1534 and velocity generator 1535. Now any change in the airspeed sensed at 1550 results in operating motor 1534 to readjust feedback device 1566 and to change the signal from throttle command unit 1520. Movable contact 1595 is also adjusted, but since relay contacts 1193s and 1193t, FIGURE 28, are disengaged, no energization of relay 1540 results.

The aircraft is now proceeding with its attitude about three axes stabilized, and with superimposed control from altitude control 100, FIGURE 6, to maintain constant altitude flight and further superimposed control from lateral coupler 94, FIGURE 6, in accordance with signals from coordinate translator 113, FIGURE 5, to maintain the craft on the desired path. The aircraft is moving in a straight line along the line A'B', FIGURE 1, and has just passed a point 440 yards away from B'. The carrier operator is tracking the aircraft on unit 57, and any departure of the aircraft from the desired path results in signals from converter 182 through transfer control 115 and radio command link 52 to lateral coupler 94. The airspeed of the aircraft is stabilized by control of the throttles, to maintain the initial value.

The aircraft in its straight flight now passes the point B', and should begin to turn. As far as converter 182, FIGURE 7, is concerned there is nothing which would call for a change in the heading of the aircraft until its straight flight carries it off the curved path now desired: generator 184 is provided to take care of this need. The boundary between portions 206 and 210 of FIGURE 9 represents the point B', and allows for some off-course error. As the movable contact 204 passes beyond this boundary, in response to operation of the aided tracking unit, an increasing signal is picked up and transmitted through transfer control 116 to the aircraft. A signal now appears on conductor 723, FIGURES 17 and 25, and is transmitted through networks 1300 and 1301 to give proportional and differentiated components on conductors 1312 and 1323. By this means the signal to the automatic pilot is modified to call for a turn of the aircraft even before the aircraft departs from the desired path, the called for correction being that which would be necessary under normal conditions to cause the aircraft to follow the desired curve. This curve motion of the aircraft results, and movable contact 186, FIGURE 8, need only give a signal to correct for any residual errors in the path being made good.

By the time the aircraft has reached the point C', FIGURE 1, it has assumed the roll attitude needed to produce flight along the curve C'D'. Movable contact 204, FIGURE 9, crosses the boundary between portions 206 and 210, and the signal on conductor 723, FIGURE 25, becomes constant. The voltage on conductor 1323 becomes zero, and that on conductor 1312 remains constant. Again the only function of the output from slider 186, FIGURE 8, is to correct for residual errors in the course made good by the aircraft. It will be realized that the rudder channel of the automatic pilot is being supplied with signals, to coordinate the turn, from the roll rate and yaw rate gyroscopes and from the aileron position responsive device, as was previously pointed out.

The carrier operator continues to follow the aircraft with the aided tracking device 57, and the precision radar antenna is driven to follow the aircraft as well. At some moment the precision radar locks on to the movement of the aircraft, which results in energization of relay 499, FIGURE 15. Relay contacts 499a and 499c close, completing a preparatory circuit for later energization of relays 232 and 357: since the $Y_p$ of the craft is more than 2134 yards the relays are not yet energized. At the same time slaving of the precision radar antenna from resolver 64, FIGURE 4 is terminated.

As the operation of the system continues, the aircraft comes to a position in which its parallax corrected Y component of displacement from the carrier is less than 2134 yards, and comparator 246, FIGURES 10 and 15, connects conductor 590 and 591 together, energizing relays 232 and 357. Relay 232, FIGURE 10, disconnects the initial set signals from amplifier 222 and servo system 226, and substitutes therefore the parallax-corrected $X_p$ and $Y_p$ signals from precision radar 60. Servo system 226 adjusts generator 266 to compute a value of $-X_p$ based on the parallax corrected value of $Y_p$, and the actual and computed values of $X_p$ are added in phase opposition in amplifier 222. Output 122 from this amplifier is zero if the aircraft is on the center of the beam. Unless the craft is unusually displaced from its proper position little operation of servo system 226 is necessary.

Energization of relay 357 is shown in FIGURE 13 to substitute actual, parallax corrected values of $h$ and $Y_p$, and the actual value of $s$, for the initial set values, the actual values being supplied by precision radar 60. At this time $Y_p$ is large so that the voltage on conductor 415 is greater than that on conductor 413, comparator 414 still does not operate, and the signal on conductor 351 remains equal to the actual elevation of the aircraft. No control of the aircraft in elevation is exercised because relay 486 is de-energized. Lateral control of the craft is still being exercised by the marshalling computer.

Energization of relay 357 is further effective as shown in FIGURE 16 to complete an enabling circuit through contacts 595 and 596 for relay 592, at relay contacts 357p and 357r, and to prepare at relay contacts 357s and 357u a holding circuit for relay 410. Relay 592 completes at contacts 592a and 592c a preparatory circuit for keyed oscillator 664, as shown in FIGURE 17.

As the flight of the aircraft continues shaft 227, FIGURE 10, continues to rotate and at about $Y_p$ equals 1,944 yards contact 566, FIGURE 15, engages contact 565, and relay 507 is energized. Relay contacts 507d and 507f complete a holding circuit for the relay. Relay contacts 507g and 507j energize the winding of time delay relay 570, which requires two seconds to pull in. Relay contacts 507a and 507c engage to complete a circuit for energizing red lamp 503 independently of relay contacts 514a and 514c. Relay contacts 507k and 507n, FIGURE 16, close to energize relays 287, 345 and 486. Relay contacts 507p and 507r, FIGURE 17, close to key oscillator 663. Relay contacts 507s and 507u close in parallel with relay contacts 514g and 514j in the keying circuit of oscillator 662.

As shown in FIGURE 16, relay 287 interrupts at contacts 287k and 287n the energizing circuit for relay 286, and the latter drops out. In transfer control 115 as shown in FIGURE 12 this cuts off from servo system 313 the signal from conductor 120 and grounds the latter, and relay contacts 287a and 287c close to supply the signal on conductor 122 to servo system 313 instead. Thus phase shifter 338 is reset to the precision value of $X_p$ rather than to the marshalling value $X_m$. As shown at FIGURE 16 relay 345 interrupts at contacts 345k and 345n the energizing circuit for relay 344 and the latter drops out. In transfer control 116 this cuts off the signal from conductor 121, contacts of relay 345 close to substitute that from conductor 123 instead, and phase shifter 341 is readjusted accordingly. In FIGURE 15 relay contacts 287j and 287g and relay contacts 345j and 345g close, either pair of which is sufficient to insure illumination of blue lamp 526. Relay contacts 286d and 286e and relay contacts 344d and 344e re-engage, to prepare in part the holding circuit for relay 170.

As also shown in FIGURE 15, relay contacts 287d and 287e and relay contacts 345d and 345e both open, de-energizing relay 514. Relay contacts 514a and 514c open one circuit to red lamp 503, but the lamp is maintained alight by relay contacts 507a and 507c and relay contacts 511a and 511b. Relay contacts 514d and 514e again close, computing the preparatory circuit for renewed operation of ready switch 553 and ready relay 170. Relay contacts 514g and 514j open in the keying circuit of oscillator 662, but keying is maintained by relay contacts 507s and 507u.

Referring to FIGURE 13, energization of relay 486 ungrounds the input to the vertical signal transfer control and supplies thereto the signal on conductor 351, which is presently zero as pointed out above. Phase shifter 348, FIGURE 17, is adjusted in accordance therewith and produces through the radio command link a zero signal output on conductor 727.

Keying of oscillator 663, FIGURE 17, by relay contacts 507p and 507r results in operation of relay 737. In FIGURE 21 the relay contacts 737a and 737c are closed to energize relay 1091, and relay contacts 1091a and 1091c close to energize relay windings 1100, 1113, and 1117, as well as indicator 1102. The indicator now shows that a vertical control signal is available. Relay contacts 1091d and 1091f, FIGURE 22, establish a circuit to relay 1174 independently of switch 1162. Relay 1113 functions through contacts 1113d and 1113f and conventional means not disclosed to apply the dive brakes of the aircraft. Relay 1117 is effective at contacts 1117a, 1117b, and 1117c, as shown in FIGURE 27, to add to the centering voltage a further fixed voltage from source 1563: this further voltage changes the signal to amplifier 1542 by a fixed amount, thus causing a step reduction in the value of the airspeed stablized by the throttle servomotors 1503 and 1505.

Turning now to FIGURE 21, relay contacts 1100a and 1100c close in parallel with relay contacts 1091a and 1091c to maintain relays 1100, 1113, and 1117 energized when relay 1091 subsequently drops out. In FIGURE 22 relay contacts 1100k and 1100n close in parallel with relay contacts 1091d and 1091f to maintain relay 1174, and relay contacts 1100g and 1100h open to isolate that relay from altitude control switch 1162: relay contacts 1100d and 1100e open to disable the altitude control switch, which drops out; clutch 1170 is released and altitude control device 1242 of FIGURE 23 centers itself.

In FIGURE 25, relay contacts 1091k and 1091n close to discharge capacitors 1317 and 1320 and to ground one side of capacitor 1313, thus resetting the rate network. Relay contacts 1091g and 1091h open, and relay contacts 1091g and 1091j close, to ground the input to amplifier 804. Relay contacts 1100bb and 1100dd close to connect resistor 1296 in parallel with resistor 1287. Relay contacts 1100z and 1100y open to disconnect resistor 1346, and relay contacts 1100gg and 1100ee close to short circuit resistor 1322. Relay contacts 1100v, 1100w, and 1100x increase the proportion of the signal at 723 which appears on conductor 1312, relay contacts 1100s, 1100t, and 1100u operate to decrease the proportion of the signal on slider 1335 applied to capacitor 1360, and relay contacts 1100p, 1100q and 1100r operate to reduce the proportion of the signal on slider 1335 which is taken as an output at 800. Since the only input to amplifier 804 is now that from slider 1334, motor 795 operates to center that slider: in the normal operation of this system the aircraft never departs appreciably from the desired path, and accordingly sliders 1335 and 1334 are not very far from center in any case.

In FIGURE 26 relay contacts 1091s and 1091u discharge capacitors 1450 and 1447 through resistor 1442, and relay contacts 1091p and 1091r close to change the centering voltage by a fixed amount, to compensate in the elevator channel of the automatic pilot for the step change in airspeed previously described. Relay contacts 1100mm and 1100nn disconnect capacitor 1476 from the circuit, and relay contacts 1100hh and 1100jj and 1100kk substitute the signal from detector 721 on conductor 727, for that on conductor 943. Since the only input to amplifiers 923 and 930 are the centering signals and the feedback signals, motors 912 and 913 run to new positions and stop: in normal operation of the system the aircraft never departs very much from the selected altitude, so sliders 1464 and 1395 are very nearly centered at this time. Little operation of motor 913 is hence necessary, and motor 912 needs to operate only long enough to compensate for the step change in airspeed.

The aircraft is now in flight at an attitude stabilized by the automatic pilot without superimposed signals about either the azimuth or the elevation axes other than the elevator step function. The purpose of this is to make the changeover from marshalling control to precision control as smooth as possible, while letting the control devices center themselves.

At the end of the two second delay period, time delay relay 570 of FIGURE 15 pulls in, energizing relay 511 through contacts 570a and 570c. Relay contacts 511a and 511b open to de-energize red lamp 503.

In FIGURE 17 relay contacts 511d and 511e open to interrupt keying of oscillator 663, and relay 737 drops out. As shown in FIGURE 22 this de-energizes relay 1091: contacts 1091a and 1091c open but are shunted by contacts 1100a and 1100c so no change takes place. In FIGURE 22 relay contacts 1091d and 1091f open, but are shunted by relay contacts 1100k and 1100n so that again no operation takes place.

In FIGURE 25 relay contacts 1091k and 1091n unground network 1314 and relay contacts 1091g and 1091h and 1091j unground the amplifier and supply to its inputs derived from conductors 717 and 723. Since relay 254, FIGURE 10, is not energized, the signal on conductor 723 is zero.

In FIGURE 26 relay contacts 1091s and 1091u unground the input to amplifiers 923 and 930 so that motors 912 and 913 operate in accordance with the signal on conductor 727. Relay contacts 1091p and 1091r open: during the two second delay interval motor 912 has operated in response to closure of these contacts, to raise the nose of the aircraft by 1.5 degrees, which is nominally sufficient to compensate for the airspeed change.

In FIGURE 13 relay contacts 511g and 511j close to ground the input to servo system 363. Device 361 now gives a fixed output determined by the altitude of the craft when relay 570 pulled in, and a voltage of the same magnitude is supplied on conductor 415. Any departure of the aircraft from that altitude gives a signal on conductor 351 which is transmitted through relay 486 to phase shifter 348, and by the radar radio command link to detector 725, appearing on conductor 727 to correct the elevators of the aircraft.

At any time after the time delay relay 570 operates and red lamp 503 goes out the aided tracking operator can begin tracking the next aircraft to be landed as switch 168, FIGURE 15 is disabled from influencing relay 514 by relay contacts 287d and 287e, and relay contacts 345d and 345e, and since relays 287 and 345 have disabled relays 286 and 344.

The aircraft is now at point L in FIGURE 2, proceeding in straight and level flight at a constant airspeed along the line E'F' of FIGURE 1. In amplifier 222 of FIGURE 10, the parallax corrected value of $X_p$ from the radar is being compared with the output of device 266, and the azimuth of the aircraft is being controlled in accordance therewith. At this time the desired path is straight.

Device 403, FIGURE 13, is giving an output $H(t)$ based on $t$ computer from $Y_p$ and S: as $Y_p$ decreases $t$, and hence $H(t)$, become smaller, until a point is reached at which the signal on conductor 415 is greater than that on conductor 413, and comparator 414 operates relay 410. In FIGURE 13 this acts through contacts 410a, 410b, and 410c to substitute for the fixed signal from device 361 the decreasing signal from device 403, as the input at 352 to amplifier 350. The output on 351 is thus the difference between the parallax corrected actual altitude and the scheduled altitude. Relay 410 also acts through contacts 410d and 410f of FIGURE 16 to complete its own holding circuit, and through contacts 410g and 410j of FIGURE 17 to complete the circuit for keying oscillator 664, resulting in energization of relay 744 by operation of the command link. As shown in FIGURE 22, relay contacts 744a and 744c close to energize relay 1123, which is effective in FIGURE 26 to close contacts 1123a and 1123c to give a nose-down signal, to amplifier 930, of sufficient magnitude to result in glide of the aircraft having the slope shown in FIGURE 2. Thus the signal on conductor 722, FIGURE 26, need only correct the departure of the aircraft from this slope.

At the point F' of FIGURE 1 it is necessary for the aircraft to once more turn to the left. This is accomplished as is shown in FIGURES 10 and 15 by operation of servo system 226 which actuates movable contact 247 into engagement with arcuate contact 250, thus energizing relay 254, ungrounding conductor 123 at relay contacts 254a and 254b, FIGURE 10, and instead connecting conductor 123 by relay contacts 254a and 254c to device 264. At the same time generator 266 of FIGURE 10 is supplying a signal representative of the desired bank of the aircraft, and a signal appears on conductor 122 representative of any off course deviation of the aircraft. These signals cause adjustment of phase shifters 338 and 340, FIGURE 17, and hence result, by action of the command link, in signals on conductors 717 and 723 to the lateral coupler to control the aircraft in azimuth.

At the point I' the aircraft is to be brought to level flight. This is accomplished when movable contact 596 of FIGURE 16 moves off of arcuate contact 595: relay 592 is de-energized, interrupting the keying of oscillator 664. Relay contact 744 drops out, de-energizing relay 1123 to remove the nose-down signal from amplifier 930.

At the point G of FIGURE 1 the left turn of the craft is to be interrupted. Contact 247 moves off contact 250, relay 254 is de-energized, conductor 123 is grounded and conductor 122 carries the signal representative of departure of the aircraft from straight flight.

The aircraft is now at level flight at an elevation of 25 feet above the deck and aligned therewith. Final touchdown can be brought about under the control of the landing signal officer, or by apparatus more completely described in the second co-pending application referred to above.

Numerous objects and advantages of our invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

We claim as our invention:

1. Apparatus for controlling an aircraft laterally and vertically to cause the aircraft to follow a predetermined non-linear path in azimuth and elevation comprising, in combination: ground based radio actuated means for determining the lateral and vertical displacement of the aircraft from the predetermined path and transmitting to the aircraft signals proportional thereto; means in the aircraft for giving a signal representative of the displacement of the aircraft from a predetermined altitude; signal responsive means in the aircraft causing lateral and vertical movement of the aircraft, and controlling means having a first condition, in which said signal responsive means is connected for energization with the lateral displacement signal and the altitude displacement signal, and a second condition, in which the signal responsive means is connected for energization with the lateral and vertical displacement signals.

2. Apparatus of the class described comprising, in combination: first radio actuated, ground based means giving a first signal proportional to a coordinate of the position of an aircraft on a set of Cartesian axes oriented with respect to said ground based means, and a second signal in accordance with the lateral displacement of the aircraft from a first predetermined non-linear path; second radio actuated, ground based means giving a further signal proportional to departure of the aircraft from a second predetermined non-linear path which intersects said first path, the coordinate of the aircraft when it is located at the intersection of said paths being known; signal responsive means normally controlling the aircraft laterally; means normally connecting said signal responsive means for energization with said second signal, to control the aircraft laterally in accordance therewith; and means connected to receive all said signals and operative when said first signal takes a value corresponding to arrival of the aircraft at the intersection of said paths to energize said signal responsive means with said further signal instead of said second signal.

3. Apparatus for controlling an aircraft laterally and vertically to cause the aircraft to follow a predetermined non-linear path in azimuth and elevation comprising, in combination: ground base radio actuated means for deriving and transmitting to the aircraft signals representative of the lateral and vertical displacement of the aircraft from the predetermined path, and for deriving a further signal varying with the position of the aircraft; means in the aircraft for giving a signal representative of the departure of the aircraft from a predetermined altitude; signal responsive means in the aircraft for causing lateral and vertical movement of the aircraft, control means in the aircraft operable between a first condition in which said signal responsive means is connected for energization with said lateral displacement signal and said altitude departure signal, and a second condition in which said signal responsive means is connected for energization with said lateral and vertical displacement signals; and means actuated when said further signal reaches a value corresponding to arrival of the aircraft at a selected position for operating said control means out of said first condition and into said second condition.

4. Apparatus of the class described comprising, in combination: radio actuated, ground based means giving a first signal in accordance with a Cartesian coordinate of the position of an aircraft and a second signal in accordance with the lateral displacement of the aircraft from the predetermined non-linear path; means responsive to said second signal for controlling the movement of the aircraft in azimuth in accordance therewith, and means responsive to said first signal for performing a switching function when said first signal assumes a selected value.

5. Apparatus of the class described comprising, in combination: initial means normally operative to control an aircraft laterally in accordance with a signal from first ground based radio equipment and vertically in accordance with an airborne constant altitude controller; final means for controlling the aircraft laterally and vertically in accordance with signals from only second ground based radio equipment, and irreversible means for interrupting operation of said initial means and causing operation of said final means.

6. Apparatus of the class described comprising, in combination: initial means normally controlling an aircraft laterally in accordance with a signal from first ground base radio equipment and vertically in accordance with an airborne constant altitude controller; further means for controlling the aircraft laterally and vertically in accordance with signals from only second ground base radar equipment; and means for transferring the control of the aircraft from said initial means to said further means.

7. Apparatus of the class described comprising, in combination: initial, normally operative means controlling an aircraft laterally in accordance with a signal from first ground based radio equipment and vertically in accordance with an airborne constant altitude controller; further means for controlling the aircraft laterally and vertically in accordance with signals from only second ground based radio equipment, and means for interrupting operation of said initial means and causing operation of said further means.

8. Apparatus according to claim 7 in which said last named means includes means for smoothly bringing the aircraft into level flight before causing said operation of said further means.

9. Apparatus according to claim 7 in which said last named means includes means for reducing to zero the lateral control signal from said initial means and for initially establishing the lateral signal from said further means at zero while the transfer of control is taking place.

10. The method of controlling an aircraft in successive stages to cause the aircraft to follow a selected non-linear path in azimuth and elevation which comprises an initial control stage, in which lateral control of the aircraft is by means of signals from first ground based radar equipment and vertical control is by means of signals from an airborne constant altitude controller, and a succeeding control stage, in which both lateral control and vertical control of the aircraft are by means of signals from second ground based radar equipment, and which further comprises the step of initiating said second stage control when the craft reaches a selected position.

11. The method of aircraft control which comprises producing at a ground station a signal representative of the positional error of the aircraft and a signal representative of the nominal rate of turn of the aircraft, simultaneously transmitting said signals separately to the aircraft in flight, and controlling the aircraft in accordance with the relation between said signals.

12. The method of aircraft control which comprises providing at a ground station a signal representative of the positional error of the aircraft and a signal representative of the nominal rate of turn of the aircraft, and controlling the aircraft in flight in accordance with said signals jointly.

References Cited in the file of this patent

UNITED STATES PATENTS

| | | |
|---|---|---|
| 2,322,225 | Crane | June 22, 1943 |
| 2,612,331 | Frazier et al. | Sept. 30, 1952 |
| 2,613,339 | Palmer | Oct. 7, 1952 |
| 2,709,773 | Getting et al. | May 31, 1955 |
| 2,728,065 | Hollmann | Dec. 20, 1955 |
| 2,816,724 | Snodgrass | Dec. 17, 1957 |
| 2,830,291 | Hecht et al. | Apr. 8, 1958 |
| 2,844,817 | Green | July 22, 1958 |
| 2,996,706 | Newell et al. | Aug. 15, 1961 |